(12) United States Patent
Strobel Stewart et al.

(10) Patent No.: US 7,389,281 B2
(45) Date of Patent: Jun. 17, 2008

(54) POSSIBILISTIC EXPERT SYSTEMS AND PROCESS CONTROL UTILIZING FUZZY LOGIC

(75) Inventors: Lorna Ruth Strobel Stewart, Toronto (CA); Johanna Maria Daams, deceased late of, Toronto (CA); by Peter Hendriks, legal representative, Toronto (CA)

(73) Assignee: Postlinear Management Inc., Toronto (CA)

( * ) Notice: Subject to any disclaimer, the term of this patent is extended or adjusted under 35 U.S.C. 154(b) by 261 days.

(21) Appl. No.: 10/817,883

(22) Filed: Apr. 6, 2004

(65) Prior Publication Data
US 2005/0075995 A1   Apr. 7, 2005

Related U.S. Application Data

(63) Continuation of application No. 09/742,335, filed on Dec. 22, 2000, now abandoned, which is a continuation of application No. PCT/CA99/00588, filed on Jun. 25, 1999.

(30) Foreign Application Priority Data

Jun. 25, 1998 (CA) .................................. 2242069

(51) Int. Cl.
G06F 9/44     (2006.01)
G06F 17/00    (2006.01)
G06N 7/02     (2006.01)
G06N 7/06     (2006.01)
G06N 5/04     (2006.01)

(52) U.S. Cl. .............................. 706/52; 706/60
(58) Field of Classification Search .................. 706/47, 706/52, 900
See application file for complete search history.

(56) References Cited

U.S. PATENT DOCUMENTS 4,860,214 A   8/1989  Matsuda et al.

(Continued)

FOREIGN PATENT DOCUMENTS

EP    0 452 824 A2    10/1991

(Continued)

OTHER PUBLICATIONS

Clark et. al. "Fuzzy Belief Networks" ACM. 1990.*

(Continued)

*Primary Examiner*—David Vincent
*Assistant Examiner*—Benjamin Buss
(74) *Attorney, Agent, or Firm*—Brett J. Slaney; John R. S. Orange; Blake, Cassels & Graydon LLP

(57) ABSTRACT

An explicit assumption of continuity is used to generate a fuzzy implication operator, which yields an envelope of possibility for the conclusion. A single fuzzy rule A B entails an infinite set of possible hypothese A'B' whose degree of consistency with the original rule is a function of the "distance" between A and A' and the "distance" between B and B'. This distance may be measured geometrically or by set union/intersection. As the distance between A and A' increases, the possibility distribution B* spreads further outside B somewhat like a bell curve, corresponding to common sense reasoning about a continuous process. The manner in which this spreading occurs is controlled by parameters encoding assumptions about (a) the maximum possible rate of change of B' with respect to A' (b) the degree of conservatism or speculativeness desired for the reasoning process (c) the degree to which the process is continuous of chaotic.

20 Claims, 85 Drawing Sheets

U.S. PATENT DOCUMENTS

| | | | | |
|---|---|---|---|---|
| 5,130,936 | A | * | 7/1992 | Sheppard et al. ............ 702/123 |
| 5,239,620 | A | | 8/1993 | Yamakawa et al. |
| 5,487,130 | A | | 1/1996 | Ichimori et al. |
| 5,517,537 | A | * | 5/1996 | Greene et al. ............... 376/252 |
| 5,748,852 | A | | 5/1998 | Mahler |
| 5,815,198 | A | * | 9/1998 | Vachtsevanos et al. ........ 348/91 |
| 6,687,576 | B2 | * | 2/2004 | Mattes et al. ................. 701/70 |

FOREIGN PATENT DOCUMENTS

WO        WO 99/67707 A1     12/1999

OTHER PUBLICATIONS

Dubois et. al. "Bayesian conditioning in possibility theory" Fuzzy Sets and Systems. 1997.*

Dubois et. al. "Representing Partial Ignorance" IEEE. 1996.*

Kang et. al. "An Application of Fuzzy Logic and Dempster-Shafer Theory to Failure Detection and Identification" IEEE. 1991.*

Sandri et. al. "Elicitation, Assessment, and Pooling of Expert Judgemetns Using Possibility Theory" IEEE. 1995.*

Lin et al., Neural fuzzy systems: a neuro-fuzzy synergism to intelligent systems, 1996, pp. 64-86, 114-140 and 147-148, Prentice Hall, U.S.A.

Lowen, *A fuzzy Lagrange interpolation theorem*, Fuzzy sets and systems, Jan. 1990, pp. 33-38, vol. 34, Elsevier Science Publishers.

Rocha, *Interval based evidence sets*, Proceedigns of the 3rd International Symposium on Uncertainly Modelling and Analysis, Sep. 1995, pp. 624-629, IEEE Press, ed. by AYYUB.

Romer et al., *Constraints on belief functions imposed by fuzzy random variables*, IEEE Transactions on Systems, Man, and Cybernetics, Jan. 1995, pp. 86-99, vol. 25, Issue No. 1, IEEE Press.

Strobel Stewart et al., *Fuzzy Logic and the Uncertain Art of Audit Enquiry*, Proceedings of the Seventh IFSA World Congress, Jun. 1997, pp. 116-122, vol. 4., Prague.

Strobel Stewart, *Risk management, professional judgement, chaos theory and fuzzy possibility*, Proceedings of the 18th International Conference of NAFIPS, Jun. 1999, pp. 745-748, New York.

Sudkamp et al., *Toward fuzzy-valued matching and similarity assessment*, Proceedings of the 1996 Conference of the North American Fuzzy Information Processing Society, Jun. 1996, pp. 59-62, Berkeley, CA.

Turksen et al., *An approximate analogical reasoning schema based on similarity measures and interval-valued fuzzy sets*, Fuzzy Sets and Systems, Feb. 1990, pp. 323-346, vol. 34, Issue No. 3, Elsevier Science B.V., Amsterdam.

Yager, *An approach to inference in approximate reasoning*, Int. J. Man-Machine Studies, Mar. 1980, pp. 323-338, vol. 13, Issue No. 3, Academic Press Inc., London.

Yen, *Generalizing the Dempster-Schafer theory to fuzzy sets*, IEEE Transactions on systems, man and cybernetics, May/Jun. 1990, pp. 559-570, vol. 20, Issue No. 3., IEEE Press.

Cross et al. *Geometric compatibility modifications*, Fuzzy Sets and Systems, Dec. 1996, pp. 283-299, vol. 84, Issue No. 3, Elsevier Science B.V., Amsterdam.

Daams et al., *Applying the new implication operator to professional judgement in risk assessment*, Proceedings of the 18th International Conference of NAFIPS, Jun. 1999, pp. 755-759, New York.

Daams, *Envelope of plausibility defined by a new fuzzy implication operator*, Proceedings of the 18th International Conference of NAFIPS, Jun. 1999, pp. 749-754, New York.

Dubois et al., *Automated reasoning using possibilistic logic: semantics, belief revision, and variable certainty weights*, IEEE Transactions on Knowledge and data Engineering, Feb. 1994, pp. 64-71, vol. 6, Issue No. 1, IEEE Educational Activities Department, NJ, USA.

Dubois et al., *A logical approach to interpolation based on similarity relations*, International Journal of Approximate Reasoning, Jun. 1997, pp. 1-36, vol. 17, Issue No. 1, Elsevier Science Inc., New York.

Dubois et al., Fuzzy information engineering: A guided tour of applications, Nov. 1996, pp. 123-134 (Chapter 7), 187-199 (Chapter 12), 223-231 (Chapter 14), 291-310 (Chapter 19), 311-323 (Chapter 20), 340-342, 357-387 (Chapter 22), 389-403 (Chapter 24), 405-415 (Chapter 25), 417-435 (Chapter 26), 507-529 (Chapter 31), 531-542 (Chapter 32), and 549-551 (Chapter 33), Wiley Computer Publishing, New York.

Dobois et al., *Fuzzy sets in approximate reasoning, Part 1: Inference with possibility distributions*, Fuzzy Sets and Systems, available online: Jun. 1999, pp. 73-132, vol. 100, Supplement 1, Elsevier Science B.V., Amsterdam.

Dubois et al., *Fuzzy sets in approximate reasoning, Part 1: Inference with possibility distributions* Fuzzy Sets and Systems, Mar. 1991, pp. 143-202, vol. 40, Issue No. 1, Elsevier Science B.V., Amsterdam.

Feder, Fractals (Physics of Solids and Liquids), Chapter 9, *Random walks and fractals*, 1988, pp. 163-179, Plenum Press, New York.

Fukami et al., *Some considerations on fuzzy conditional inference*, Fuzzy Sets and Systems, Nov. 1980, pp. 243-273, vol. 4, Issue No. 3, Elsevier Science B.V., Amsterdam.

* cited by examiner

Unacceptable B' (Before Anitoppling)

Acceptable B' (After Antitoppling)

← 102

← 103

← 104

(a) Sugeno Formula (b) Zadeh Formula (c) Human intuition

Rule with several outputs

——————— Example $B$

·················· $B_P^*$ when A' is an example, not a rule

— — — — — $B_P^*$ when $A' \supset A$

This example shows t-norm = multiplication $M_P(d_x, d_y) = f_M[\ln(1- d_y)/\ln(1- d_x)]$ $f_M(S) = 1 - (2/\pi) \tan^{-1}(S)$ Central cover Left cover Right cover $$B_p^*(y) = \vee_B t[B'(y), M_p(A' \rightarrow B' | A \rightarrow B)]$$

POSSIBILISTIC EXPERT SYSTEMS AND PROCESS CONTROL UTILIZING FUZZY LOGIC

This application is a continuation of U.S. patent application Ser. No. 09/742,335 filed on Dec. 22, 2000, now abandoned which is a continuation of PCT Application No. PCT/CA99/00588 filed on Jun. 25. 1999, which claims priority from Canadian Patent Application No. 2,241,069 filed on Jun. 25, 1998.

This invention relates to the field of fuzzy logic systems, and more particularly to a method of using fit logic to reason from sparse examples or rules by interpolation and extrapolation for use in process control and in possibilistic expert systems which assess evidence based on materiality and probability to confirm or disconfirm an assertion.

BACKGROUND OF THE INVENTION

Generally fuzzy logic systems utilize rules against which inputs are evaluated in order to formulate an output. In the present specification, a rule refers to a fuzzy proposition, which is indicated as A→B, where A is the rule input and B is the rule output. For example, in the phrase "red cars are liked", the rule input is "red cars" and the rule output is "liked". The input is a fuzzy set that may or may not be identical to the rule input. For example, "green cars" and "orange vans" would be inputs. The output is a conclusion inferred by applying the rule to the input. The conclusion may or may not be the same as the rule output depending on the input. A rule excludes certain outputs absolutely because it is the result of many observations that lead to a firm conclusion that nothing other than B will occur if A is true. An "example" is defined as "a single observation of B together with A". If situation A recurs, outputs other than B are deemed possible Existing fuzzy logic systems have limited decision making capabilities and therefore are less likely to emulate a desired system requiring reasoning that is similar to informal human reasoning. These limitations may be described as follows:

1) Existing fuzzy logic implication operators do not generate outputs corresponding to intuitive ideas for the output if the input does not match the rule input exactly.

For example, in the case of mismatch between input and rule input, informal logic postulates for the output an envelope of possibility should spread around the rule output, and spread wider as the input becomes less similar to the rule input. This spreading reflects increased uncertainty about the range of possible outputs. If the input is "sort of" like the rule input, the output should be "sort of" like the rule output, where "sort of" means an increased degree of fuzziness and/or a wider support set.

One expects outputs closer to the rule output to be more possible than remote outputs. For example, if a vehicle is "orange car", one does not expect "intensely disliked" (an output remote from the rule output "liked") to be just as possible as "somewhat liked" (an output close to the rule output "liked").

Existing fuzzy logic generates basically two types of outputs if the input and rule input do not match exactly, exemplified by a Zadeh implication and a Sugeno implication. In the former, the envelope of possibility has a core identical to the rule output and infinite flat tails whose height is proportional to the mismatch. In the latter, the envelope of possibility does not spread at all but becomes increasingly subnormal as the mismatch increases.

2) Existing fuzzy logic requires a complete set of overlapping rules covering all possible combinations of inputs, whereas human beings can reason from a very sparse set of rules or examples.

A complete set of overlapping rules is required for fizzy logic because only logical operations (as opposed to arithmetical operations) are applied to the inputs to get the output, and logical operations can only be applied to fuzzy sets that intersect to some degree. Existing fuzzy logic can not function with disjoint sets of rules, whereas human beings can function by filling in the blank spaces in a rule input "grid". For example, if you knew "red cars are liked" and "white cars are hated", you would guess that "pink cars elicit indifference". Humans do not need a new rule for this situation.

When using the newly created rules, human beings assume that the output is fuzzier than it would be if the input matched the rule input exactly. This increasing fuzziness corresponds to the desired envelope of possibility described in 1). For example, your conclusion about pink cars would not be very certain because you have definite information only about red and white cars. You therefore hedge your conclusion with words to make the conclusion fuzzier and to indicate doubt about the conclusion: "Most likely people are indifferent to pink cars, but it's also somewhat possible they might hate them or love them, I can't be sure"

Expert knowledge is currently formulated in fuzzy logic as a complete set of rules. However, in much of informal reasoning, expert knowledge is represented by: a sparse set of examples or rules, knowledge of how to deviate from those rules, and a measure of how far to trust those deviations, all of which is not represented by existing fuzzy logic.

3) Existing Fuzzy Logic Does not Smoothly Bridge the Gap Between Examples and Rules.

In current practice, a large number of discrete data points (examples) are sampled, clustering analysis or the application of a neural net follows, and then a complete fizzy rule set is extracted. A human being, on the other hand, will start reasoning from one example, correct his reasoning on getting a second example, and with no switchover from one mathematical approach to another, continue formulating new rules from however many examples are available.

4) Existing Fuzzy Logic Does not Explicitly Encode Degrees of Continuity and Chaos.

Human beings assess certain environments as more chaotic than others. In chaotic environments, a small change in the input could lead equally well to a large change in the output or to a small change. In environments where continuity prevails, a small change in the input leads to a change in the output roughly proportional to the change in input, but the proportionality constant is only vaguely known, or only a vague upper limit on its absolute magnitude is known.

For example, suppose that the temperature in a certain city is about 20° C. and a person wishes to know what the temperature is in another city that is 300 kn away. In general, temperature is a continuous function of latitude and longitude, however, if there are mountain ranges, elevation differences, or large bodies of water, discontinuity is possible.

If the person thinks that this particular terrain is flat and without bodies of water, he/she would make the assumption of continuity; and the envelope of possible temperatures will be a fuzzy number centered around 20° C. Experience says that temperatures change at most one or two degrees for every hundred kilometers, therefore, a person would know approximately how far the envelope of possible temperatures would spread outside the original number "about 20 C".

If the two cities are at different elevations, then the estimate envelope for the second city may no longer symmetrical around the fizzy number "about 20C". Five degrees is just as possible as fifteen degrees, which should be represented by the fuzzy logic system.

5) In Existing Fuzzy Measure Theory, the Concepts of Belief and Plausibility have been Applied only to Assertions.

Expert opinion and evidence currently consist of assertions, not rules. Assertions are statements of fact such as "This car is red". People however apply these belief and plausibility concepts to new rules entailed from established rules. For example, if the rule "red cars are liked" is true, and there is no other information, then "blue cars are liked" is 100% plausible, since there is no evidence, in the form of a rule about blue cars, that would contradict the entailed proposition "blue cars are liked". However, neither is there evidence to support the entailed proposition "blue cars are liked", hence that proposition is believable to degree zero.

Any conclusions drawn from entailed rules should inherit these degrees of belief and plausibility derived from the entailment before they can be used for decision making.

6) Many systems to which fuzzy expert systems are applied have some fractal geometry. Existing fizzy logic expert systems do not explicitly incorporate the ability to adequately simulate such systems.

There is therefore a need for a fuzzy logic system that mitigates at least some of the disadvantages of existing systems while achieving some of the advantages as described above.

This invention seeks to provide a solution to the problem in fuzzy logic systems wherein user rule input does not match a rule exactly. Accordingly this invention provides for bridging the gap between non-matching rules and rule inputs by creating envelopes of possibility for an output, the output having different shapes and rates of spreading and wherein the rate of spreading is a function of distance between the user input and the rule input. The desired shape of the envelope of possibility is a system parameter determined at set tip by an expert, while the similarity between the user input and the rule input may be measured by existing measures or by a novel measure. The rate of spreading of the envelope as a function of the dissimilarity between the input and the rule input is determined by the expert. It may also depend on the location of the input in input space or other parameters of the input and the rule input.

For multidimensional inputs, that is inputs where more than one attribute is defined for each input, the different dimensions may be weighted differently when calculating the distance between the multidimensional input and the multidimensional rule input, to reflect greater sensitivity of the output to some of the dimensions of the input. A weight function also makes it possible for one input dimension to "compensate" for another in the generally accepted sense of the word.

This invention further provides a method to eliminate the requirement for a complete set of overlapping rules. Instead, it is possible to calculate degrees of similarity between disjoint fuzzy sets using a distance function in order to interpolate or extrapolate from sparse examples or rules. Fuzzy limits can be set on the vaguely known possible rate of change of the output and it is possible to reconcile contradictory inputs, and choose the appropriate pattern to interpolate or extrapolate from.

This invention further seeks to make it possible for fizzy logic to smoothly bridge the gap between examples and rules. By providing means to calculate degrees of similarity (or distance) between two fuzzy sets, between two point data examples, between a fuzzy number and a point data example, or between two fuzzy numbers, it is possible to bridge the gap between examples and rules. Existing measures of set intersection or similarity may also be used but for existing measures, interpolation/extrapolation cannot be done if the input does not intersect a rule input This invention also seeks to make it possible to encode the degree to which chaos or continuity occurs. A new family of fuzzy implications, of which the Zadeh implication is a special case, makes it possible. The degree of chaos or continuity may depend on the location of the input in input space. An output can be continuous in one of the input dimensions but chaotic in another if the inputs are multidimensional.

This invention seeks to provide a solution for the problem where the concepts of belief and plausibility are only applied to assertions, not to propositions.

Using the kernel of the new fuzzy implication operator, one can arrive at a degree of plausibility. an entailed proposition, and an envelope of possible conclusions for a given input.

Using set intersection Or other distance measures, the strength of the chain of evidence and reasoning linking the data to the conclusion can be calculated and thus obtain an envelope of belief. The difference between the envelopes of belief and possibility measures all the vagueness, uncertainty gaps, contradiction, and probabilistic nature of the rules and the input data as well as the mismatch between the inputs and the rule inputs. The degree to which an assertion is proven and the degree to which it is merely possible can be quantified.

This invention seeks to provide a method for malting use of the fractional dimension or other parameters of fracial systems that current filmy systems do not make use of to calculate an envelope of possibility for fractal systems.

Using the new fuzzy implication operator with the appropriate kernel and the appropriate new distance measure, the envelope of possibility can be found for a system characterized by a vaguely specified fractal dimension.

In accordance with this invention there is provided in an expert system a method for determining an outcome from a set of inputs, the method comprising the steps of determining: a set of parameters by an expert establishing at least one rule using at least two sets of parameters as input and output; according values to each of a selected ones of sets of parameters; computing an envelope of possibility by operating on inputs and selected ones of said sets of parameters (a spreading function or kernel for the implication operator, curve fitting procedure for interpolation/extrapolation, distance functions, weights and weight function); computing a belief envelope; comparing possibility and belief envelopes with predetermined criteria to determine the envelope of possibility is sufficiently narrow; if the system is being used for assessing evidence supporting an assertion, compare possibility and belief envelopes to assertion in question; output based on envelope of possibility must be selected if the system is being used for assessing evidence, either advise user to collect more input data to confirm/disconfirm assertion to the required degree or select output.

BRIEF DESCRIPTION OF THE DRAWINGS

An embodiment of the present invention will now be described, by way of example only, with reference to the following figure, in which:

FIG. 6 shows the distance functions that the expert selects from

DETAILED DESCRIPTION OF THE PREFERRED EMBODIMENTS

Figure 1:
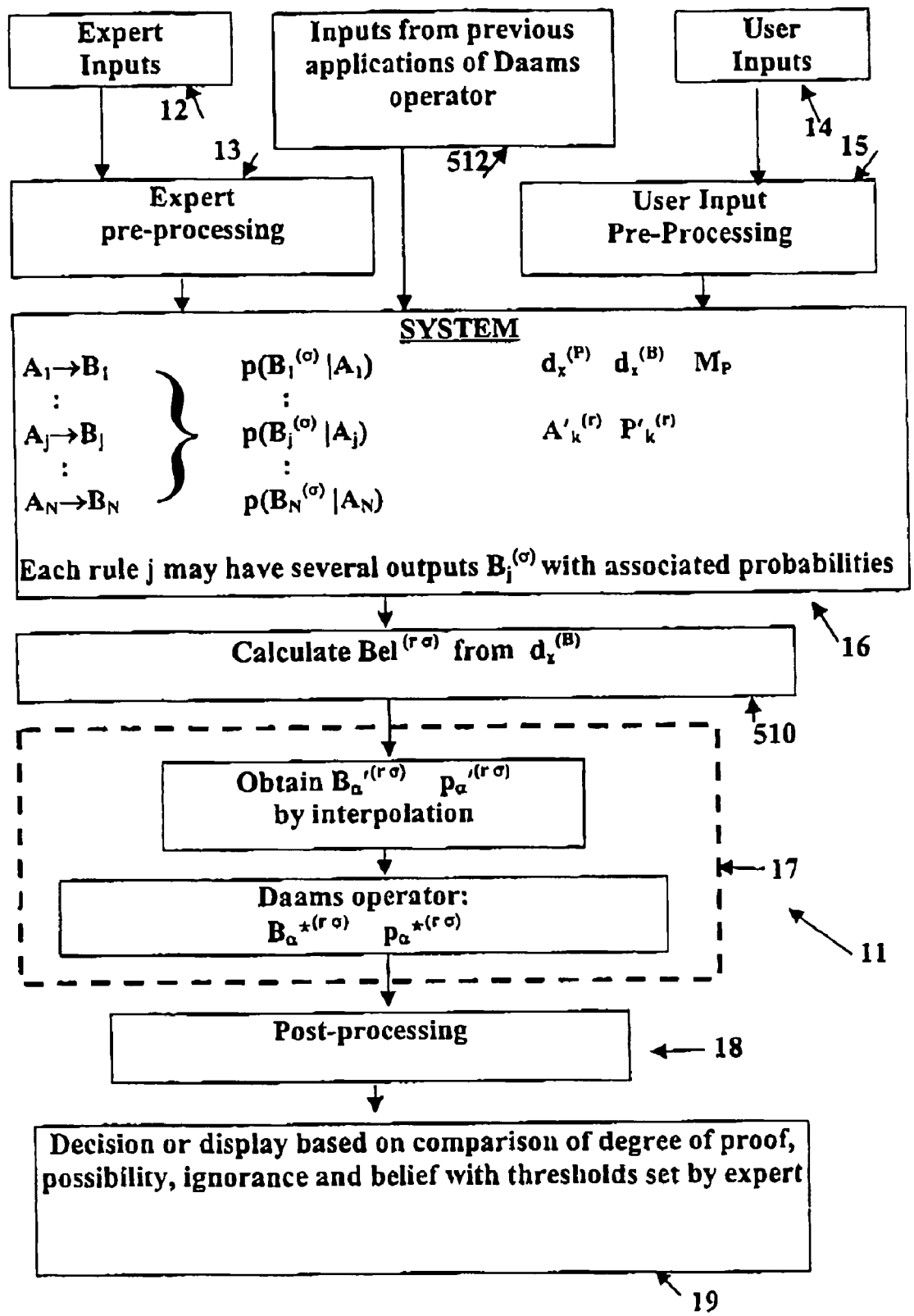
FIG. 1 shows a flowchart that generally describes the overall system flow.
Figure 4:
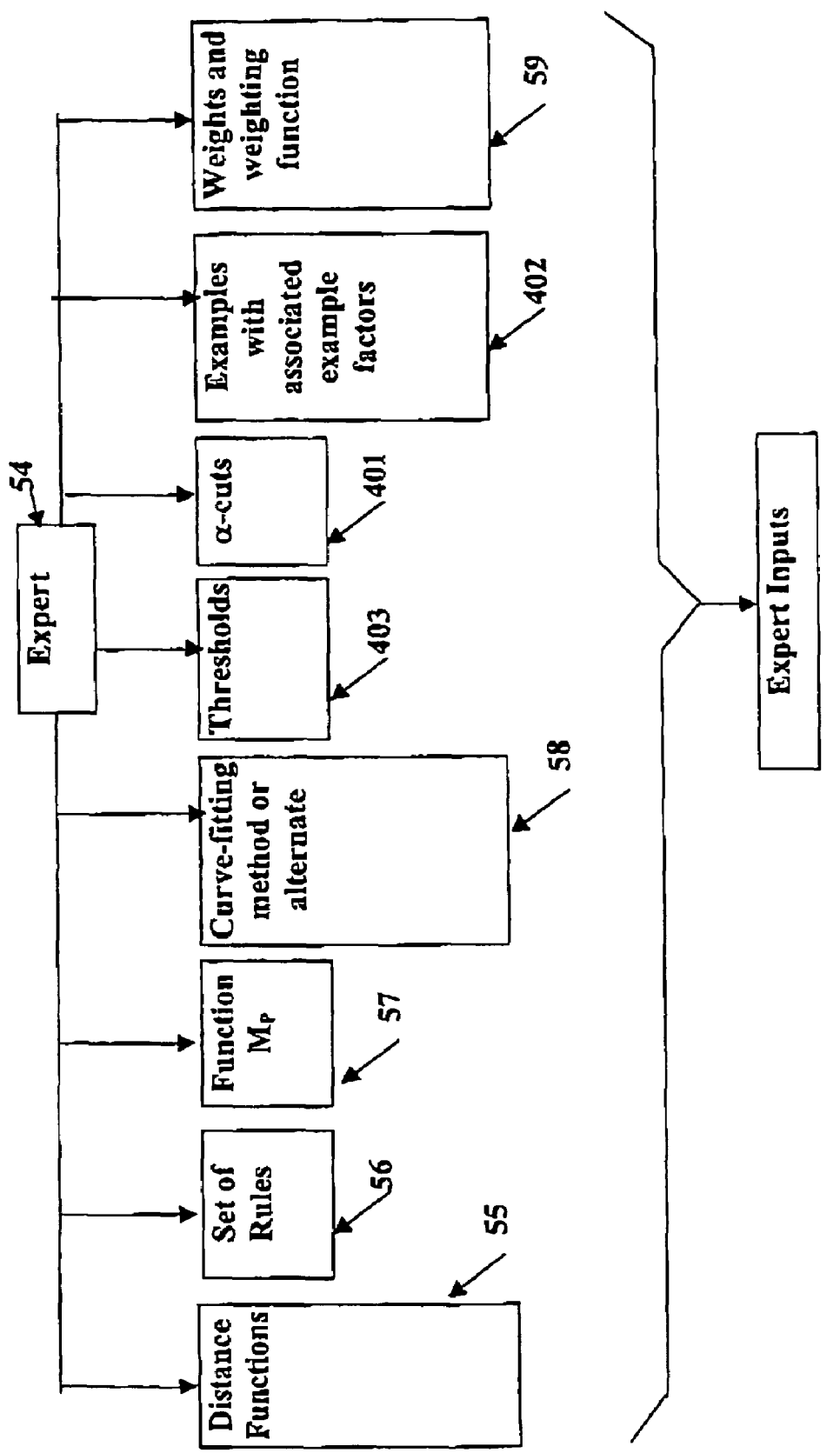
FIG. 4 shows the expert inputs into the system

Referring to FIG. 1, an overview of a generalized system according to the present invention is shown by numeral 11. The system 11 comprises a predetermined set of parameters 12 defined by an expert (not shown) for the system. Generally the set of parameters are termed expert inputs. The expert inputs 12 are shown in more detail in FIG. 4. The figure shows the parameters that the expert decides upon and inputs at the time that the system is set up. The expert must set up the set of rules with truth values 56, possibly with associated probabilities as well, a set of examples with associated example factors 402, a set of alpha-cuts 401, the function $M_p$ 57 or equivalently a function for making each alpha-cut spread, the distance functions 55, an interpolation method for curve fitting 58 if the expert decides to interpolate rather than use the alternate method, and weights and weighting functions 59, and thresholds for the decisions 403. Direct constraints on the output may be included. These parameters are stored in the system. The parameters are unique to the application and the expert is only an expert in the field for which the application is to be used for. The parameters are necessary inputs for the algorithm and are based on the experience of the expert.

Figure 11:
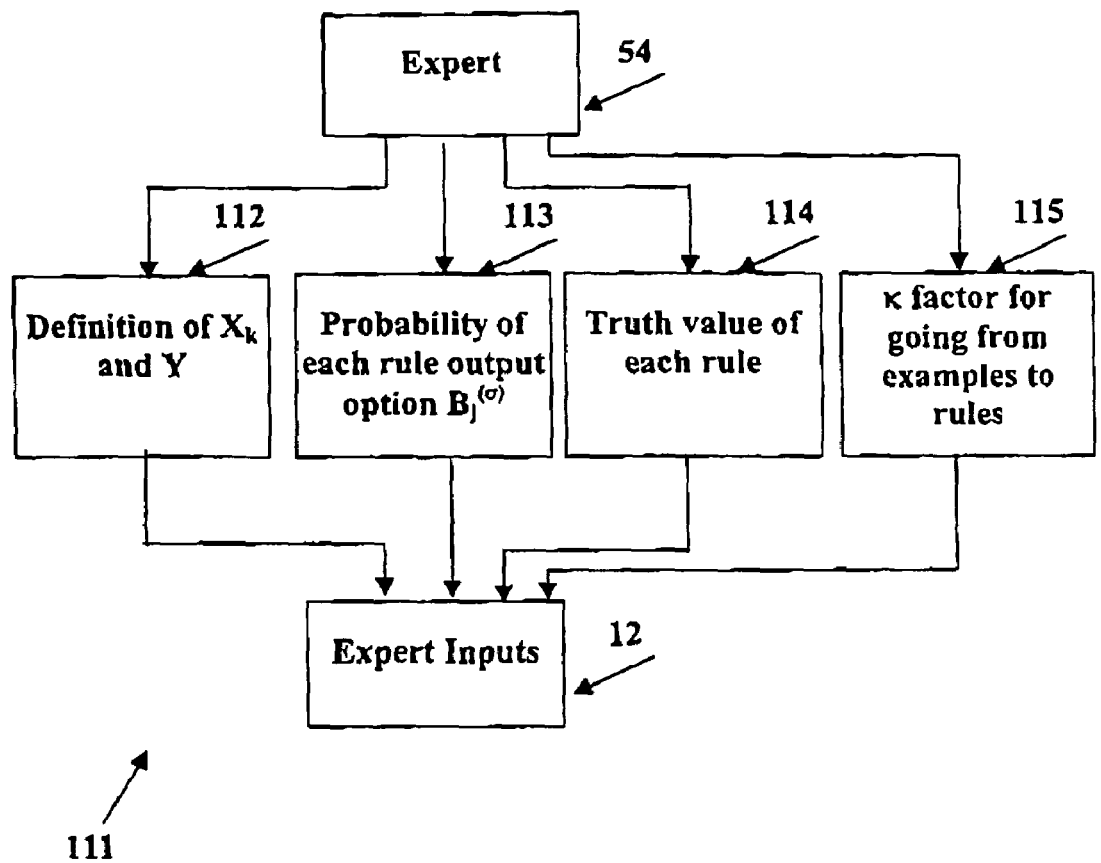
FIG. 11 shows parameters of the expert defined rules FIG. 12 explains left and right covers (for the distance function)

The expert must define a set of rules 56 for the application, of which there is a minimum of one. The parameters of the rules themselves are shown in FIG. 11. They include: a definition of $X_k$ and Y, the universes of discourse for the input (input dimensions are indexed by k) and output 112, the probability of each rule output option 113, the truth value of each rule 114, and a definition of a factor κ to be used when examples are generalized into rules 115. It is not necessary for there to be an exact match between the rule outputs of one block of rules and the rule inputs of the next block. For example, it is acceptable to have "red apples are ripe" and "half-ripe apples are cheap" as rules.

Figure 21:
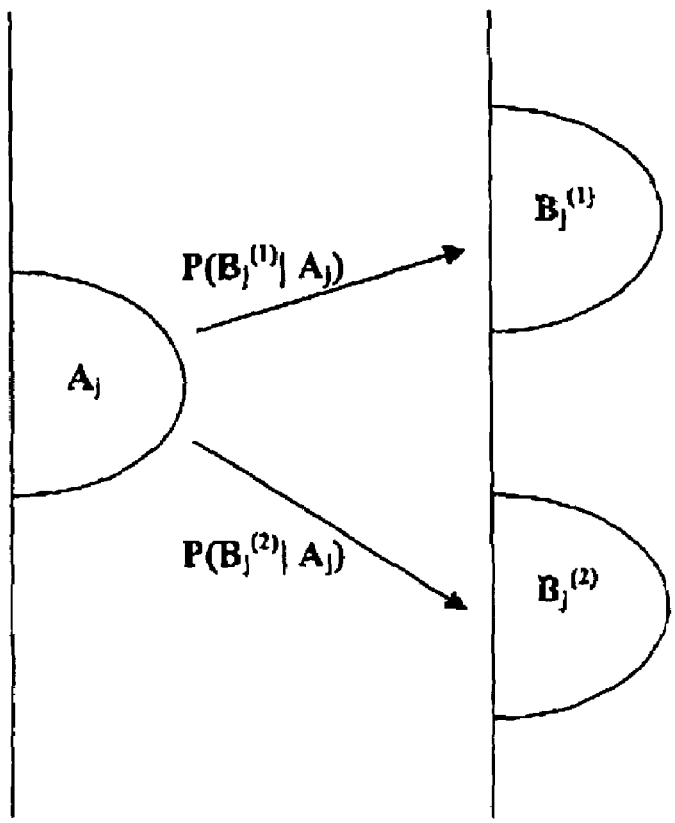
FIG. 21 shows a rule with several outputs

FIG. 21 depicts the situation that occurs if probability is associated with the rule output B, in which case it has at least two rule outputs, denoted by the superscript (σ). Each output option σ is associated with a probability $p(B^{(\sigma)}|A)$, which may be vague. For example, "cats are usually affectionate" has one rule output "affectionate", with associated fuzzy probability "usually" translated as a fuzzy number centered around 0.2; and a second rule output "not affectionate" with associated fuzzy probability "rarely" translated as unity minus the fuzz number "about 0.8". There can also be more than two output options, each with an associated probability, for example, "hot weather is sometimes dry, sometimes rainy, and humid the rest of the time".

Truth-qualified propositions include phrases to indicate that the proposition is not exactly expressing the true relationship between antecedent and consequent, for example, "That small animals make good pets" is only sort of true. A truth value $0 < T(A \rightarrow B) \leq 1$ is assigned to each rule, which increases the spreading of the output when $T(A \rightarrow B) < 1$. If $T(A \rightarrow B) < 1$, even when the input matches the rule input exactly, the envelope of possibility will spread outside the rule output, and the belief in the conclusion will not be 100%.

The example factor, κ, is used the same way as $T(A \rightarrow B)$ to increase blurring or spreading of the envelope of possibility when an example rather than a rule is being processed.

Figure 22:
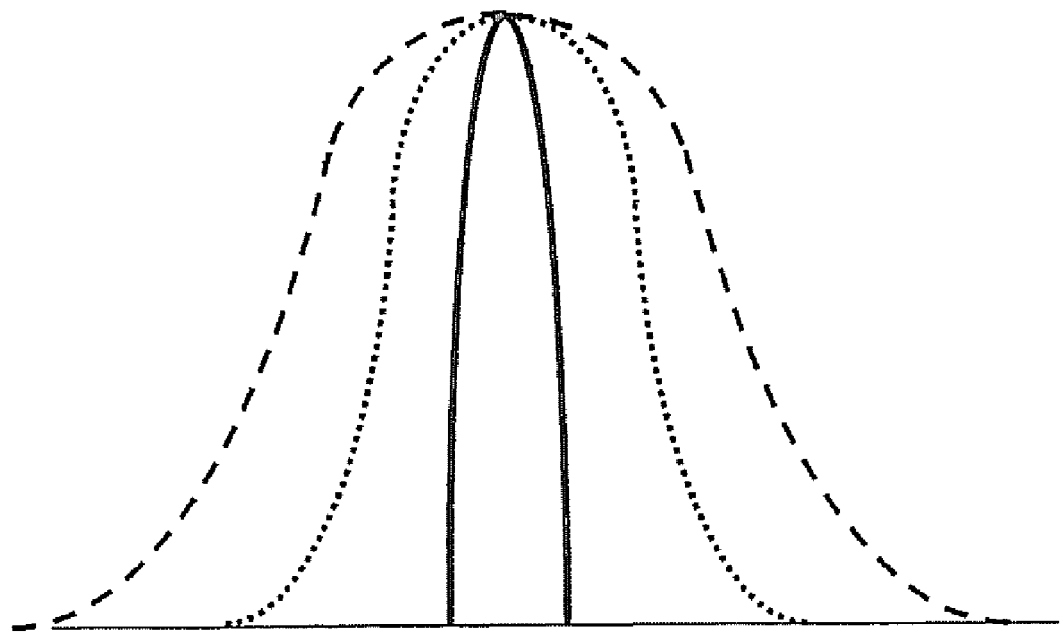
FIG. 22 shows the possibility distribution that occurs when examples are generalized into rules

Rules are distinguished from examples by their power of exclusion. If an example of B is observed at the same time as an example of A, then if A recurs exactly, it is possible that B will recur too. But it is also possible that something else will occur, most probably something similar to B. On the other hand, if AB is a rule of truth value 100%, then if A occurs anything other than B is excluded. As people transform examples of experience into rules by accumulating confidence that nothing other than B will ever follow from A, a fuzzy transition in their judgment of the relationship between A and B occurs. Thus, there is no sharp line of demarcation between rules and examples. A rule is represented by $\kappa=1$, an example by $0<\kappa<1$. If $\kappa=1$, then there is no generalization beyond B; the only allowed output when A'=A is B or its subsets, which is shown in FIG. 22. On the other hand, if $\kappa<1$, then a halo of outputs B' close to H are permitted even when A'=A.

Knowing vaguely to what degree an output varies as a function of the inputs is generally sufficient for people to generate a rule from a single example. Given the observation (A, B) they will postulate a rule A→B* where B* is a blurred, spread out transform of B. For example, if a tourist in a strange city buys an apple for 50 cents in the local currency and has no other experience with apples in that country, he will form a tentative rule "apples cost about 50 cents". Here he uses previous knowledge from other countries about the variability of apple prices to quantify "about".

These two concepts may be expressed mathematically by modifying the technique that creates a spread out envelope of possibility from the rule output, namely replacing $d_x(A, A')$ by $1-\kappa(1-d_x(A, A'))$ or $1-T(A\to B)(1-d_x(A, A'))$:

$d(A, A', \kappa)=1-\kappa(1-d_x(A, A'))$ $d_x(A, A', T(A\to B))=1-T(A\to B)(1-d_x(A, A'))$, where $d_x(A, A')$ represents the mismatch between the rule input A and the input A'. The distance functions $d_x$ will be described later. Time evolution may be built into the system by putting a timestamp on each example or rule and reducing $T(A\to B)$ or $\kappa$ as time passes. With this method, knowledge in the form of examples and well-established rules may be stored on the same footing in the rule base. The values of $\kappa$ may be assigned automatically by the system or manually by the expert to a certain class of inputs for example, fruit, even before any examples or rules for that class of inputs are available to place in the system.

Alternately, if precise rather than fuzzy measurements are available, as in the apple price example, values of $\kappa$ could be assigned automatically to new data (A, B), using the cardinality of A and B relative to some stored constants; as a criterion for distinguishing examples from rules. A rule input A of very low cardinality is then assumed to arise from a single example; rule inputs of larger cardinality are assumed to represent samples large enough to define rules.

Figure 6:
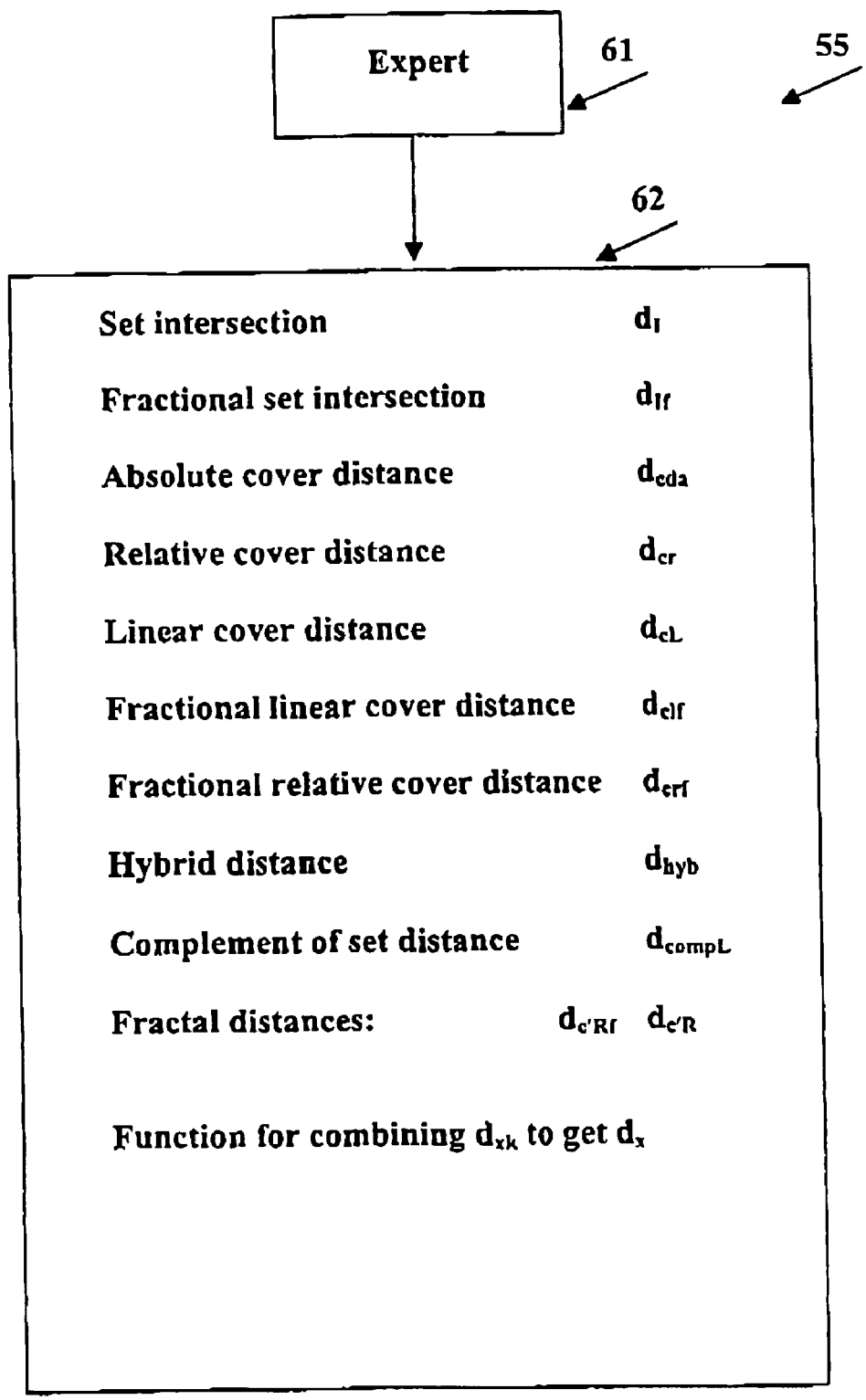

The expert must also select the distance functions 55 to be used, which are shown in more detail in FIG. 6. The different methods of measuring the distance are determined based on the experience of the expert. An explanation of the different distance functions identified by numeral 62 and their applicability is described below.

To understand how the expert chooses distance functions, it is necessary to understand how the possibility distribution is calculated from the kernel $M_P$. The function Mp is described in more detail later on.

Figure 23A:
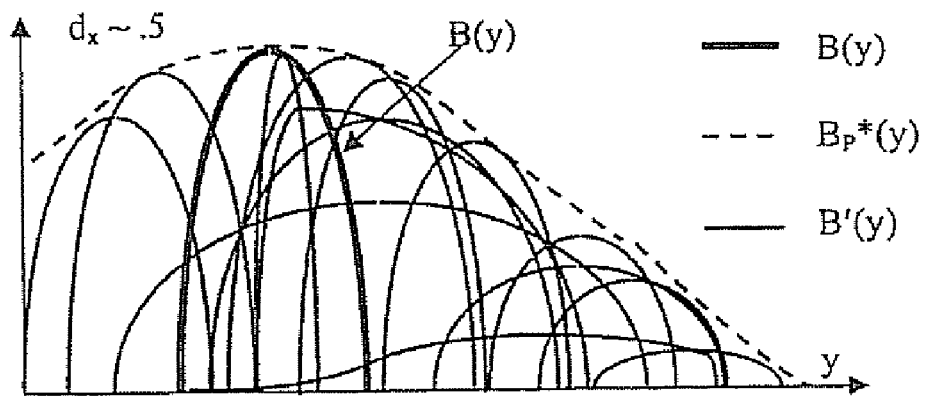
FIG. 23a shows envelopes of possibility where $d_x \sim 0.5$.
Figure 23B:
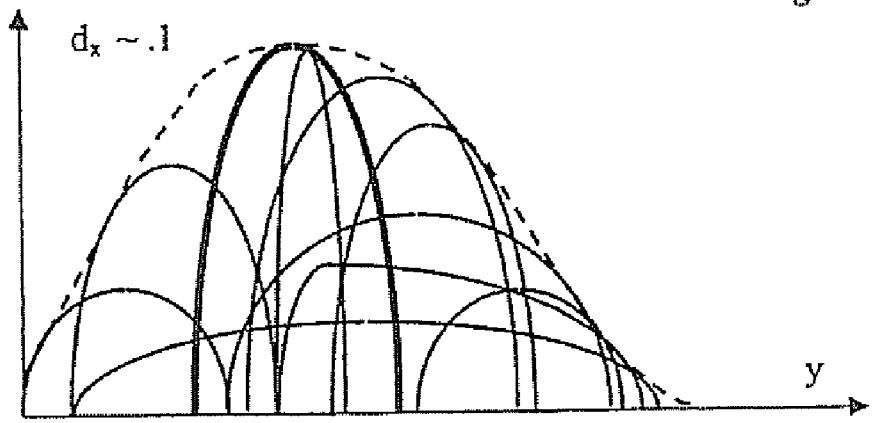
FIG. 23b shows envelopes of possibility where $d_x \sim 0.1$.
Figure 23C:
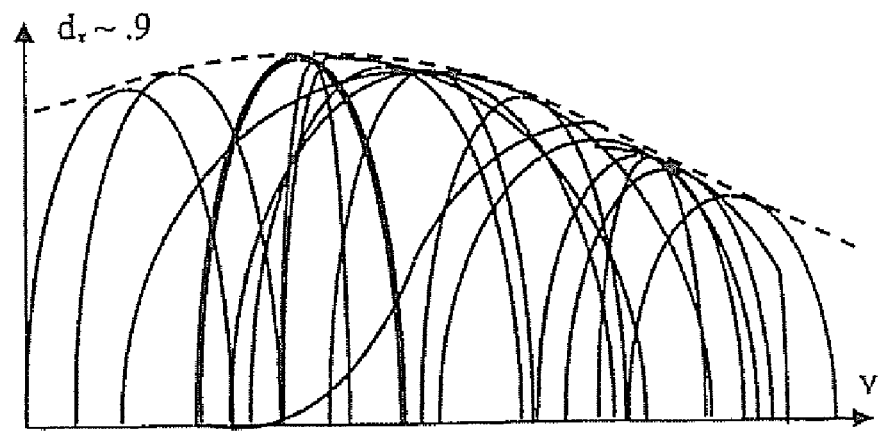
FIG. 23c shows envelopes of possibility where $d_x \sim 0.9$.

Referring to FIG. 23, the basic definition for the envelope of possibility of outputs $B_p*(y)$ may be defined most generally by an arbitrary t-norm t:

$B_p*(y)=\vee_B t[B'(y), M_p(A'\to B'|A\to B)]$

Figure 24:
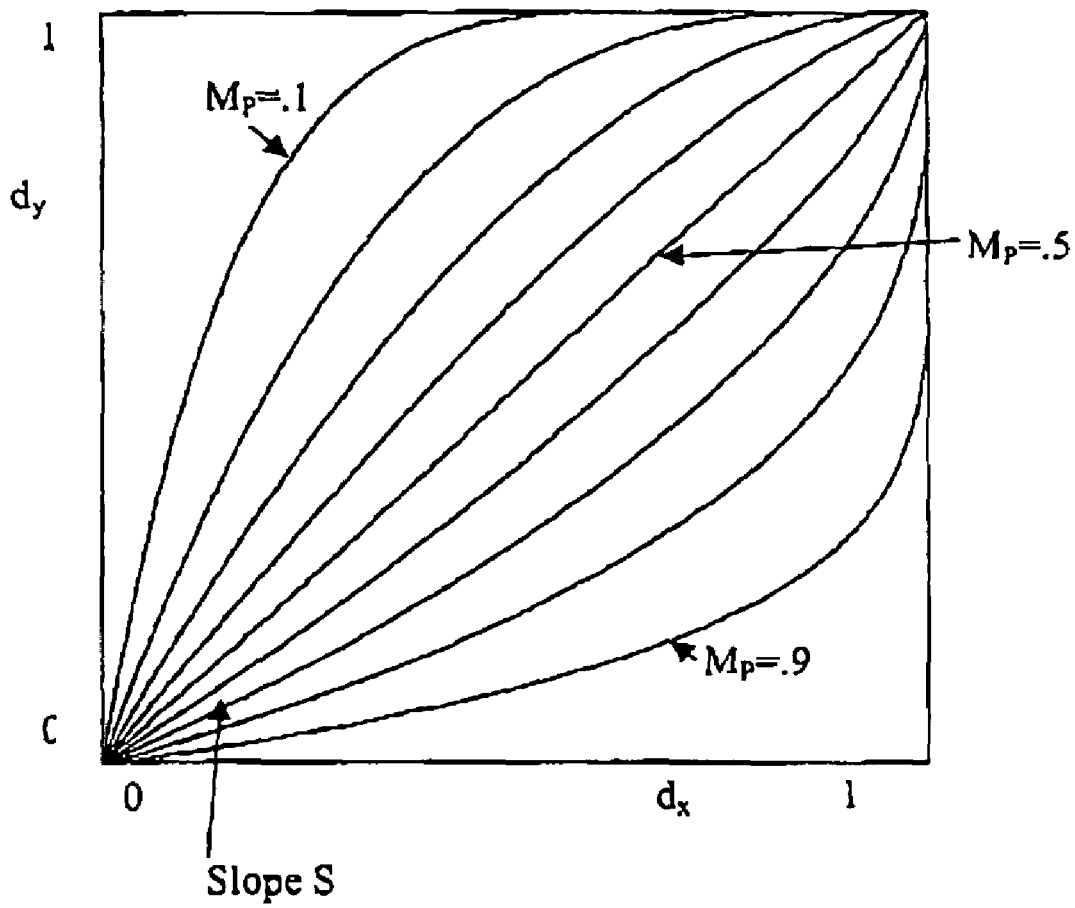
FIG. 24 shows an example of $M_p$
Figure 25A:
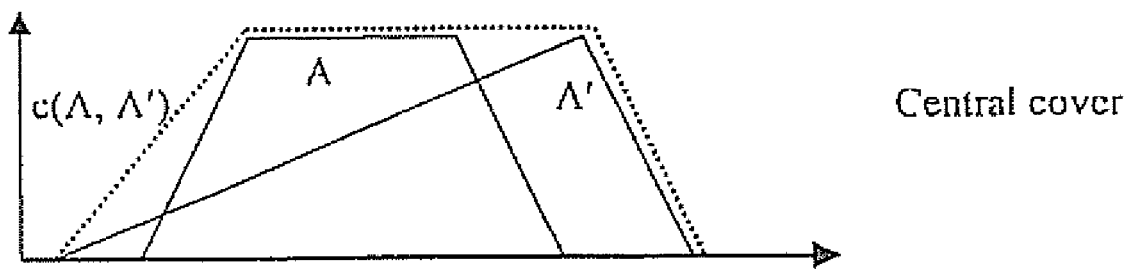
FIGS. 25a and 25b show central cover definitions.
Figure 25B:
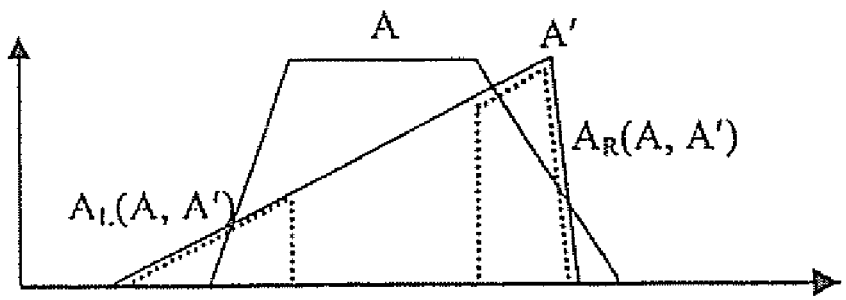
Figure 25C:
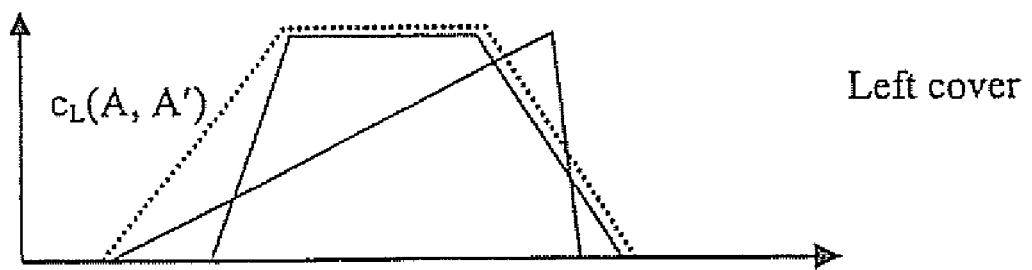
FIG. 25c shows a left cover definition.
Figure 25D:
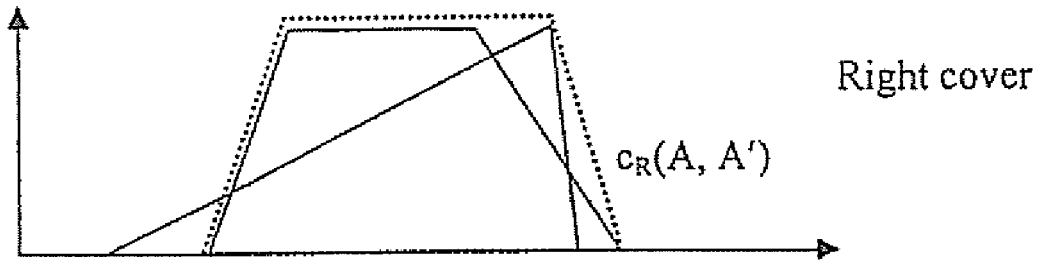
FIG. 25d shows a right cover definition.

Here $M_p(A'\to B'|A\to B)$ is the plausibility of the entailed proposition A'→B', given A→B. The preferred t-norm is the Zadeh t-norm, $t(x1,x2)=\min(x1,x2)$. The symbol $\vee$ stands for "max" unless stated otherwise. B' is any convex member of the power set of Y. For the algorithm $M_p$ is specified as $M_p(d_x(A, A'), d_y(B'))$, or for notational convenience in the following discussion, as $M_p(d_x, d_y)$. The minimal requirements for M, are:

1) $M_p(1, d_y)=1$
2) $M_p(0, d_y)=1$ if $d_y=0$
   =0 otherwise
3) $M_p(d_x, 1)=1$
4) $M_p(d_x, d_y)$ is a nondecreasing function of $d_y$
5) $M_p(d_x, d_y)$ is a nonincreasing fiction of $d_x$ $M_p(d_x, d_y)$ does not have a limit at $(d_x, d_y)=0$. This is an essential feature, not an oversight. FIG. 24 shows an example of $M_p$ There is no unique way of specifying the distance between sets to get the envelope of possibility. The expert must decide according to context.

Different distance measures may be used for $M_p$ and belief, with $M_p$ having the less restrictive one. The superscripts (B) and (P) will distinguish between them. There is no inconsistency in using different distance measures, so long as $d^{(B)}\geq d^{(P)}$. Different distance measures may be used for each dimension of multidimensional inputs. Different measures may be used for input and output.

The classical measure of distance for implication operators is set intersection $d_i(A, A')=1-|A'\cap A|/|A'|$ This is preferred for calculating belief as opposed to plausibility, since belief increases when the fraction of the input lying within experience (the rule input) increases. Moreover, unlike other distance measures to be discussed, it is zero when there is no intersection between the rule input and the input. With this choice of $d^{(B)}$ belief will be zero when the output is the result of extrapolation or interpolation outside experience, indicating a break in the direct chain linking the input data through the rules to the conclusion. On the other hand, if the expert decides that extrapolation or interpolation outside experience is worthy of belief to some degree, then another $d^{(B)}$ should be selected.

A factional set intersection is defined as:

$d_{1f}(A, A')=[1-|A'\cap A|/|A'|]/(1-|A|/|X|)$

It is arrived at by renormalizing $d_1(A, A')$ so that $d_1(A, X)=1$.

Set intersection measures what fraction of the intersection of A and A' is contained in A, rather than the extension of A' outside A, which is desired for estimating the envelope of possibility. The more of A' that lies outside A, and the further away it lies, the more $B_p*(y)$ will spread outside B(y).

Set intersection fails as a distance measure when A is a point set located at x, denoted by x*, although it has no problems when A' is a point set. In addition, there are computational difficulties associated with solving explicitly for the envelope $B_p*$.

Define c(A, A'), the central cover of A and A', as the smallest fuzzy set on X such that both A and A' are entirely contained in it and no alpha-cut consists of more than one segment.

Figure 26:
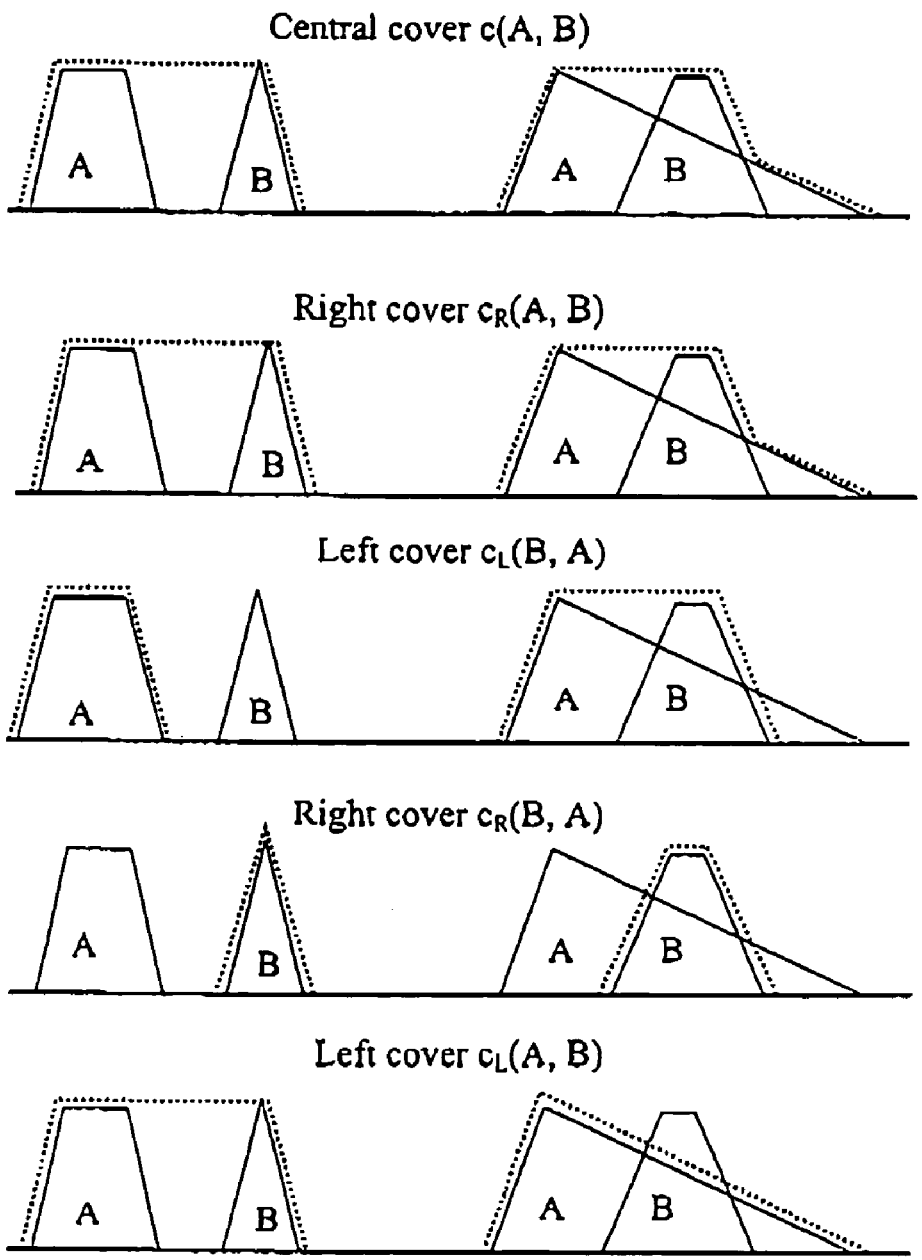
FIG. 26 shows standard cover definitions

Referring to FIG. 26, right, left and central standard covers will now be described. Unless otherwise stated, covers are assumed to be standard.

Referring to FIG. 25, it is also useful sometimes to define the cover as the smallest convex set such that both A and A' are completely contained in it. This is known as the alternate cover, and it must be used to determine $d_y$ to represent fractal systems. If it is not used for $d_y$, then the support of $B_P*(y)$ will always be infinite if $d_x>0$ regardless of the choice of $M_P$. A finite support for $B_P*(y)$ therefore requires a certain choice for $M_P$ together with the alternate definition for the cover in calculating $d_y$. To denote this distinction subscript c will be replaced by subscript c'. This alternate definition is computationally less convenient but is required for representing fractal behavior.

Define $A'_R(A, A')$ as the part of A' located to the right of the normal part of A, and $A'_L(A, A')$ as the part of A' located to the left of the normal part of A. Define the right and left covers as $$c_R(A, A')=c(A, A'_R(A, A'))$$

$$c_L(A, A')=c(A, A'_L(A, A'))$$

Define the absolute cover-distance as $$d_{cda}(A, A')=\max(|c_R(A, A')|-|A|, |c_L(A, A')|-|A|)$$

Figure 12:
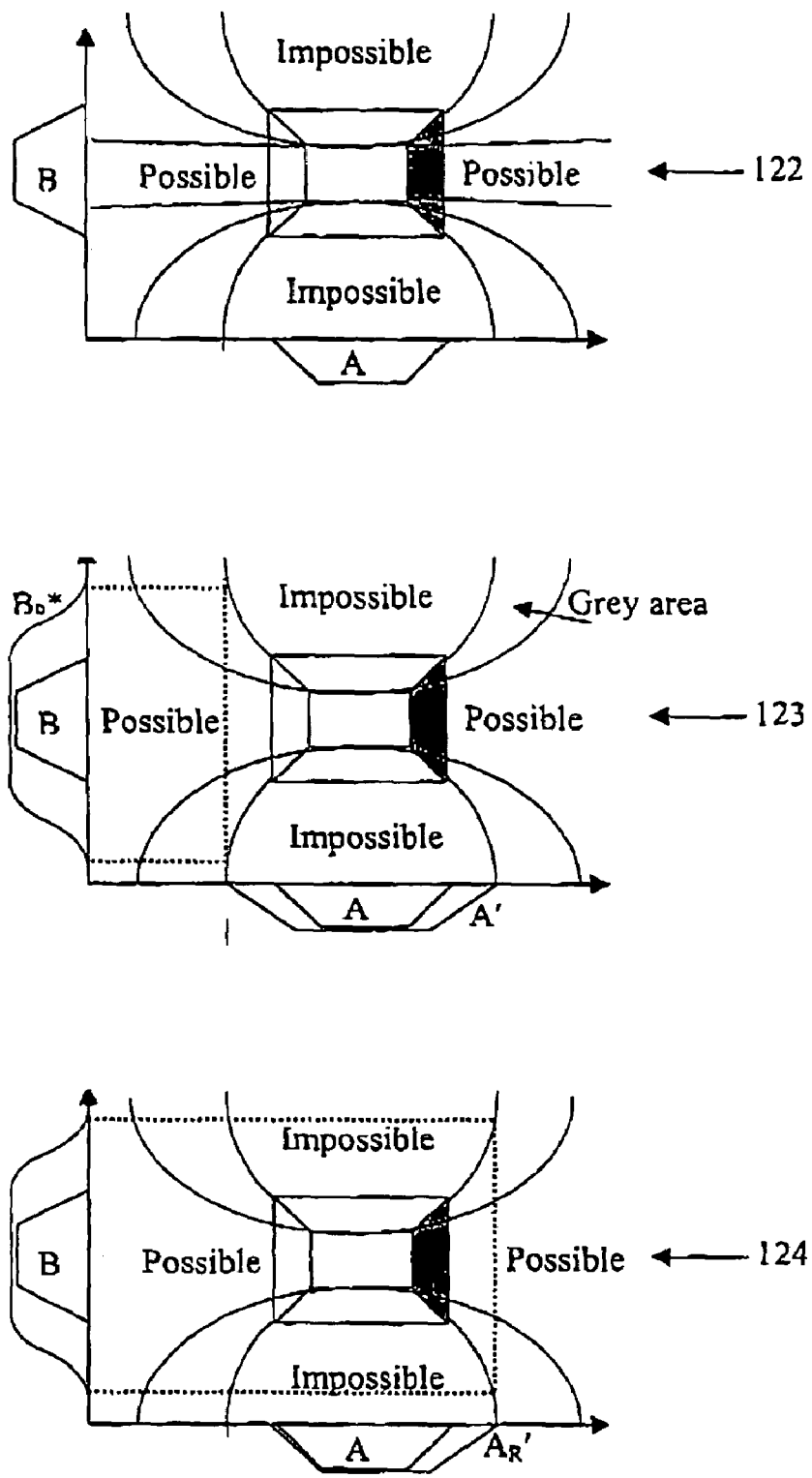

FIG. 12 depicts the reason for the introduction of right and left covers.

Suppose the relationship between y and x is unknown, but is subject to a fuzzy constraint that limits the maximum possible value of the absolute value of dy/dx near the region in the (x,y) plane corresponding to the rule A→B. The curved lines in 122, 123, and 124 show some of the functions that satisfy these constraints. It follows that the points in the fuzzy set A' cannot be mapped onto points outside the fuzzy envelope $B_P*$. It also follows that the fuzzy set $A'_R$ must be mapped onto the same fuzzy envelope $B_P*$ as A' itself if A' is symmetric about A. Since $B_P*$ spreads outside B by an amount dependent on $d_x$, $d_x$ must be defined so that $$d_x(A,A')=d_x(A,A'_R)=d_x(A,A'_L)$$

whenever $$|c_R(A, A')|-|A|=|c_L(A, A')|-|A|$$

This requirement is met by making $d_x$ a function of $$\max(|c_R(A, A')|, c_L(A, A')|)$$

It is not met if $d_x$ is simply a function of c(A,A'), hence the need for right and left covers.

This $d_{cda}(A, A')$ is an absolute measure. It has the advantage of computational simplicity and is meaningful whether or not A and A' are point sets.

Linear and relative normalized distance measures will now be discussed. A set of normalized distances will now be defined in terms of covers.

Define the relative cover-distance as $$d_{CR}(A, A')=\max(1-A|/|c_R(A, A')|, 1-|A|/|c_L(A, A')|)$$

Define the alternate relative cover-distance, to be used for fractal systems, as $$d_{CR}(A, A')=\max(1-|A|/|c_R(A, A')|, 1-|A|/|c_L(A, A')|)$$

where the alternative definition of covers (FIG. 25) is used for $d_y$, unlike all other cover-distance definitions.

Define the linear cover-distance as cover-distance normalized by the cardinality of the universe:

$$d_{cL}(A, A')=d_{cda}(A, A')/|X|$$

Define the fractional linear cover-distance as cover-distance normalized by the cardinality of the complement of A:

$$d_{cLf}(A, A')=d_{cda}(A, A')/(|X|-|A|)$$

If it is necessary to make sharp distinctions between sets comprising almost all elements of X, then $d_{cLf}$ rather than $d_{cL}$ should be used. For example, if |A|=0.95|X| and |A'|=0.99|X|, then $d_{cLf}$ will indicate a large distance between A and A', whereas $d_{cdL}$ will indicate they are very close.

Define the fractional relative cover-distance as cover-distance normalized by the cardinality of the complement of A:

$$d_{cRf}(A, A')=d_{cR}(A, A')|X|/(|X|-|A|)$$

Measures normalized by |X|−|A| should be used when the expert wants total ignorance about the input (i.e. A'=X) to translate total ignorance of the output (i.e. $B_P*$=Y with belief=0).

These cover-distances measure the fraction of A' containing new elements of X outside A, elements which are mapped to an unknown region in Y. Although they appear to give a proposition an unlimited zone of influence, in reality, $M_P$ can be defined so that once A' is sufficiently distant from A, $M_P$=1 for all B', hence the zone of influence can be made finite.

Distance measures can be combined in order to create a smooth bridge between point data (typical of examples) and fuzzy data. The relative distance measure cannot cope with the situation where A is a point set, that is, where A is a set with only one single value. It sets $d_{CR}(A, A')=0$, regardless of A', if A is a point set To deal with this problem, a hybrid distance measure is introduced:

$$d_{hyb}(A, A')=(1-\lambda)d_{cdL}(A, A')+\lambda d_{CR}(A, A'), \text{ where}$$
$$\lambda=|A|/|X|$$

This makes it possible to reason continuously from point data to logarithmically scaled fuzzy sets. If examples or rules with very narrow fuzzy sets are to be accorded the same zone of influence while relative cover-distance is used, then hybrid distance measure should be used.

The complements of convex fuzzy sets, described below, require slightly modified distance functions. Rule inputs and outputs are often expressed in terms of the complements of fuzzy sets, for example, "if latitude θ is not near the equator, then temperature T is not very hot". Hence, it is necessary to define d(N(A), A'), where N(A) is the complement of a fuzzy convex set A. Since N(A) is not necessarily convex, the previous definition of cover-distance cannot be used because it dictates that d=0 for all A'.

Figure 13:
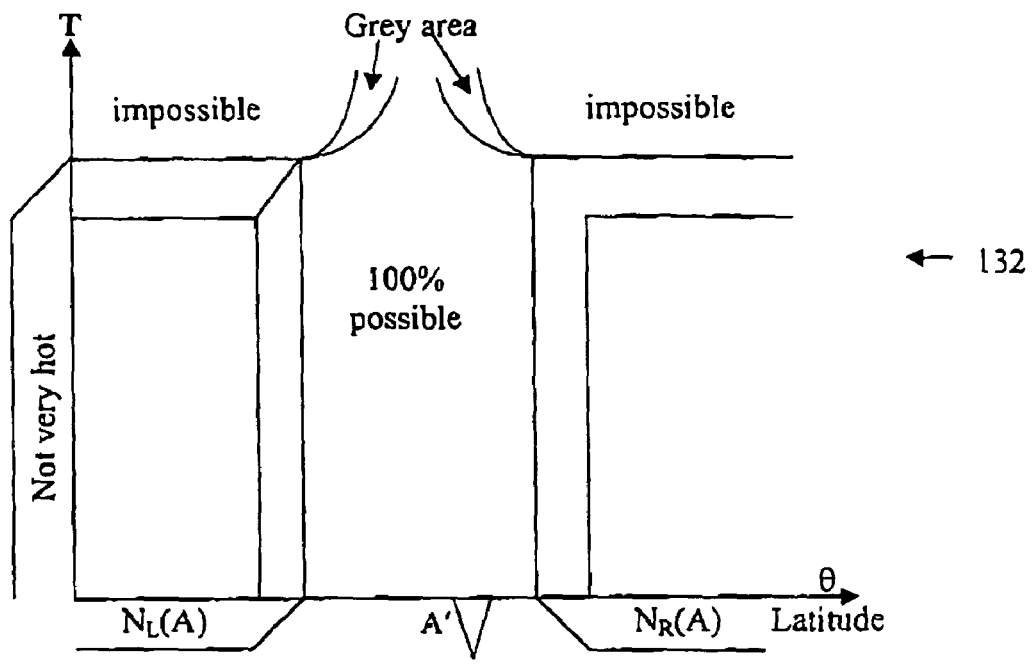
FIG. 13 shows the generation of distance functions for the complements of convex fuzzy sets
Figure 13:
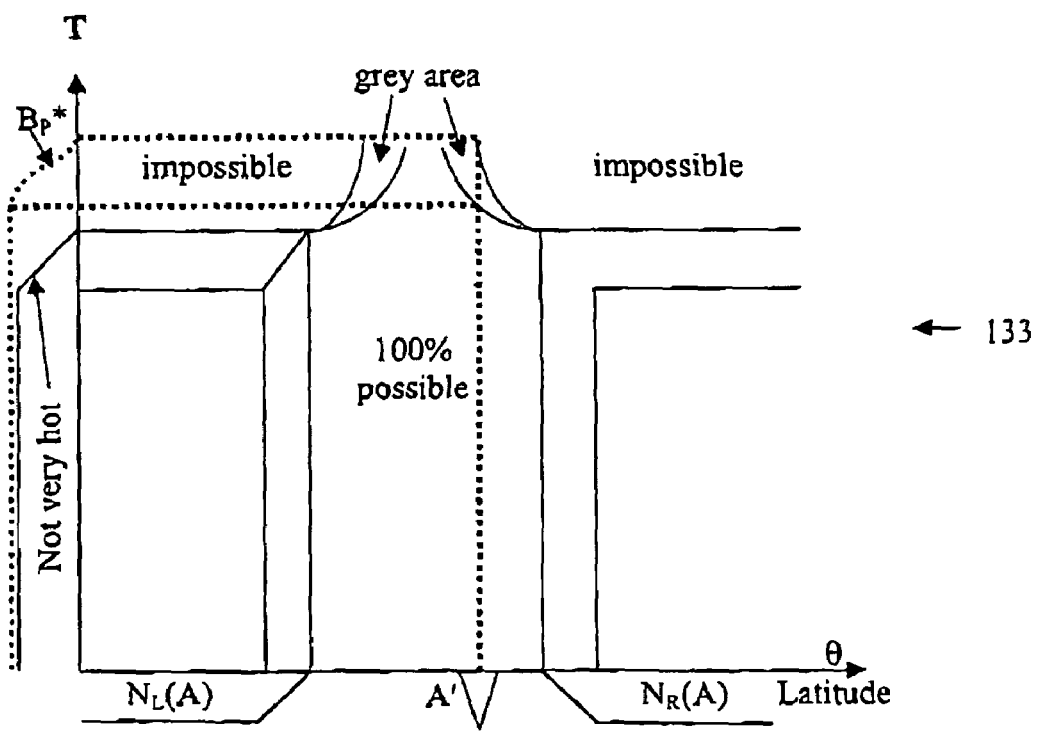

Referring to FIG. 13, 132 shows a graph where the curved dotted lines show the relationship between latitude and temperature that are consistent with "if θ is not near the equator then T is not very hot" and a fuzzy constraint on dT/dθ.

It is clear from graph 133 that the width of the fuzzy envelope of possible temperatures depends on the smaller of the two distances, $d_x(N_R(A), A')$ and $d_x(N_L(A), A')$.

The following distance definition will therefore generally suffice for rule inputs which are complements:

$$d(N(A), A')=t(d(N_R(A), A'), d(N_L(A), A'))$$

where d is any of the distance measures discussed above.

For rule output that is a complement of a convex set, two values are required:

$$d(N(B), B')=(d_c(N_R(B),B'), d_c(N_L(B), B'))$$

Figure 14:
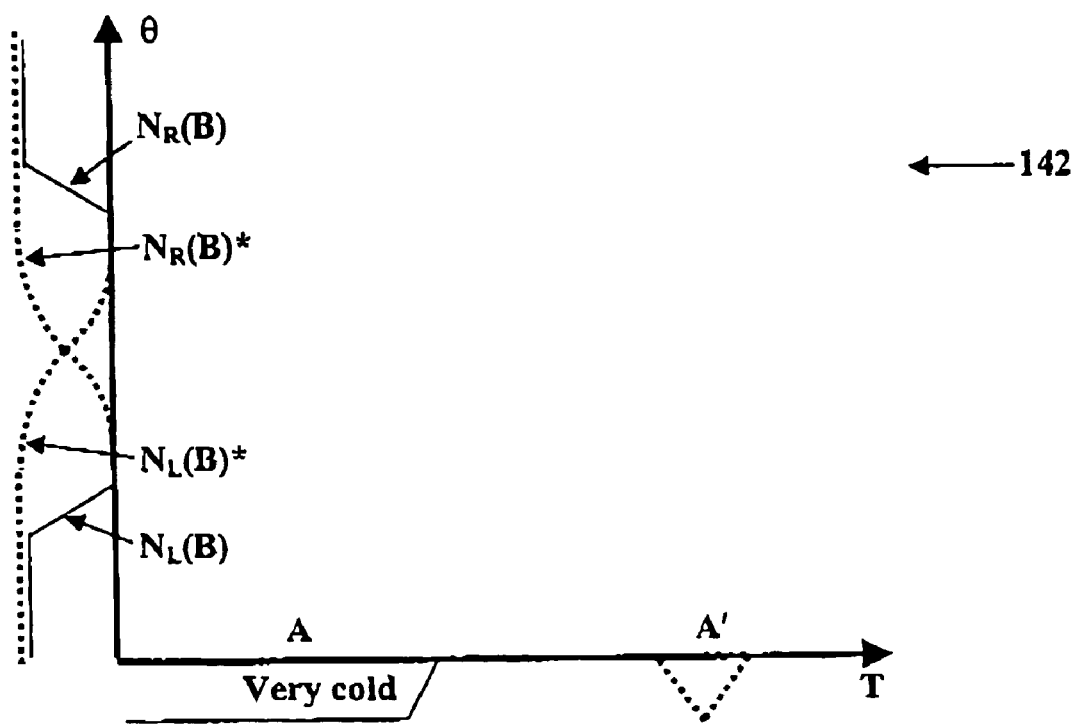
FIG. 14 shows how $B_P^*$ is formed from $N_L(B)^*$ and $N_R(B)^*$
Figure 14:
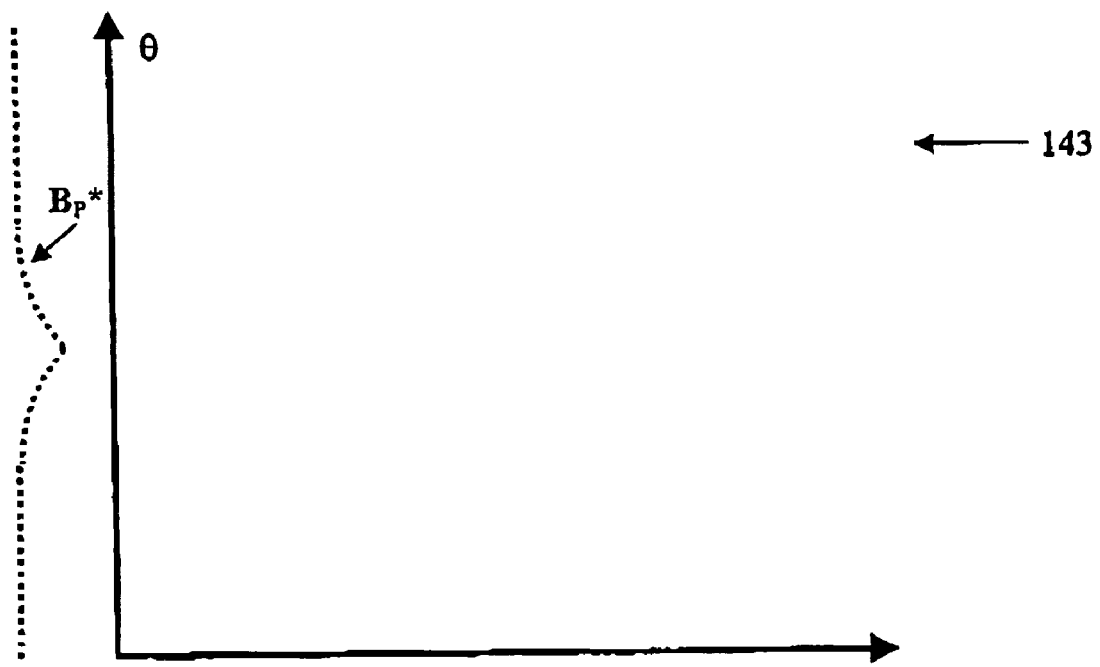

Referring to FIG. 14, diagram 142, consider "if T is very cold then θ must be very far from the equator". Here $N_L(B)$ and $N_R(B)$ are the two polar caps, and A is "very cold" There are two envelopes of possibility, one spreading around $N_L(B)$ and one spreading around $N_R(B)$.

The reason for keeping two separate values is that the final $B_P^*(y)$ is formed by a union of the two fuzzy envelopes, $N_R(B)^*$ and $N_L(B)^*$, resulting in a non-convex $B_P^*$, which is shown by 143. Hence the basic definition of $B_P^*(y)$ is modified:

$$B_P^*(y) = \{\vee_B t[B'(y), s(M_P(A' \to B'|A \to N_R(B))]\} \cup$$
$$\{\vee_B, t[B'(y), s(M_P(A' \to B'|A \to N_L(B))]\}$$
$$= \vee_B, t[B'(y), s[M_P(A' \to B'|A \to N_R)),$$
$$M_P(A' \to B'|A \to N_L(B))]]$$

Each of the two $M_P$ require their own distance function, $d_c(N_R(B), B')$ and $d_c(N_L(B), B')$. Here $s(x1,x2)$ is a fuzzy t-conorm. For computation, this result merely signifies that $N_R(B)^*$ and $N_L(B)^*$ need to be calculated separately and combined with some fuzzy t-conorm, preferably the Zadeh conorm since it can be done without reconstituting a set from its alpha-cuts.

Figure 7:
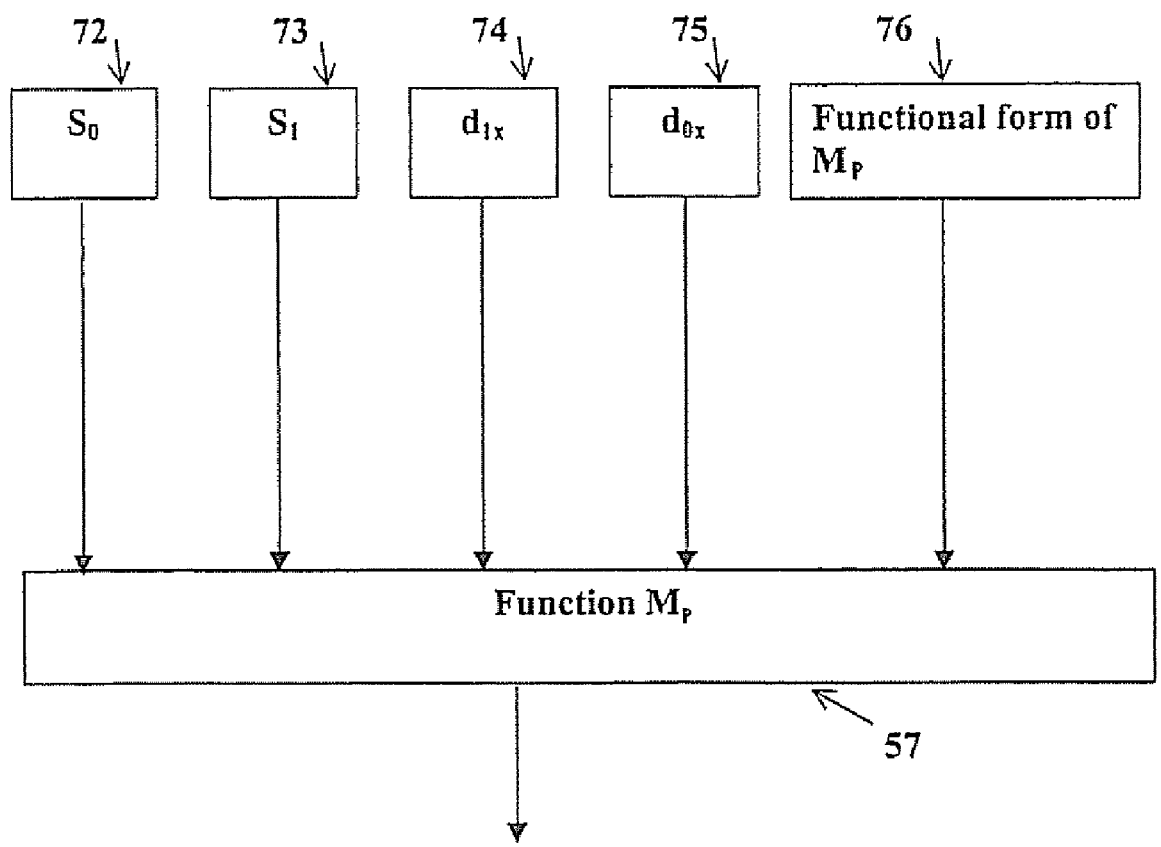
FIG. 7 shows the parameters required that define $M_p$

Another parameter that the expert must define is the kernel $M_p$, or equivalently the way in which the envelope of possibility for a given alpha-cut spreads as a fraction of the distance between the input and the rule input. Once a functional form 76 for $M_p$ is chosen then $M_p$ is fully defined by $S_0$ 72, $S_1$ 73, $d_{x0}$ 75, $d_{x1}$ 74 which are the set of parameters depicted in figure 7.

The general requirements for $M_P$ were discussed earlier as part of the discussion of distance functions. The expert must understand the relationship between the shape of the envelope of possibility and the definition of $M_P$. The following theorem shows how to construct $B_P^*(y)$ for a given $M_P$.

Theorem 1

Figure 27:
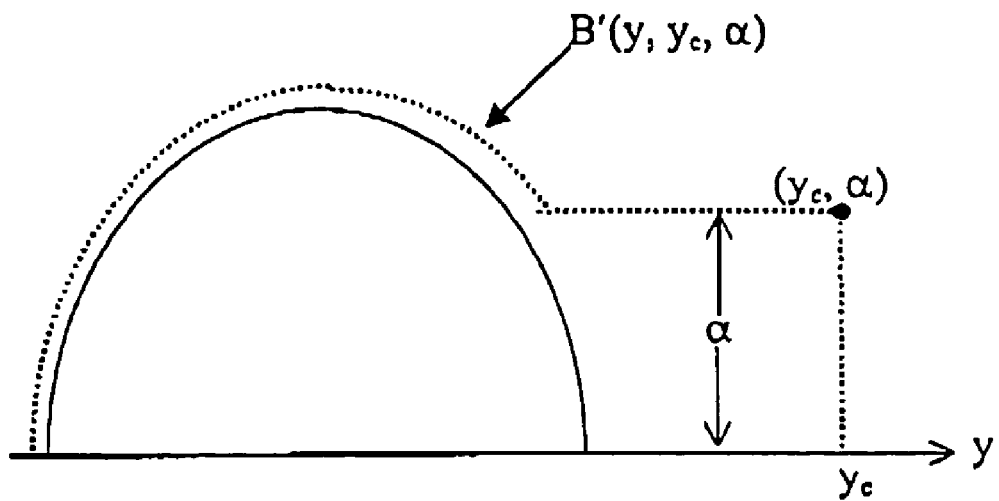
FIG. 27 shows the $B_R'(y, y_c, \alpha)$ that is used for the standard cover
Figure 27:
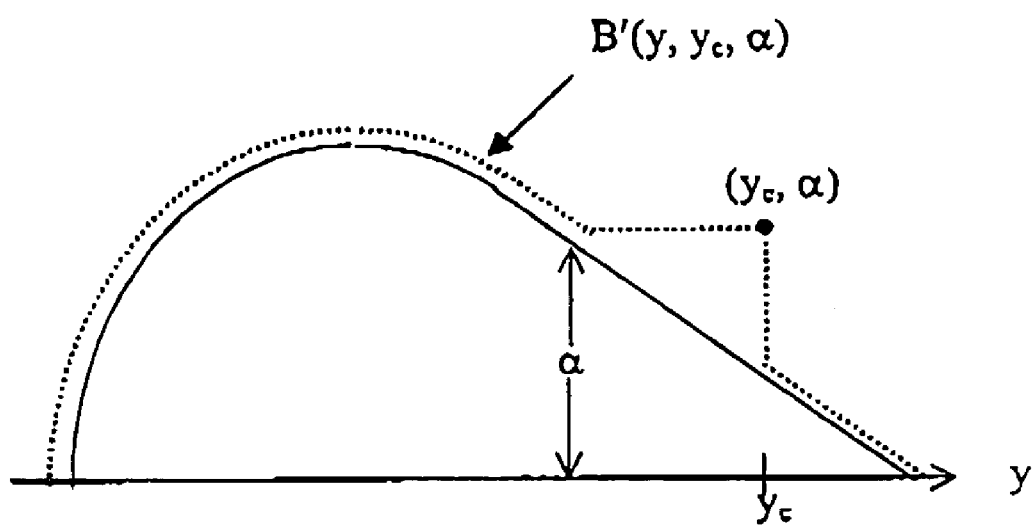

If the t-norm used in the basic definition of $B_P^*(y)$ is the Zadeh t-norm, and $M_P$ is a continuous function of $d_y$, except at $d_x=0$, and $d_y$ is a cover-distance measure, and the $B_R'(y, y_x,\alpha)$ are as defined in FIG. 27, then the right boundary $y_{R\alpha}$ of the alpha-cut of the envelope $B_P^*(y)$ are defined by the largest solution of $\alpha=M_P(d_x, d_y(B, B'_R(y, y_{R\alpha},\alpha))$. The left boundary $y_{L\alpha}$ is defined analogously using a $B'_L(y, y_c,\alpha)$ that extends to the left of B rather than to the right.

The FIG. 27 shows the $B_R'(y, y_c,\alpha)$ that is used for the standard cover. If the alternate cover is desired, then $B_R'(y, y_c,\alpha)$ shown in FIG. 33 would be used instead.

The theorem permits the expert to see how the envelope spreads for a given $M_P$ and $d_x$. It also permits the expert to select the desired spreading pattern, for example a bell curve with a standard deviation dependent on $d_x$, and construct the corresponding $M_P$ from it to verify that $M_P$ is chaotic or continuous.

Figure 28:
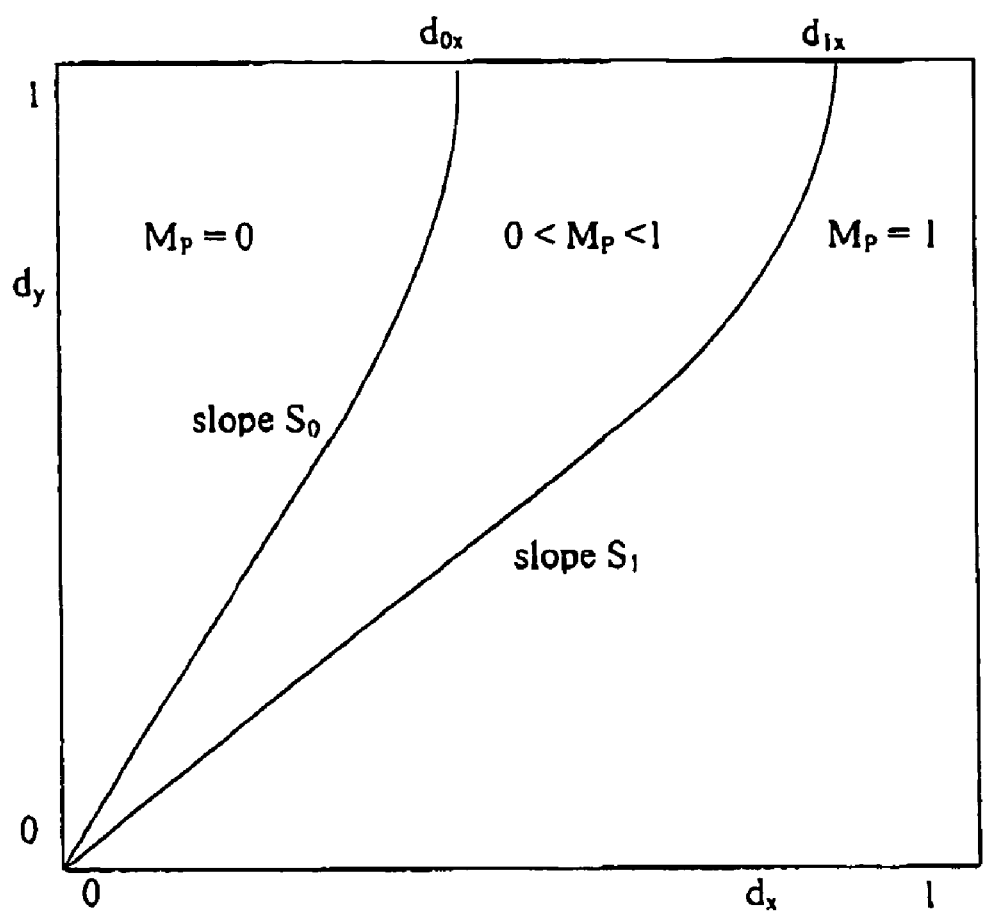
FIG. 28 shows how the intercepts ($d_{0x}$, and $d_{1x}$) of $M_P$ are defined

Referring to FIG. 28, the functions $M_p(d_x,d_y)$ may be characterized by the shapes of the contour lines defined by $M(d_x, d_y)$=constant and by their intercepts on the $d_x$ axis. For those $M_P$ for which the contour lines approach the point (0,0) with non-zero first derivatives, these families of curves may be defined by $d_y=M_P^{-1}(S, d_x)$ where S is the slope of the contour line in the limit as $d_x \to 0$. Since $M_P$ can also be inverted to yield $d_y=d_y(M, d_x)$ it follows that $M_P$ is completely characterized when a function $f_m(S)$ is defined that assigns a value of M to a contour line characterized by a slope S at the origin.

Figure 29:
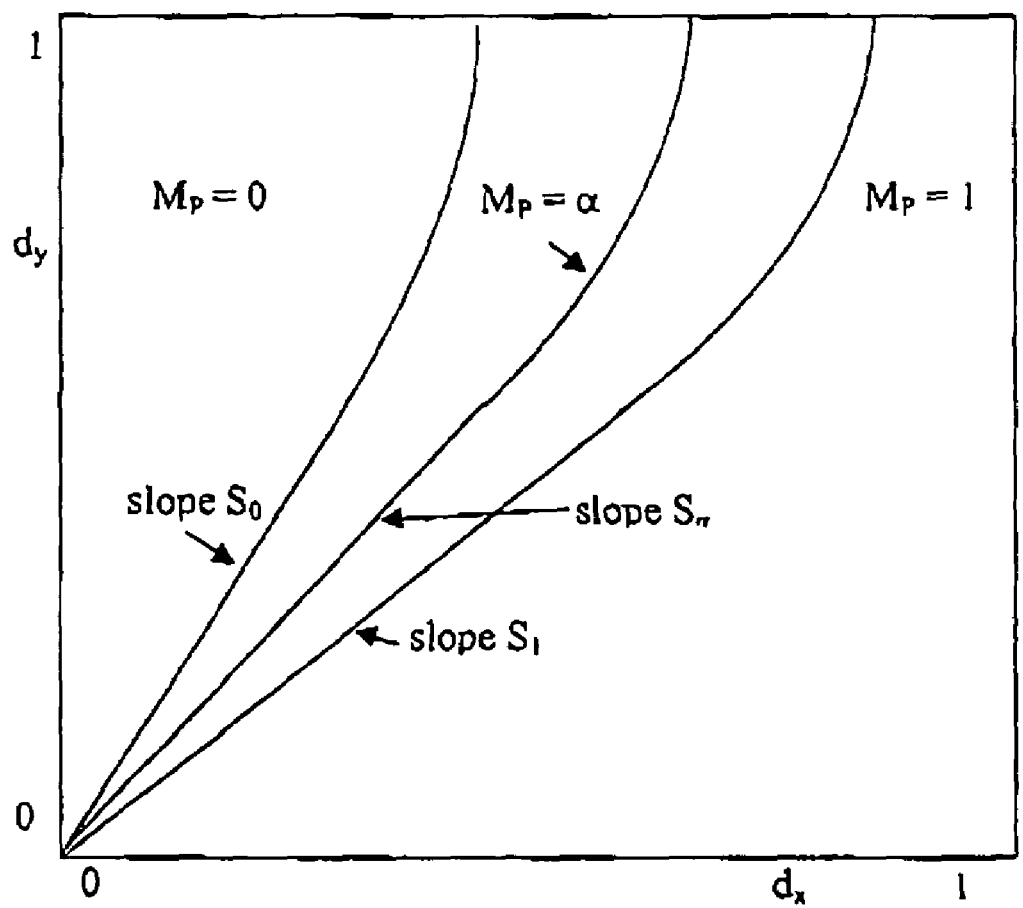
FIG. 29 shows the behavior of $M_P$ near dx=0 and dy=0
Figure 30:
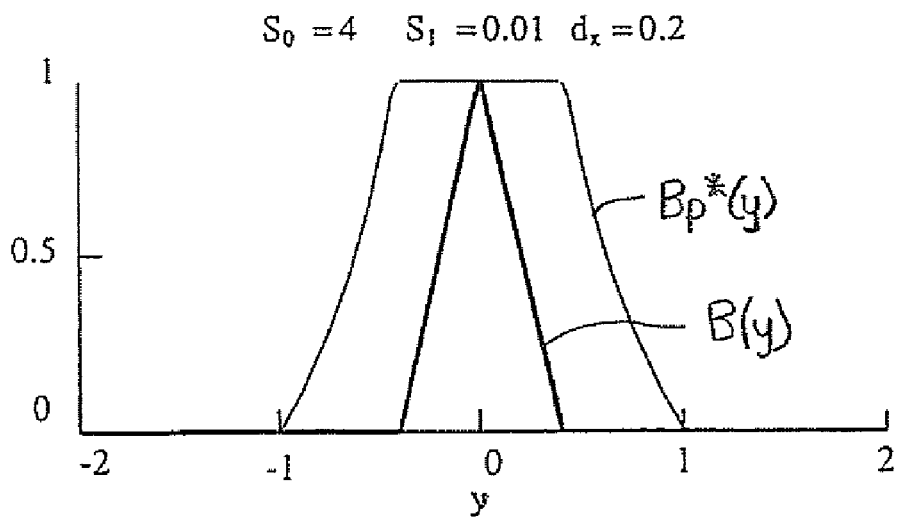
FIG. 30 shows how the function $M_P$ near (0,0) is used to encode the rate spread $B^*(y)$ around the original output $B(y)$
Figure 30:
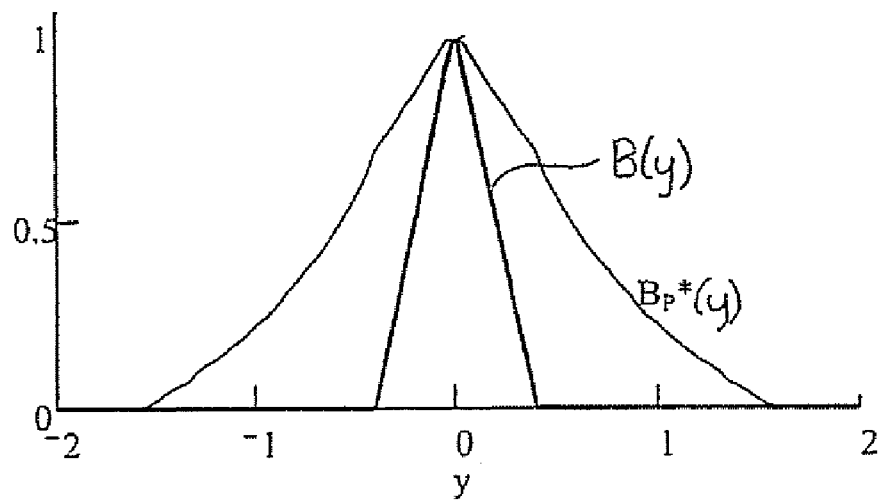

Referring to FIG. 29, $S_0$ and $S_1$ define the fuzzy limit on the absolute value of the rate of change of $d_y$ with respect to $d_x$ in the limit as $d_x \to 0$. $d_y/d_x<S_1$ is 100% possible, and $d_y/d_x>S_0$ is 0% possible. $S_\alpha$ determines the rate at which the alpha-cut $\alpha=f_m(S)$ of $B(y)$ spreads for $d_x$ near zero. Referring to FIG. 30, it can be seen that the function $M_P$ near (0,0) is used to encode the rate of spread of $B_P^*(y)$ around the original output B(y) as the input A' moves an infinitesimal distance from the rule input A.

Figure 31:
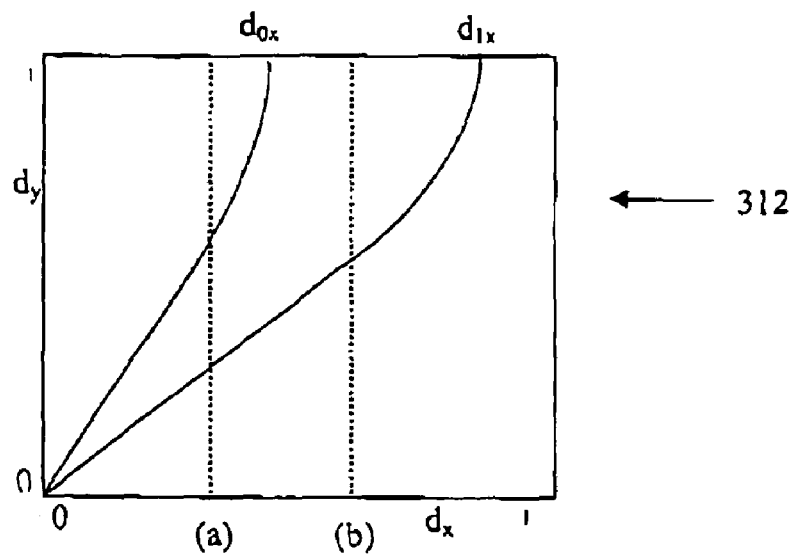
FIG. 31 shows how the intercept $d_{0x}$ of $M_P$ on the 0, axis determines at what value of $d_x$ the infinite flat tails first appear
Figure 31:
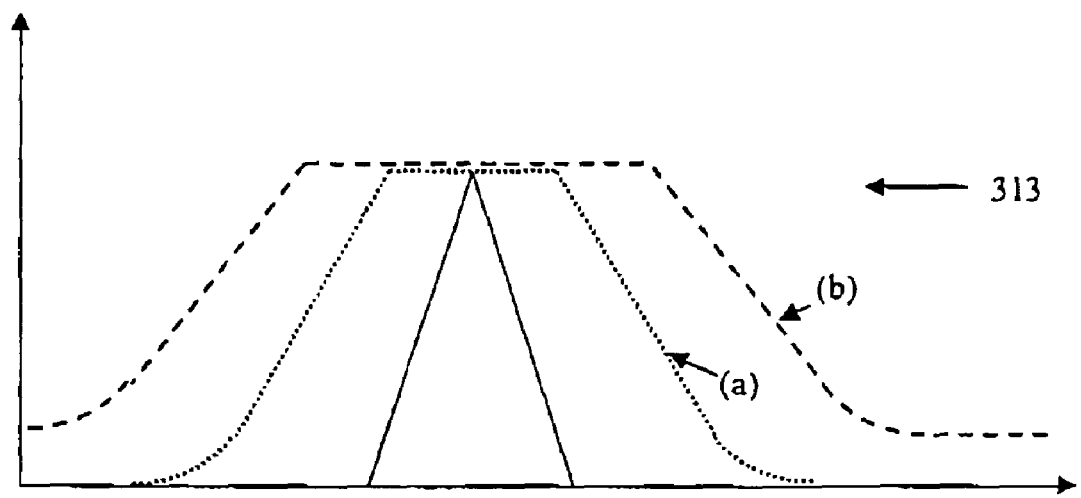

The intercept $d_{0x}$ of $M_P$ on the $d_x$ axis determines at what value of $d_x$ the infinite flat tails firs appear, as is shown by diagrams 312 and 313 in FIG. 31. The intercept $d_{1x}$ of $M_P$ on the $d_x$ axis determines at what value of $d_x$ the height of the tails becomes unity. Whether $M_P$ is chaotic or not is not determined solely by the existence of tails on $B_P^*(y)$. An explanation as to how $M_p$ encodes chaotic systems will be shown as a specific example of $M_P$. If the system is being used to encode policy, then certain characteristics of $M_P$ are related to the degree of rigidity or latitude desired for the interpretation of the policy. If $\int d\, d_y d_x M_P(d_x,d_y) <<1$, then almost all actions except the ones spelled out explicitly in the policy or arrived at by interpolating the policy are forbidden, even when the policy does not cover the situation very well. If this integral is close to unity, then people interpreting the policy are left pretty much to their own judgement when they are in a situation not exactly covered by the policy.

Generally, $M_P$ can be made to be dependent on other parameters. This would require additional derivation.

If desired, a suitable choice of $M_P$ can reproduce some of the currently used implication operators as special cases, for example, the Zadeh implication:

$$B_P^*(y)=\min(1, 1+d_x+B(y))$$

$M_P$ also encodes the desired amount of chaos or continuity. If $A \to B$ entails $A' \to B'$, it follows that $A' \to B'$ entails further hypotheses $A'' \to B''$ even more remote from $A \to B$, and that these $A'' \to B''$ entail further hypotheses $A''' \to B'''$, ad infinitum. It also follows that there are infinitely many paths from $A \to B$ to $A' \to B'$ through a chain of intermediate hypotheses. Chains of any length n are possible. The strength of the connection between $A \to B$ and $A' \to B'$ can be written recursively in terms of the strengths of each intermediate link in the chain:

$$M_P(A' \to B'|A \to B)^{(n)} = \min_* \max_0 \cdot t[M_P(A'' \to B''|A''' \to B''')^{(0)}]$$

where the t-norm is taken to be the Zadeh t-norm in the discussion of recursion, and $M_P(A' \to B'|A'' \to B'')^{(0)}$ is the zeroth order function, referred to earlier as $M_P$.

In a chaotic system, it may be possible for $A' \to B'$ to be entailed from $A \to B$ by one big jump, a "leap of logic", even if it can't be entailed through a chain of intermediate hypotheses, each differing from its predecessor by a small step. The appropriate entailment function for a chaotic system is defined an $M^{(0)}_P$ such that $M^{(0)}_P(d(A, A'), d(B, B')) > M^{(n)}_P(d(A, A\infty), d(B, B'))$. This inequality leads to the following conditions on $M_P$ for it to be chaotic or continuous or somewhere in between:

Theorem 2

Figure 32:
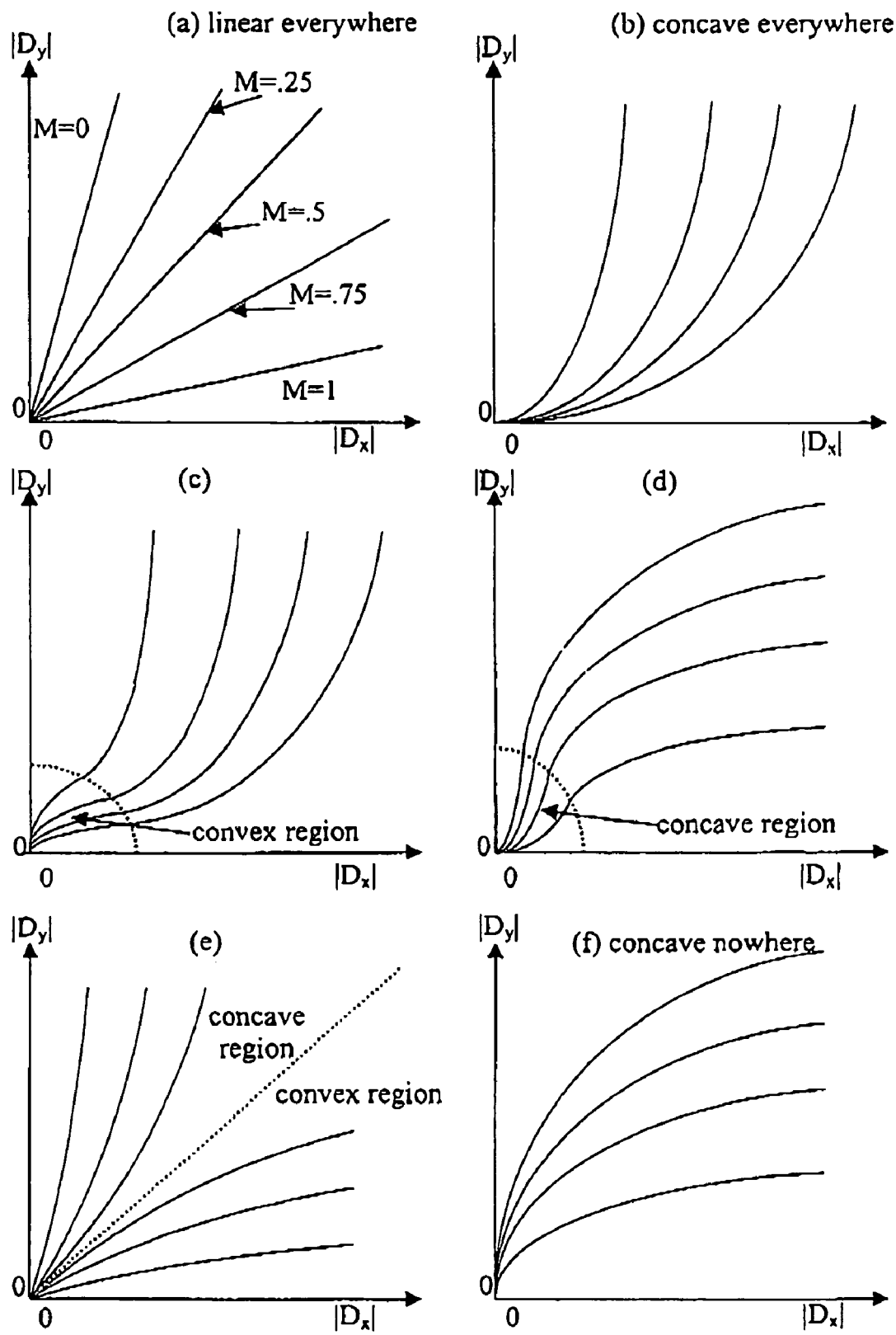
FIG. 32 depicts Theorem 2.

Referring to FIG. 32, define $M_L$ as a transformation of $M_P$ such that $M_L(D_x,D_y)=M_P(d_x,d_{where\ D=ln}(1-d))$.

If relative cover distance is used as distance measure, and if $M_L$ is nowhere concave (case (f)) then $M_L^{(0)}=M_L^{(n)}=M_L^{(\infty)}$.

If $M_L$ is linear everywhere (case (a)) or concave everywhere (case (b)), then $M_L^{(a)}(D_x, D_y) \leq M_L^{(0)}(D_x/n, D_y/n)$, with equality occurring if linear everywhere. (Note that if $M_P$ is linear, then $M_L(D_x/n, D_y/n)=M_L(D_x, D_y)$.)

If $M_L$ is convex in a finite region of the $D_x$-$D_y$ plane enclosing (0,0) and concave elsewhere (case (c)), then either (1) $M_L^{(0)}=M_L^{(n)}=M_L^{(\infty)}$, if $(D_x,D_y)$ lies within the convex region, or (2) if $(D_x,D_y)$ lies outside the convex region, $M_L^{(n)}$ is a decreasing function of n for n≦some finite value N; for n>N, $M_L^{(n)}$ is a constant, which is less than $M_L^{(0)}$; the further $(D_x, D_y)$ is from this convex region, the larger N will be.

If $M_L$ is concave in a finite region of the $D_x$-$D_y$ plane enclosing (0,0) and convex or linear elsewhere (case (d)), then either (1) $M_L^{(0)}=M_L^{(n)}$ for n≦some finite value N; for n>N, $M_L^{(n)}$ decreases as a function of n, if $(D_x,D_y)$ is outside the concave region (2) $M_L^{(n)}$ is a decreasing function of n for all n, if $(D_x,D_y)$ is inside the concave region. If $M_L$ is convex or linear in an open region that has (0,0) on the boundary (case (e)), and concave in an open region that also has (0,0) on the boundary, then either $M_L^{(n)(D}x, D_y)\leqq M_L^{(0)}(D_x/n, D_y/n)$ or $M_L^{(0)}=M_L^{(n)}$, depending on the location of $(D_x,D_y)$ in the convex or concave regions.

Theorem 3

If linear cover-distance is used as a distance measure, results analogous to Theorem 2 hold about $M_P(d_x, d_y)$.

These theorems guide the expert in selecting an $M_P$ that is chaotic in regions close or far from experience. If the expert starts with a given rate of spread, then the theorems can be used to determine whether the corresponding $M_P$ is chaotic or not. For example, if leaps of logic to remote possibilities are desired only when the input is remote from experience, then $M_P$ should be convex or linear near (0,0) and concave far from (0,0) (case (c)). Given $B_P^*(y)$, it is possible to construct $M_P$ as follows.

The following is an example of the construction of $B_P^*$ from $M_P$ with $M_P$ chosen to reproduce the type of spreading that is characteristic of a pseudo-random Brownian motion, i.e. fractal behavior.

Figure 33:
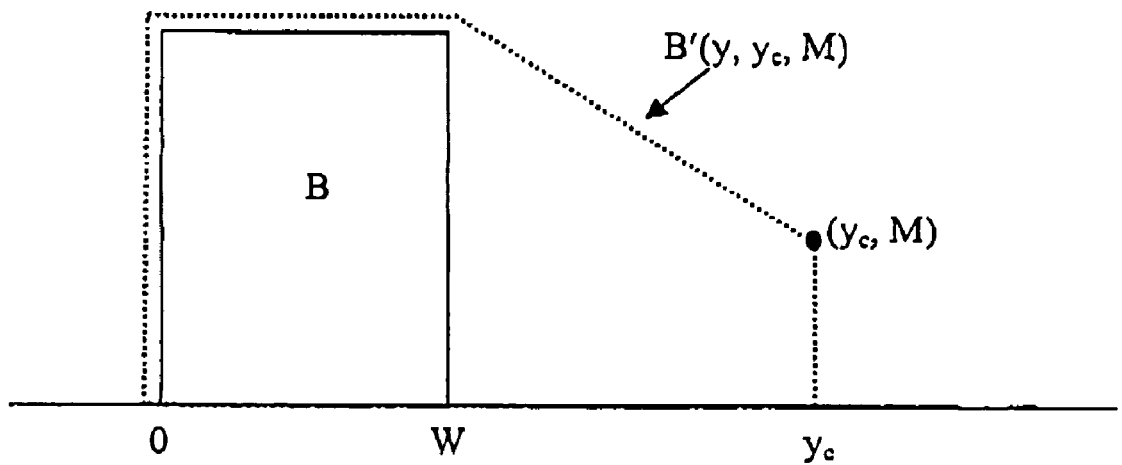
FIG. 33 shows the form of $B'(y, y_c, M)$ for alternate cover definition

Given a linear $M_P$, after transformation of coordinates Dx Dy, defined by, $$M_P(d_x,d_y)=f_m[\ln(1-d_y)/\ln(1-d_x)]$$

and $$f_m(S)=\max[0, \min[1, (S-S_1)/(S_0-S_1)]].$$

the construction of $B_P^*(y)$ is most easily illustrated for the case where B(y) is a crisp set defined by B(y)-1 for 0<y<W. In this case the unknown is $y_c$ as a function of M rather than M as a function of $(d_x,d_y)$. Referring to FIG. 33, $$B'(y, y_c, M)=1-M\,y/y_c \text{ if } y<y_c \text{ and } y>W$$

$$=1 \text{ if } 0<y<W$$

$$=0 \text{ otherwise}$$

since the alternate definition of cover, shown in FIG. 25, must be used to reproduce logarithmic spreading.

$$d_y(B, B')=(y_c-W)(M+1)/2/[(y_c-W)(M+1)/2+W]$$

However, $$d_y(B, B')=M^{-1}(M, d_x)=1-(1-d_x)^{(1-M)(S0-S1)+S1}$$

therefore, $d_y(B, B')$ can be eliminated to get an implicit relation between $y_c$ and M:

$$1-(1-d_x)^{(1-M)(S0-S1)+S1}=(y_c-W)(M+1)/2/[(y_c-W)(M+1)/2+W]$$

which may be solved for explicitly for $y_c$ as a function of M:

$$y_c/W=[(2(1-d_x)^{M(S0-S1)-S0}+M-1]/(M+1)$$

The ordered pairs $(y_c(M), M)$ may be regarded as a parametric representation of the right side of the envelope function (y, B*(y)). The interval $[-y_c(M)+W/2, y_c(M)]$ can also be identified with the alpha-cut $\alpha=M$ of B*(y).

Figure 34:
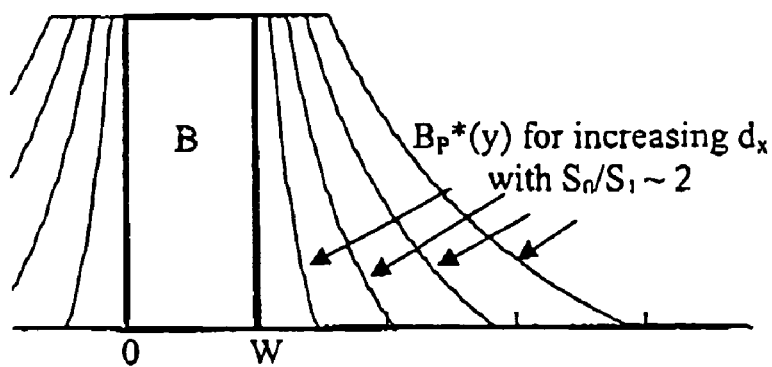
FIG. 34 shows $B_P^*(y)$ for fractal dependence
Figure 34:
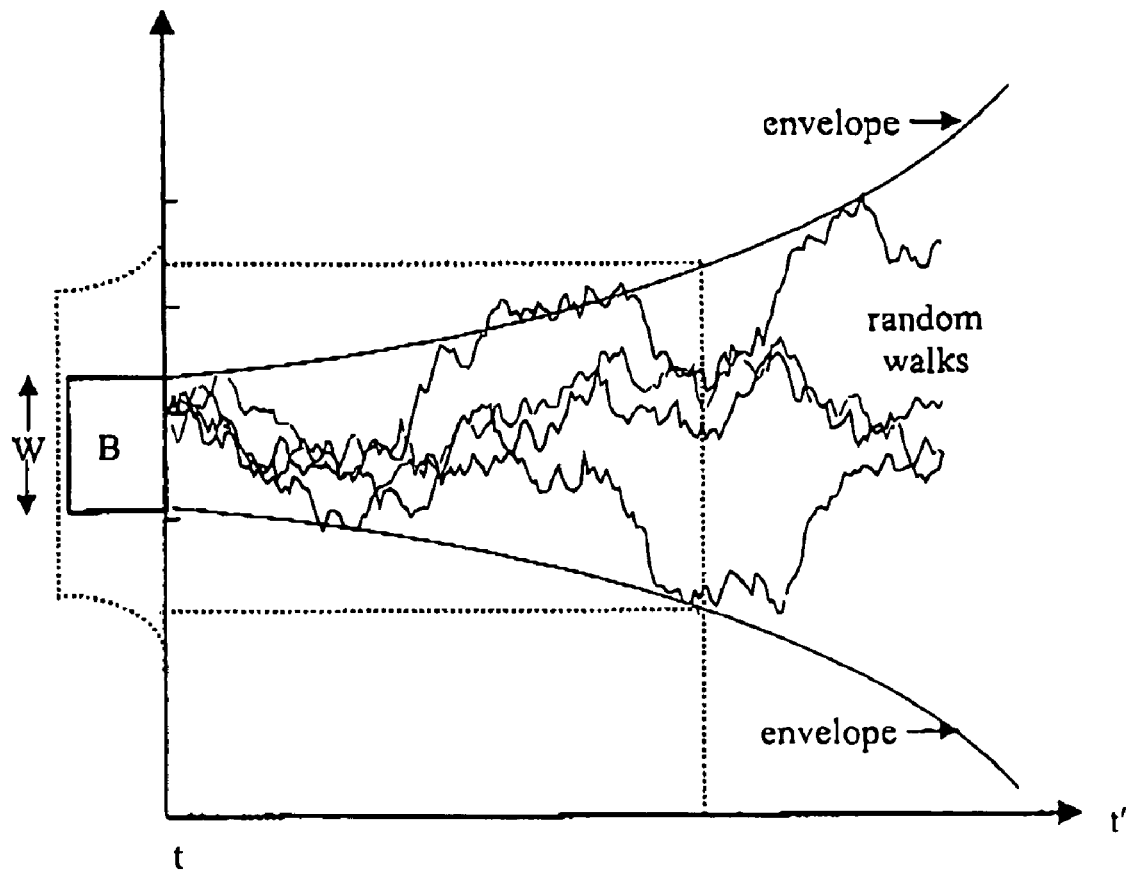

FIG. 34 shows $B_P^*(y)$ and how it defines a fuzzy envelope within which the random walk wanders. Note that $B_P^*(y)$ no longer simply dilates according to $d_x$ as it does when $M_P(d_x, d_y)$ is linear. The outer boundary of $B_P^*(y)(\alpha=0)$ spreads much faster as $d_x$ increases than does the inner core ($\alpha=1$). The relationship is in fact logarithmic, as $d_x$ becomes very large:

$$\ln(y_{c0}/W)/\ln(y_{c1}/W)=S_1/S_0$$

where $y_{c0}$ is the smallest value of |y| such that B*(y)=0 and $y_{c1}$ is the largest value of |y| such that $B_P^*(y)=1$. Note that $$y_{c1}/W=(1-d_x)^{-S1}$$

These logarithmic scaling relationships are the basis for the claim regarding the suitability of relative cover-distance for describing fuzzy sets of fractional dimension. The relationship to fractals may be seen as follows by considering fractional Brownian motion (Fractals, Jens Feder, Plenum Press, 1998) as an example. A variable y(t') undergoing such a pseudo-random one-dimensional random walk has a variation of increments given by $$V(t')\sim(t'-t)^{2H}$$

where H is the fractional dimension, 0<H<1, and $$V(t')=<[y(t')-y(t)]^2>$$

If the time t'-t elapsed since the last position measurement is equated to c(A,A'), and $V(t')^{1/2}$ is equated with R(B*), defined as the RMS deviation of the envelope $B_P^*(y)$ of possible positions at time t', one should therefore find $$R(B^*)\sim c(A,A')^H$$

Now $R(B^*)\sim(1-d_x)^{S0}$ if $S_1$ is not wildly very from $S_0$. Since $1-d_x$ is defined as A/c(A 1/(t'-t), $S_0$ may be identified with the fractional dimension.

If the expert system is used to calculate an envelope of possibility for systems whose behavior resembles a random walk with some long-term correlation with past events, as is characteristic of systems with 1>H>0, then relative cover-distance using the alternate cover definition (FIG. 25) is clearly the appropriate distance measure, and the linear $M_L$ is the right function. Concave $M_L$ is not appropriate here because for such Brownian systems, y(t') may wander far from y(t) but does so in a series of small steps, not in large leaps Concave ML is suitable for systems where discontinuity is a possibility.

So far only one rule has been discussed. Curve fitting is required when the system interpolates/extrapolates between the user input and sparse rules in order to obtain the envelope of possibility. The expert must define the interpolation method for curve fitting. The choice of curve-fitting procedure depends on the expert's judgment, any knowledge about the relation between input and output, and the degree of sparsity of the rules/examples. For example, a predictive method may be used for the extrapolated part of the curve, while a polynomial fit could be applied for interpolation. Polynomial or linear regression is also possible, if it is not considered essential to reproduce the rule output exactly when the input matches the rule input exactly Regression is in fact required if the equations are over-determined, as would occur with an inconsistent rule set. If it known that a certain relation holds approximately between output and input, for example "travel time is inversely proportional to speed", then this relation should be used for curve fitting rather than some arbitrary polynomial.

If there is only one data point (rule or example), hence only one rule to be fitted, then the output is constant and equal to the rule output, unless a trend is defined by the expert If there are insufficient points for fitting, or if the points are not independent, then the curve fit can still be fully specified by adding a requirement to maximize, using Lagrange multipliers, the y-component of the gradient of the surface to be fitted, subject to constraints, namely the sparse rules to be Te following example is for two-dimensional input:

Three points define a plane in $R^3$. Suppose there are only two points $v_1$ and $v_2$, for fitting where $$v_1=(x_{11}, x_{12}, y_1)$$

$$v_2=(x_{21}, x_{22}, y_2)$$

The plane passing through these points must satisfy $\hat{n}\cdot(v_1-v_2)=0$, where $\hat{n}=(n_1, n_2, \sqrt{1-n_1^2-n_2^2})$ which is one equation with two unknowns, $n_1$ and $n_2$.

Maxmization of $\sqrt{1-n_1^2-n_2^2}$ subject to the constraint $\hat{n}\cdot(v_1-v_2$ multipliers leads to a unique solution for $\hat{n}$.

Figure 35:
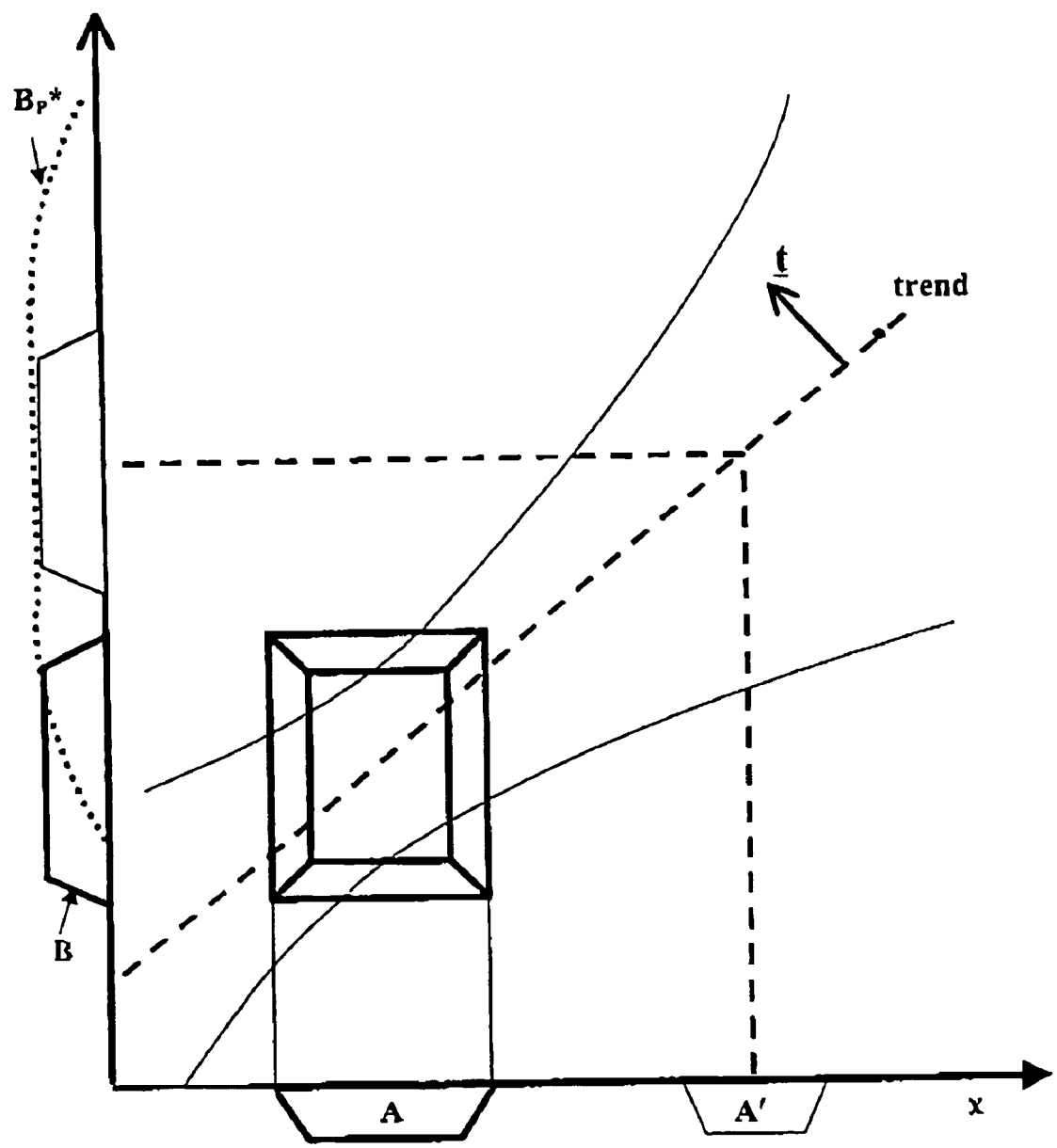
FIG. 35 shows the situation where the expert wishes to represent a linear trend t for a rule

If the expert wishes to represent a linear trend, then instead of maximizing $n_y$, the quantity to maximize would be $\hat{n}\cdot t$, where t defines the trend, shown by FIG. 35.

Figure 10:
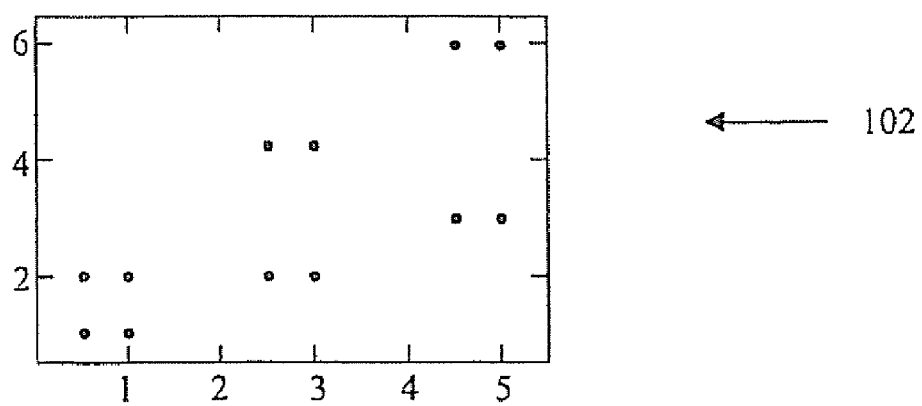
Figure 10:
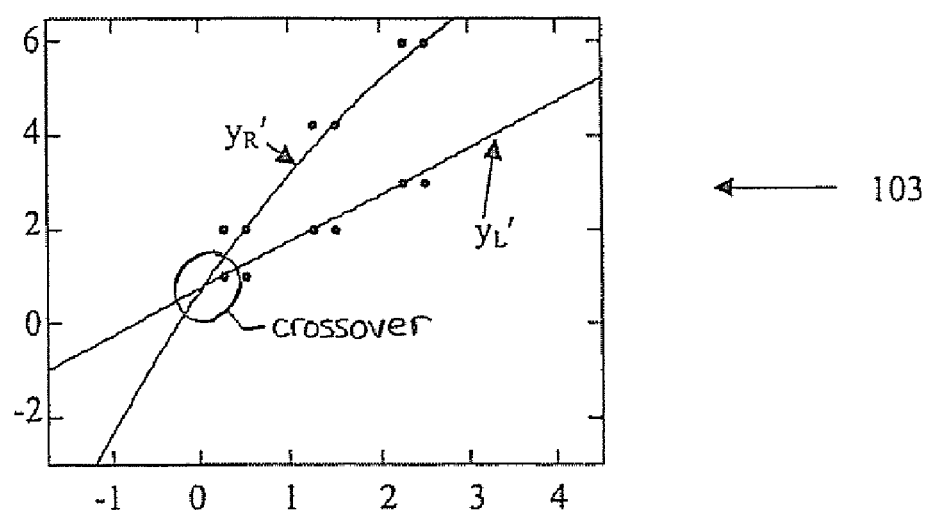
Figure 10:
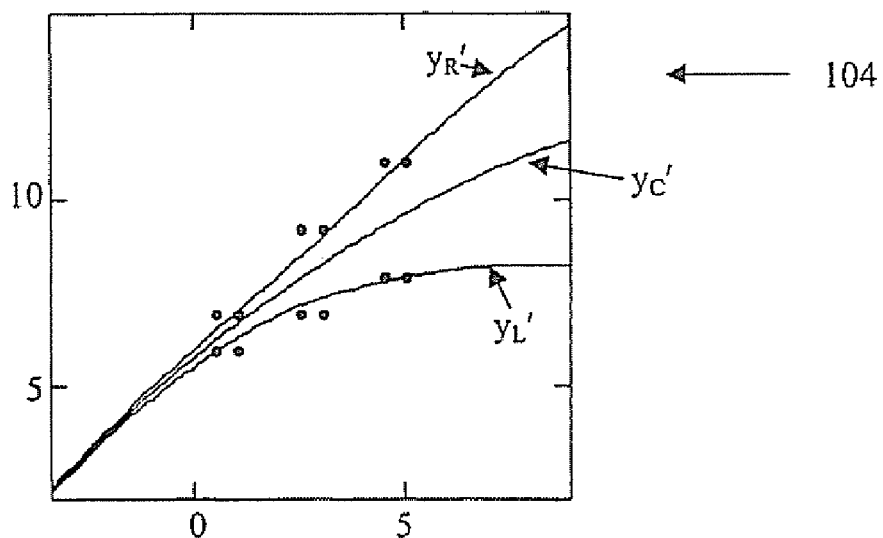

The expert must also choose a minimum allowed width $w_\alpha$ for each alpha-cut for the output. This minimum is applied to the result of interpolation, not to $B_P^*t(y)$. It is possible for interpolation to cause crossover or unrealistically narrow outputs. Referring to FIG. 10, graph 102 shows curve fitting from three rules, for a given alpha cut. Graph 103 depicts the crossover that occurs because $y'_L > y'_R$. The $w_\alpha$ will be used to deal with this crossover at step 44. Graph 104 shown the curves after the crossover prevention is applied. For interpolated probabilities, a set of minimum widths for each alpha-cut can also be chosen, or the minimum widths can simply be set to zero.

The expert must also decide whether interpolation or an alternate method should be selected for a set of rules/examples. Interpolation may be inappropriate when the set of rules actually consists of examples that are scattered and not sparse. If the alternate to interpolation is chosen, then an envelope of possibility is calculated surrounding each rule output, and the aggregate output envelope is the fuzzy average of these envelopes, with the weight for the example j being $1-d_x(A_j, A', \kappa_j)$. "Fuzzy average" means that the envelopes are treated as fuzzy numbers on which arithmetic operations are performed. If the alternate method is selected for a particular rule block, and this rule block deals with scattered and/or non-sparse examples, then the same distance function should be used for $d^{(B)}$ and $d^{(P)}$ with cover-distance preferred.

The expert must choose a set of alpha-cuts 401, since almost all the algorithm's calculations are performed on the alpha-cuts of the inputs and the rules, and $B_P^*$ is also calculated as alpha-cuts. There must be at least two alpha-cuts (top and bottom), more if greater accuracy is desired.

Figure 36:
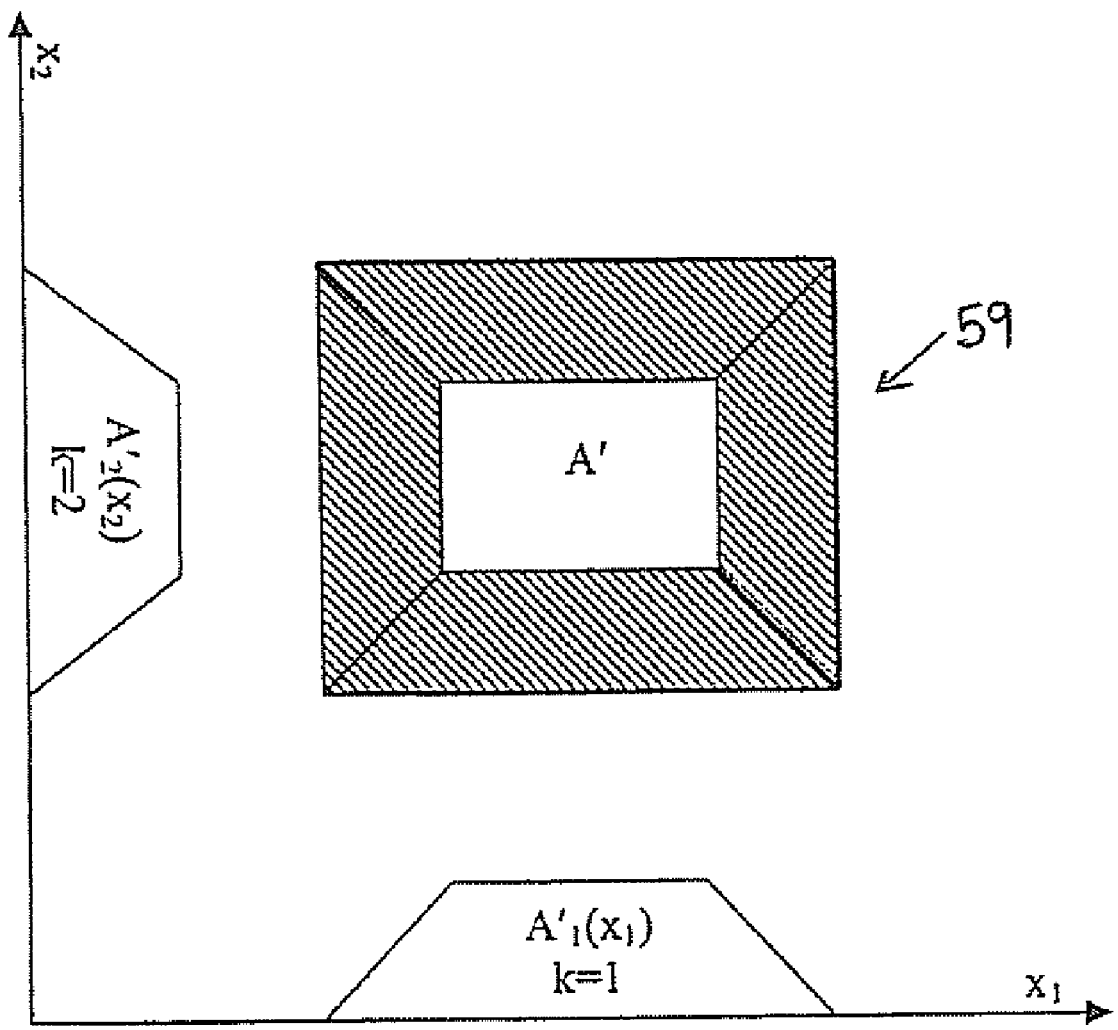
FIG. 36 shows multidimensional inputs $A_k$

Referring to FIG. 36, weights and weighting function 59 must also be specified when there are multidimensional inputs. A multidimensional conjunctive rule input $A_j$ is defined by $A_j = \Pi A_{kj}$, where the dimensions of the input are indexed by k and the rule input by j. Weighting is explained as follows. Even when people have only very vague ideas about the functional dependence of an output on several inputs, they can usually say with confidence that some of the inputs are more relevant than others, meaning that the output changes more rapidly as a function of those inputs. For example, without knowing how many dollars an upstairs bathroom adds to the price of a house, one can still say it is less relevant than the house location. These ideas are expressed mathematically by metrics such as this example using an Euclidean metric:

$$d_x(A_j, A') = [\Sigma W_k d_{xk}^q]^{1/q}/[\Sigma W_k]^{1/q}, 1 \leq q < \infty, 0 \leq W_K \leq 1$$

where $$d_{xk} = d_x(A_{jk}, A'_k)$$

is the distance between the k'th dimension of the rule input j and the k'th dimension of the input. Different distance functions may be assigned to different dimensions.

The $W_k$ are selected by the expert to reflect the relative sensitivity of the each dimension of the rule input. If $W_k$ is small, it means that $A_k'$ is uninfluential or irrelevant. If input k is not very relevant, then not knowing input k exactly should do little to widen the envelope of possibility of the output. q and the $W_k$ together with $S_0$ and $S_1$ determine the fuzzy constraint on the maximum allowed rate of change of the output with respect to the input k.

Figure 37A:
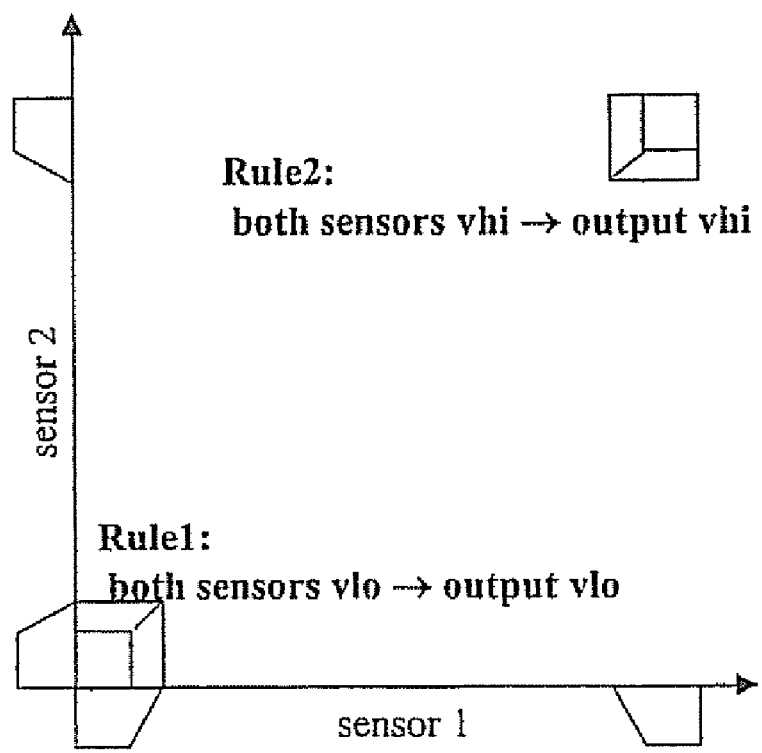
FIG. 37a shows a relationship between sensors for a Rule 1 and Rule 2.
Figure 37B:
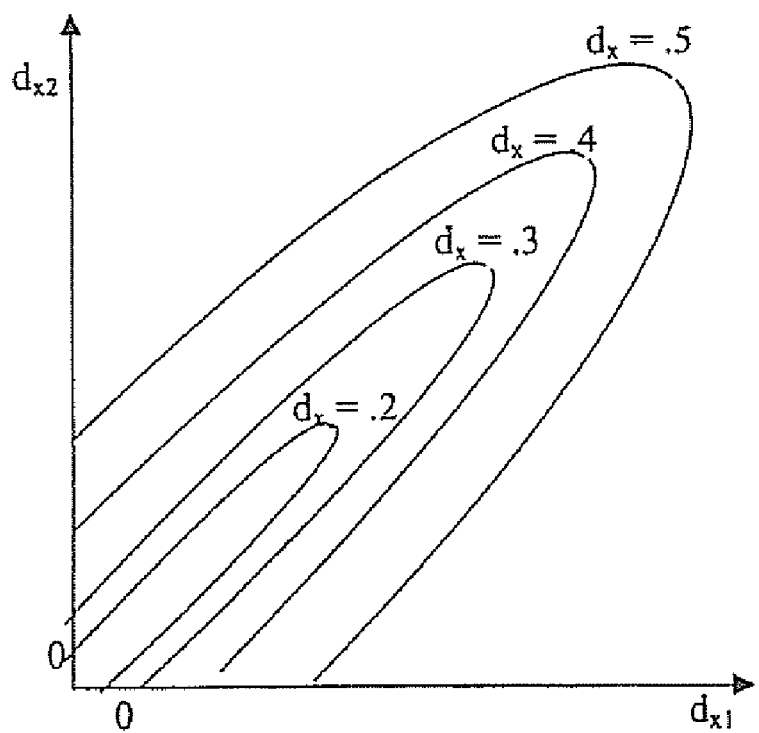
FIG. 37b shows an ellipsoidal choice for $d_x$ where a concordant set of inputs leads to a narrow envelope of possibility.

There are obvious generalizations of the metric, for example, a rotation of coordinates:

$$d_x = [\Sigma W_{km} d_{dm}^{q/2} d_{xk}^{q/2}]^{1/q}, 1 \leq q < \infty$$

where the matrix $W_{km}$ is real and symmetric with positive eigenvalues, and appropriately normalized. The surface in input space corresponding to a constant degree of spread in the possibility envelope is then a rotated ellipsoid centered about the rule input. A very narrow ellipsoid aligned with the diagonal of a hypercube should be used when the inputs represent the same measurement from different sources (e.g. triplicate sensors, opinions on the same issue by several experts), and these inputs are being assessed for concordance, and the output is supposed to be the aggregate of these different sources. If this ellipsoid is chosen, then a concordant set of inputs will lead to a narrow envelope of possibility; if the inputs disagree, there will be a wide envelope of possibility spreading around the average. This is shown in FIG. 37.

To represent certain information, the substitution of $$\max[0, (d_{xk}-W_k)/(1-W_k)]$$

for $d_{xk}$ may be necessary. This equation should be used for a rule of the type "If input k is true or nearly true, and the other inputs are true, then B is true". For example, one may say "A good quarterback must run fast and throw well, but throwing well isn't as critical as running fast, as long as he can run fast, it suffices if his throwing ability is above a certain threshold." This relationship is in accord with the generally accepted idea of "compensation" in the fuzzy literature. It should be clear that an expert can modify the distance function as required to represent information about sensitivity to various dimensions of the input.

Multidimensional rules may be expressed in terms of disjunctive inputs, e.g. $A_1$ or $A_2$ implies B. In that case a different function must be used to aggregate the $d_k$. With the help of another distance-aggregating function, distance from a rule with disjunctive input can be formulated. For example, distance from a rule input such as ($A_1$ or $A_2$) would be represented most simply as:

$$d_x((A_1 \text{ or } A_2), A') = d_{x1} d_{x2} = d_x(A_1, A'_1) \, d_x(A_2, A'_)$$

or some other t-norm. The Zadeh t-norm is unsatisfactory here because of its insensitivity to the larger of the inputs.

Variations on this formula can be used to the express subtle caveats characteristic of human reasoning. For example, if one wished to make the output more sensitive to input 2 than to input 1, one can write:

$$d_x = d_{x1} \min(1, d_{x2}/(1-W_2))$$

Another relationship in which input 2 is more important than input 1 is expressed by:

$$d_x = d_{x2} \max[0, (d_{x1} - W_2)/(1-W_1)]$$

This equation expresses the relationship "If input 2 is true or nearly true, or input 1 is true, then B is true". It should be clear that an expert can modify the distance function as required to represent information about sensitivity to various dimensions of the input.

The expert must select a t-norm $t^{(B)}$ for aggregating belief and another t-norm $t^{(P)}$ for calculating an aggregate distance between the input and the rule inputs, this distance to be used for calculating spreading. The Zadeh t-norm is not recommended. $t^{(B)}$ must be at least as conservative as $t^{(P)}$, meaning that $t^{(B)} \leq t^{(P)}$.

If the system is to be used for process control where the controller output is a real variable, the expert must specify a defuzzification method for going from $B_P^*(y)$ to a crisp output.

Figure 15:
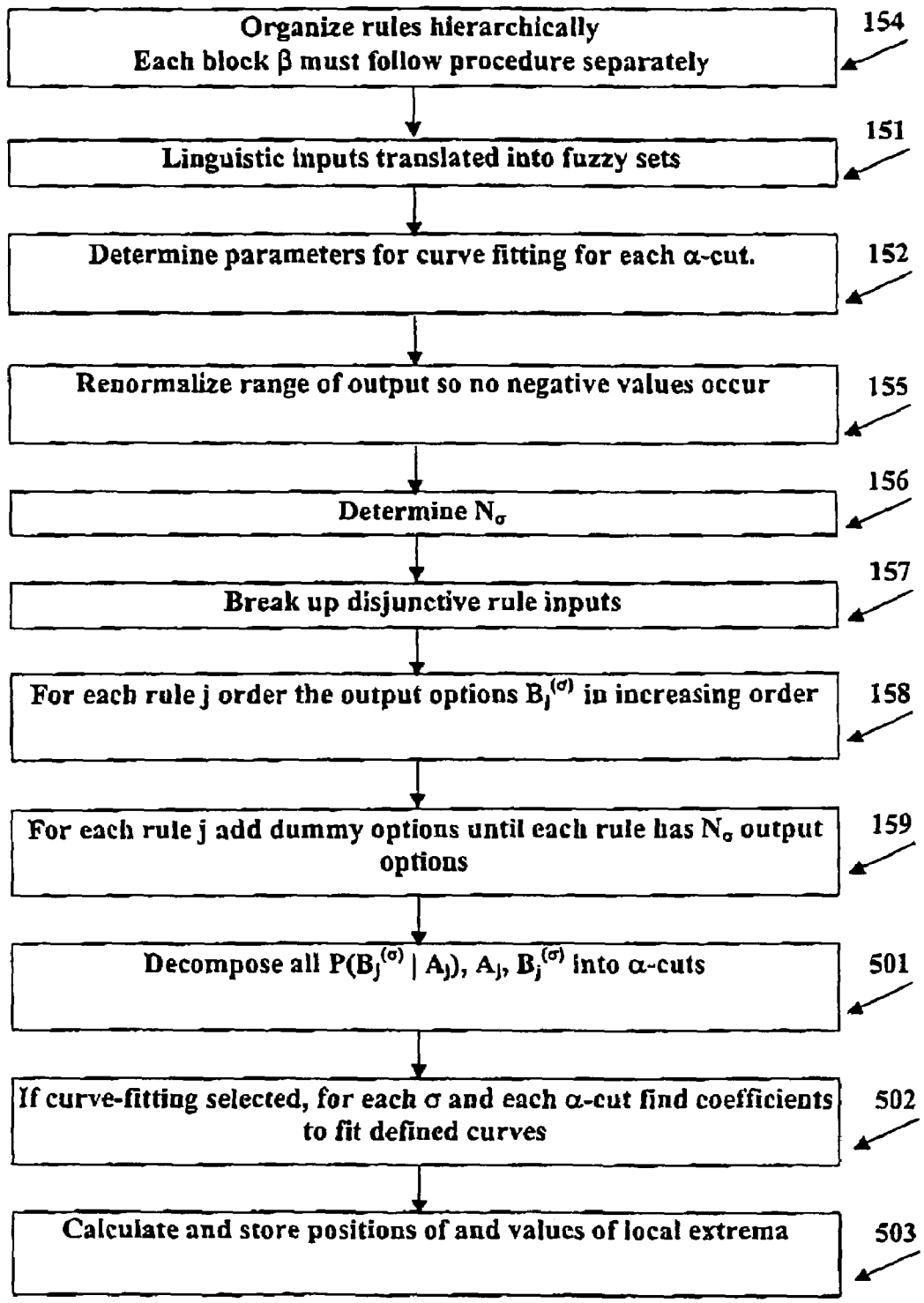
FIG. 15 shows the expert input pre-processing
Figure 39:
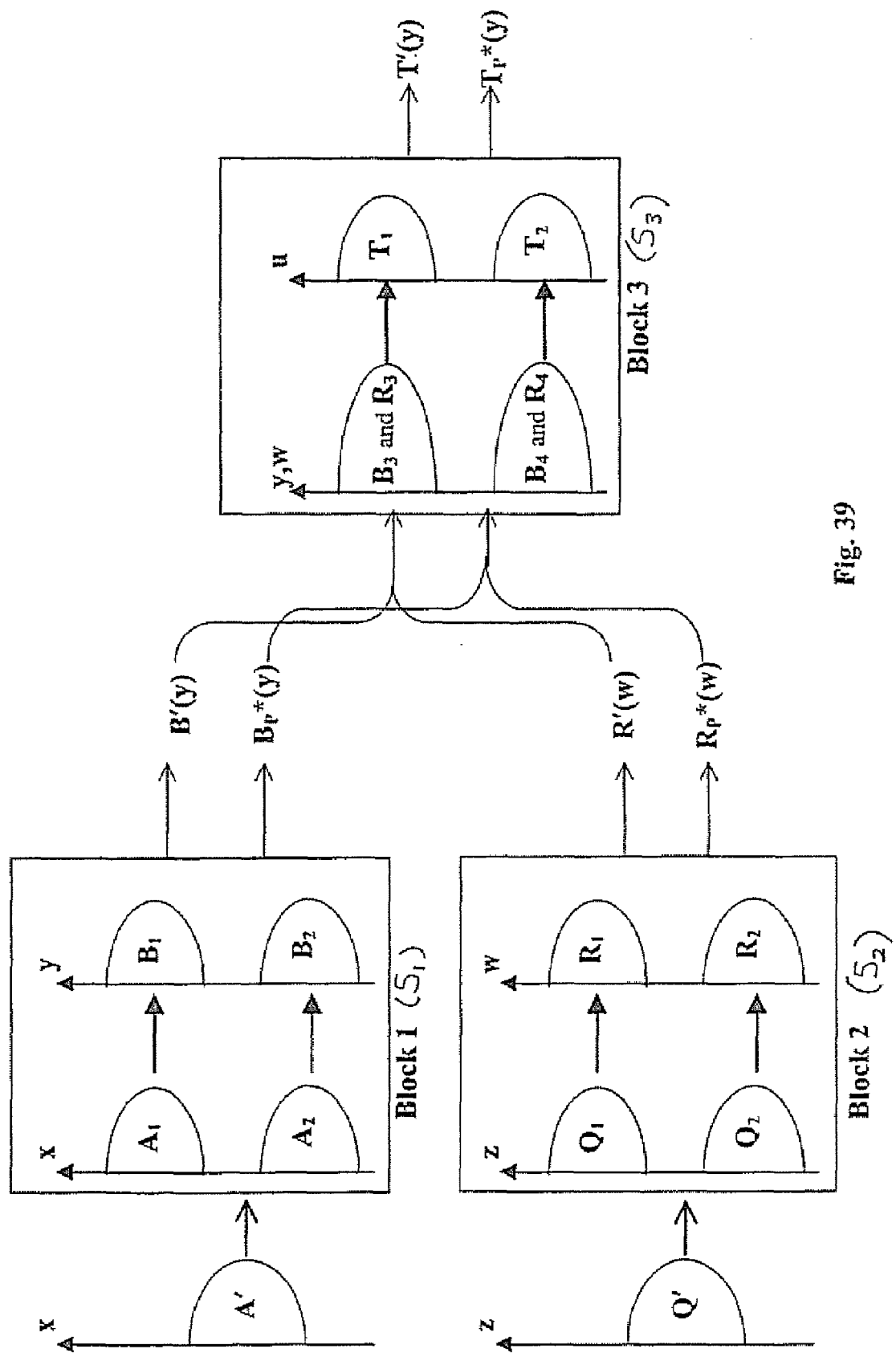
FIG. 39 shows how rules are organized into blocks
Figure 40:
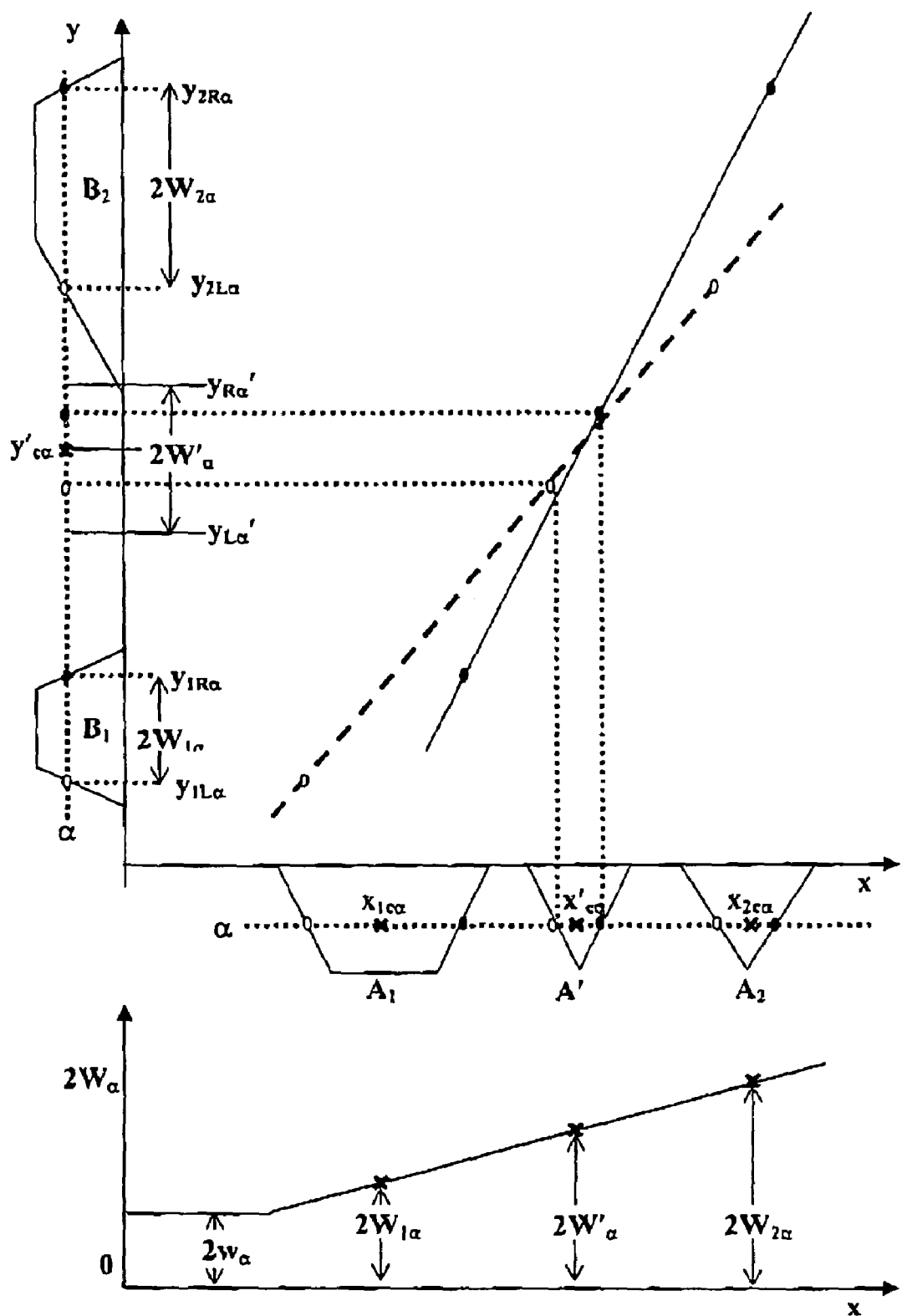
FIG. 40 shows the interpolation to get [$y'_{L\alpha}, y'_{R\alpha}$] and $W'_{60}$

The expert must set thresholds for ignorance, doubt, belief, degree of proof of an assertion G and degree of possibility of that assertion, for telling the user when to stop collecting data. The expert decides what this assertion G is. There may be more than one such assertion, for example guilt or innocence. If the system is used for process control, then these thresholds are not required unless it is a system that can choose whether or not to collect information, such as an autonomous robot. The thresholds are denoted $I_{min}$, $Bel_{min}$, $H_{min}(G)$, $K_{min}(G)$. The definitions of I, Bel, H and K will be discussed in the section on output postprocessing. The expert must not set limits that are inconsistent with the rules. If some of the rules have low truth values, or some of the rules are in the form of examples, or if there are probabilities involved in the rules, then the envelope of possibility will spread out even if the inputs match the rule inputs exactly; making it impossible to satisfy the criteria Pre-processing of the expert input is performed in 13. Referring to FIG. 15, this is where linguistic inputs are translated to fuzzy sets 151. Additional preprocessing is done to determine the parameters for curve fitting for each alpha-cut 152. The curve-fitting procedure described below is executed for each alpha-cut of each probability option cs of the rule set. In 154, the rules are organized hierarchically. A group of rules leading to an output will be called a "block", shown in FIG. 39, and the block index will be β. Denote the unmodified set of rules of block β by $S_β$.

The curve-fitting procedure is repeated for each block that was selected as an interpolation block. The same set of alpha-cuts is used for all blocks.

The range of the output is renormalized in 155 so that no negative values occur. The renormalized values are for internal calculations only, not for display. This step is intended to prevent problems with fuzzy arithmetic when expected values are calculated using fuzzy probabilities.

In 156, the maximum number of options for any rule, $N_σ$, is determined.

Figure 38:
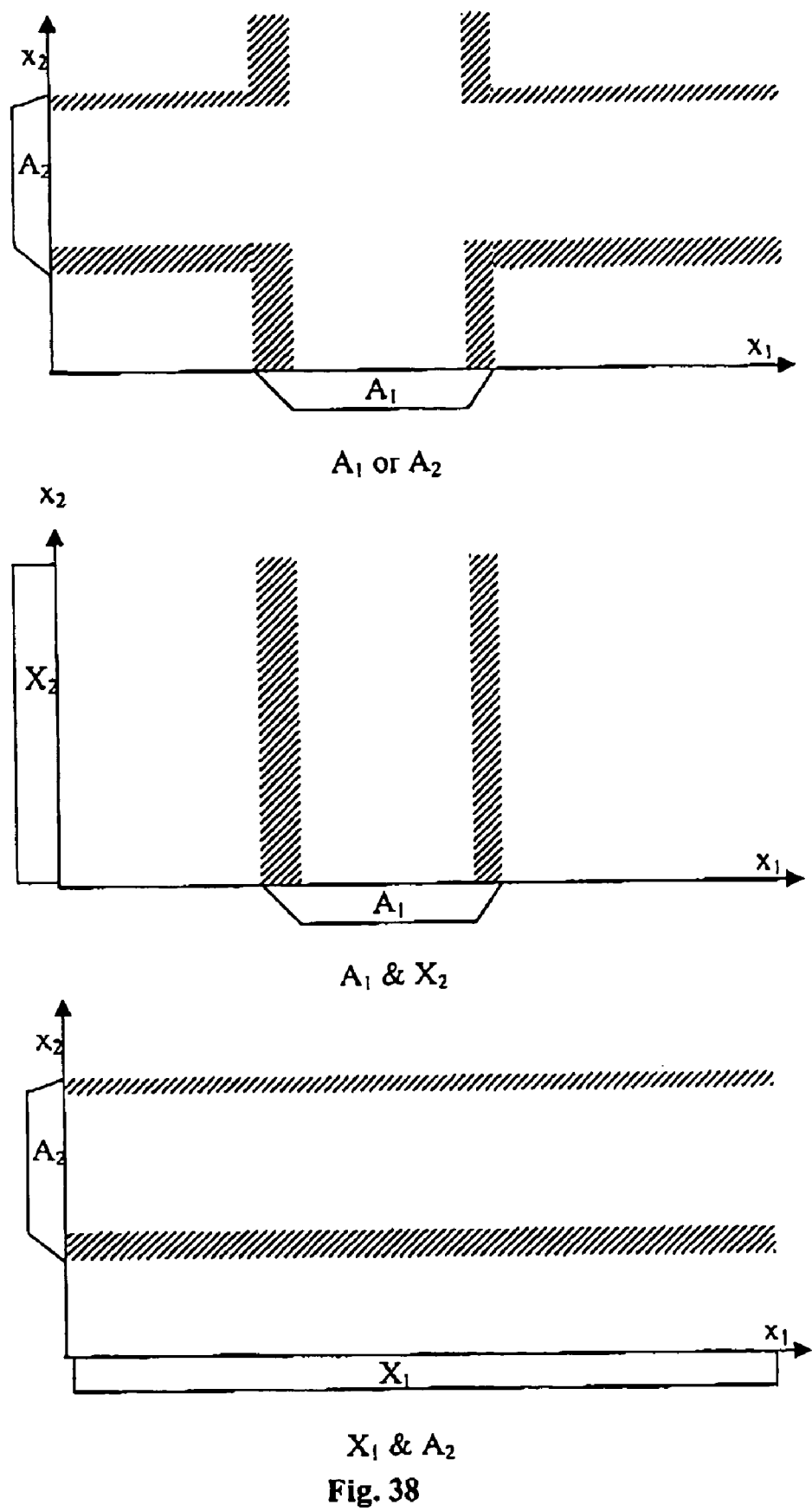
FIG. 38 shows how disjunctive rules are broken up

Step 157 breaks up any rules with disjunctive rule inputs into equivalent rules with conjunctive (i.e. convex) inputs, as shown in FIG. 38. Remove the disjunctive rules from the set of rules to be used for interpolation and replace them by the equivalent rules with conjunctive inputs.

In step 158, for each rule j, order the output options $B_j^{(σ)}$ in increasing order so that $B_j^{(σ)} < B_j^{(σ+1)}$. If fuzziness prevents makes ordering ambiguous, then it does not matter in what order the ambiguous items are placed.

In step 159, for each rule j, add dummy output options until each rule has $N_σ$ output options. The dummy options are all identical to the last "real" output option. For example, if a rile j has only two options $B_j^{(2)}$ and $B_j^{(2)}$, the dummy options $B_j^{(3)}$, $B_j^{(4)}$, etc. would all equal $B_j^{(2)}$. If a rule j has only one output option $B_j^{(1)}$, then the dummy options would all equal $B_j^{(1)}$. After this step there will be $N_σ$ output options $B_j^{(σ)}$ for each rule. Associate a probability $P(B_j^{(σ)}|A_j)=0$ to each dummy option. Dummy options and real options are treated on an equal footing in interpolation. Denote this set of rules with the broken-up disjunctive rules and the dummy output options by $S_β^{(interp)}$.

501 decomposes all probabilities $P(B_j^{(σ)}|A_j)$, rule inputs $A_j$ and outputs $B_j^{(σ)}$ into alpha-cuts. For rule input j, the vector of the right boundaries of the alpha-cuts is denoted by $x_{jRα}$ and the vector of left alpha-cuts is $x_{jLα}$. Each component of the vector corresponds to a dimension of the rule input. The centre-of-mass of each rule input's alpha-cut is defined as $z_{jcα} = 0.5(x_{jRα} + x_{jLα})$. For each rule j and output option σ, the alpha-cut is denoted by $[y_{jLα}^{(σ)}, y_{jRα}^{(σ)}]$. For each probability, the alpha-cut is denoted by $[P_{jLα}^{(σ)}, P_{jRα}^{(α)})$. In addition, define the half-widths of each output option alpha-cut $W_{jα}^{(σ)} = 0.5(y_{jRα}^{(σ)} - y_{jLα}^{(σ)})$.

In 502, if curve-fitting has been selected for this block, for each of the options a and each alpha-cut, find coefficients to fit the following curves:

$y_{Lα}^{(σ)}(x_{Lα}), y_{Rα}^{(σ)}(x_{Rα}), W_α^{(σ)}(x_{cα}), P_{Lα}^{(σ)} y_{Lα}, y_{Rα}, \text{ and } W_α$. If there are insufficient rules for curve fitting, the procedure with Lagrange multipliers discussed earlier should be followed.

The positions and values of local extreme of these curves are calculated and stored in step 503.

The interpolation coefficients are stored and are not updated unless the expert changes the rules.

Figure 5:
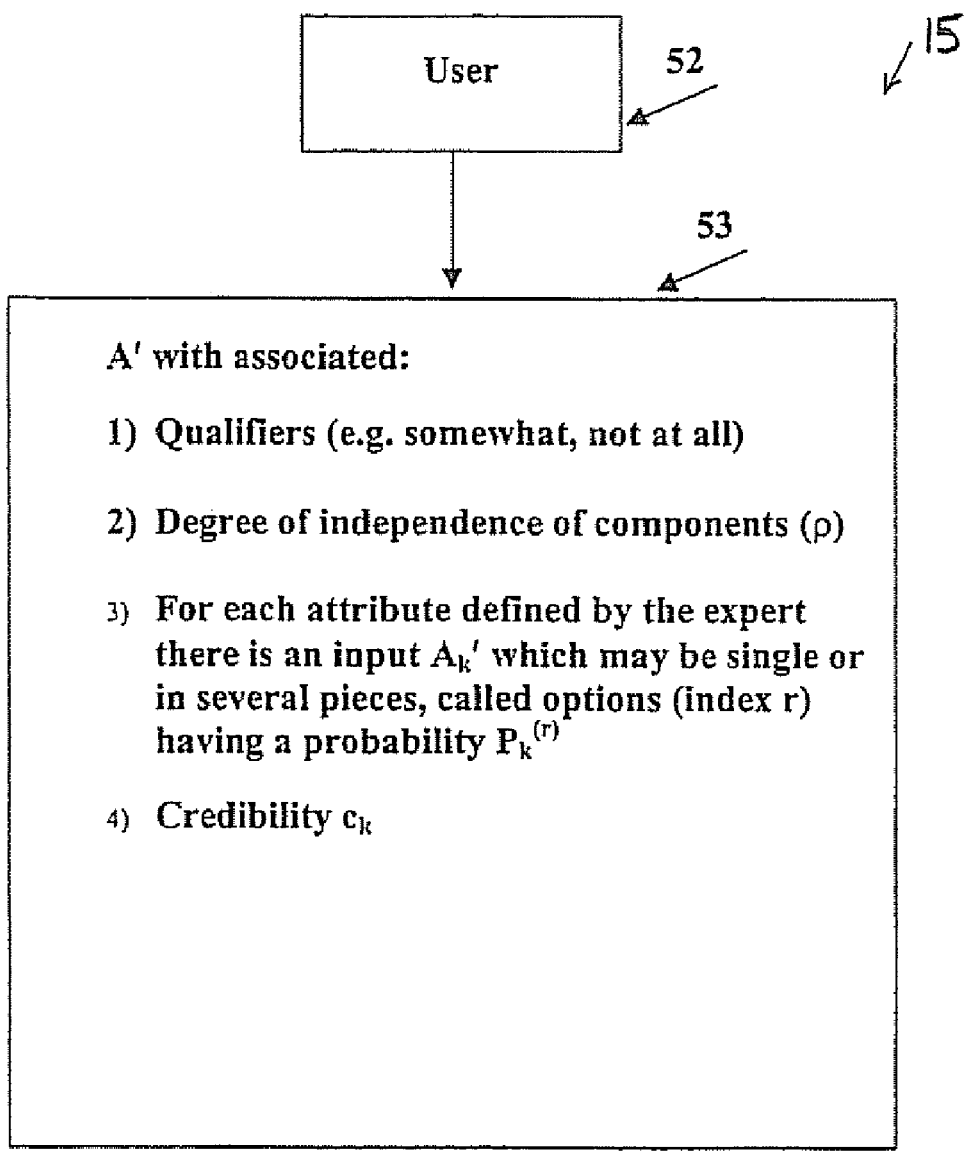
FIG. 5 shows the user inputs into the system

FIG. 5 shows the inputs to the system that must be entered by the user, or are the result of measurement if process control. The user answers the questions that are set up by the expert and posed by the software, i.e. an input $A'_k$ for each dimension of the input. Shown by 53, the user inputs $A'_k$ with associated parameters: qualifiers (e.g. Somewhat, not at all, etc.), degree of independence of dimensions, credibility of information for that dimension, and probabilities. $A'_k$ may be a single fuzzy set with 100% probability or it may be several sets $A'_k{}^{(rk)}$ indexed by the input option index $r_k$, with associated fuzzy input probabilities $P_k^{(r)}$ summing to unity. The input is required to be expressed as a conjunction if it is multidimensional, i.e. the user cannot enter "small or brown" to describe a cat it must be "small and brown".

The user may be imprecise about the input by using qualifiers. Phrases such as "very", "somewhat", or "about" applied to a fuzzy or crisp set modify the shape of the set, tending to spread or sharpen its boundaries and/or shift it up or down on the real axis. These modifiers can be applied to the input before they are processed by the algorithm.

An input may be single or involve several options. If an input, dimension k, has several options, each options, indexed by superscript $r_k$, will have a probability $p^{(rk)}$ associated with it. The definition of these options is by the user, not the expert. For example, the user may say "There is a 25% probability the cat hidden in the bag is small". In such cases, the fuzzy input to the rule "small cats are affectionate" would split into two inputs, "small cat" tagged with a fuzzy 25% probability; and "not-small cat" with a fuzzy 75% probability. The user is free to choose "small" and "not small" as input options for the size dimension. He could have chosen "very small" and "medium small" instead, the system does not restrict choices.

The degree of independence of components is a question that arises for multidimensional input.

In practice one often finds that the inputs are not independent as is tacitly assumed here. For example, a rule may state "If the internal auditor says the company is well run, and the external auditor says the company is well run, then the company is well run," Opinions $A_1'$ and $A_2'$ would be obtained from the two auditors, and then it may be discovered that the outside auditor had recently worked for the company.

A measure $0 \leq \rho \leq 1$ for the degree of correlation of the two information sources is estimated by the user, and the aggregate of the first and second auditor's opinions would be represented by:

$$d_{x2}(1-\rho)d_{x2}(\text{well-run}, A_2'] + \rho d_{x1}[\text{well-run}, X]$$

In the limit $\rho=1$, $d_{x2}$ behaves as if information were available from only one of the two auditors, as if the second had said "$A_2'$=X, meaning 'I don't know'", or that an opinion from him were unavailable.

The user must also assign a degree of credibility $0 < c_k \leq 1$ to the information source for input dimension k. If no credibility is assigned it is assumed to be unity. This credibility is used in the same way as $\kappa$ and $T(A \ominus B)$ to effectively increase the distance between the input and the rule input.

Figure 17:
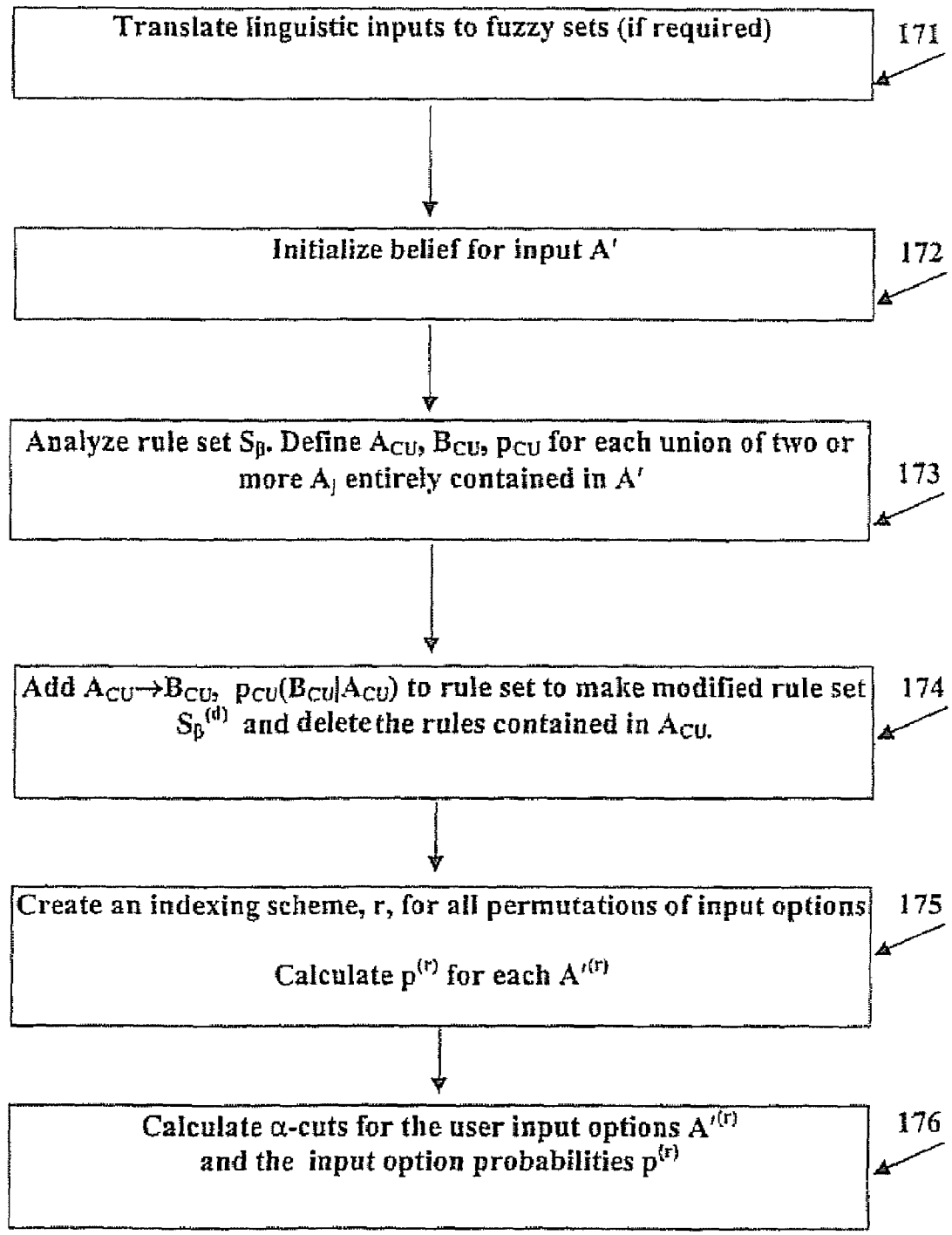
FIG. 17 shows the user input preprocessing

The user inputs 14 are followed by a pre-processing step 15. The user pre-processing is shown in FIG. 17.

Step 171 translates linguistic inputs to fuzzy sets if required. Step 172 initializes the belief for input A' as $$Bel(A')=t^{(B)}(c_1, \ldots c_k \ldots)$$

Figure 41:
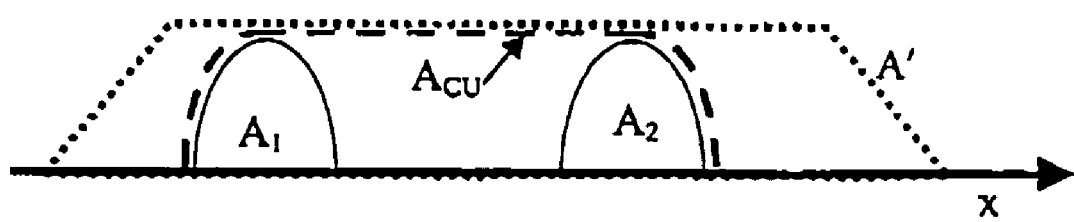
FIG. 41 shows the definition of $A_{CU}$

If A' is a direct input from users or sensors rather than an output from an earlier block. Step 173 analyzes the rule set $S_\beta$ for occurrences of the situation where the union of two or more $A_j$ is entirely contained in any of the A'. $A_u$ is the largest such union. $A_{cu}$ is defined as the cover of $A_{cu}$, and $B_{cu}$ as the cover of the corresponding rule outputs. $p_{cu}$ is defined as the cover of the associated fuzzy probabilities. $A_{cu}$ is defined in figure 41. In 174, this new entailed rule $A_{cu} \rightarrow B_{cu}$ with its probability is added to the rule set $S_\beta^{(d)}$ replacing those rules from which $A_{cu}$ and $B_{cu}$ were constructed creating such a modified rule set $S_\beta^{(d)}$.

Step 175 creates an indexing scheme, index r, for all the permutations of input options. Then the probabilities $p^{(r)}$ for each of the $A'^{(r)}$ are calculated. For example, if there are two dimensions for the input, and the first dimension has three options, and the second has two options, then there will be six input options altogether. The six input option probabilities are calculated in the obvious way from the probabilities of the individual input options.

Step 176 calculates the alpha cuts for the user input options and the input option probabilities. The alpha cuts $[x'_{\alpha Lk}^{(rk)}, x'_{\alpha Rk}^{(rk)}]$ correspond to $A'_k^{(rk)}$. The alpha-cuts for $A'^{r(r)}$ are denoted by $[x'_{\alpha L}^{(r)}, x'_{\alpha R}^{(r)}]$. The centres-of-mass for the user input options are $x'_{\alpha c}^{(r)}$. The alpha-cuts for the input option probabilities are $[p'_{\alpha Lk}^{(r)}, p'_{\alpha Rk}^{(r)}]$ The centres-of-mass for the input probability options are $p'_{\alpha ck}^{(r)}$.

Figure 2:
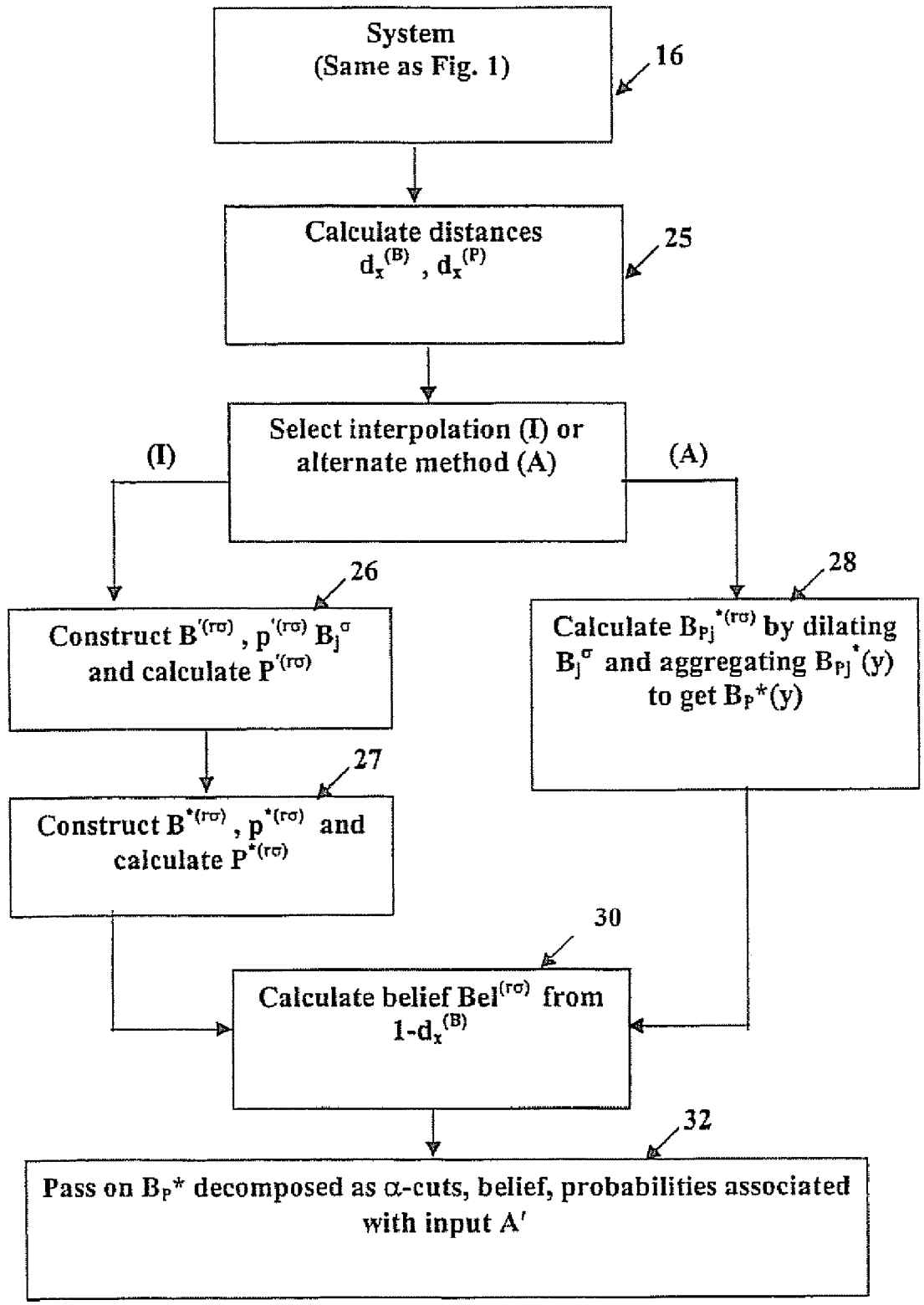
FIG. 2 shows the algorithm for operation of the system

Step 17 in FIG. 1 is where the calculations take place. The calculation within each block $\beta$ comprises several steps. FIG. 2 shows the calculations from step 17 in more detail.

In 25, calculation of the distances $d_{xj}^{(B)(r)}$ and $d_{xj}^{(P)(r)}$ from each of the rule inputs j for each of the input options to get the aggregate distances for (a) belief $d_x^{(B)(rX)}$
(b) spreading: $d_x^{(P)(r)}$ The distances between the option r of the input $d_{xj}^{(B)(r)}$ and $d_{xj}^{(P)(r)}$ and rule j are calculated for belief and plausibility distance measures. These distances are calculated using the rule set $S_b^{d)}$ defined during input preprocessing. For the distance function $d_{xCU}$ associated with the new rule $A_{CU} \rightarrow B_{CU}$, the method for calculating the distance function must be modified as follows:

$$1-d_{xCU}(A_{CU}, A')=(1-d_x(A_{CU}, A'))|A_U|/|A_{CU}|$$

where $d_x$ is the default distance function.

$$d_x^{(B)}=t_B(1-d_x^{(B)}(A_1, A'), \ldots 1-d_x^{(B)}(A_j, A') \ldots)$$

$d^{(B)}$ is the distance between input and rule input j.

$$d_x^{(B)}(A_j, A')=d_x^{(B)}(Aj_1, A'_1), \ldots$$
$$1-d_{xk}^{(B)}(A_{jk}, A'_k) \ldots)$$

where $d_x$ uses weights to aggregate the distances $\tilde{d}_{xk}^{(B)}(A_{jk}, A'_k)$ for the dimension k and $$d_{xk}^{(B)}(A_{jk}, A'_k)=1-c_k'(1-\kappa_k)d_{xk}^{(B)}(A_{jk}, A')$$

$$d_{xk}^{(B)}(A_{jk}, A'_k)=1c_k'(1-T)d_{xk}^{(B)}(A_{jk}, A'_k),$$

and $c_k'=1-c_k$ where $c_k$ is the credibility of user input k
$c_k'=1-Bel_k$ where 1-$Bel_k$ is the belief calculated by the block whose output is $A'_k$ and $d_{xk}^{(B)}$ is the distance function for dimension k.

If interpolation rather than the alternate method is used, then the $d_{xj}^{(P)(r)}$ must also be aggregated over j using the t-norm $t^{(P)}$ defined by the expert user:

$$d_x^{(P)(r)}=t^{(P)}(d_{xj}^{(P)(r)}, \ldots d_{xj}^{(P)(r)} \ldots)$$

where the distance functions are modified only by c, $\kappa$ and T, not by Bel, as they are for $d_x^{(B)(r)}$.

For each alpha-cut and each rule input option r and each rule output option $\sigma$, interpolation, shown in step 26, or the alternate method to get interpolated outputs $B'^{(r\sigma)}$ and interpolated output option probabilities $p'^{(r\sigma)}$ takes place. The indices (r,$\sigma$) will be referred to collectively as the option index. For each alpha-cut and each option, use interpolation or the alternate method to get the interpolated probability associated with each output option (r,$\sigma$). This will be $p'^{(r\sigma)}= p'^{(r\sigma)} \cdot p^{(r)}$. Step 26 is shown in more detail in FIG. 3, which will be explained later.

Taking the interpolation route, step 27 includes, for each alphaut and each option, calculation of the possibility envelopes $B_P^{*(r\sigma)}$, $P^{*(r\sigma)}$. Each $B_\alpha'^{(r\sigma)}$ is dilated using $d_x^{(P)(r)}$ and the function $M_P$ or the equivalent rule for spreading as a function of $d_x$ to get $B_\alpha^{*(r\sigma)}$. The same dilation procedure is followed to get $p_{\alpha*}^{(r\sigma)}$. For each alpha-cut and each option, calculate the possibility envelope for the probability $P^{*(r\sigma)}$ of option (r,$\sigma$). This will be $P^{*(r\sigma)}=p^{*(r\sigma)} \cdot p^{(r)}$.

Taking the alternate route, step 28, each $B_{j\alpha}^{(o)}$ is dilated using $_{xj}^{(P)(r)}$ to obtain $B_{j\alpha}^{*(r\sigma)}$ probabilities $p_{j\alpha*}^{(o)}$ are likewise obtained by dilation. The $B_{j\alpha*}^{(r\sigma)}$ and the $p_{j\alpha}^{*(o)}$ are then averaged by fizzy arithmetic with $(1-d_{xj}^{(P)(r)})$ as weights to get $B_\alpha^{*(r o)}$ and $p_\alpha^{*(o)}$ and $P^{*(r o)} = p^{*(r o)} \cdot p^{(r)}$.

In 30, the belief in the outputs cr is the same for each σ. It depends on the belief in the input $A'^{(r)}$ and the mismatch between input and rule input. Belief in the interpolation procedure fall as $dx^{(B)}$ increases.

$$Bel_p^{(r)} = 1 - d_x^{(B)(r)}$$

Where $d_x^{(B)(r)}$ was defined in step 25.

In step 32, all the inputs to the next block have now been calculated.

$$B'_\alpha^{(r o)}, P'_\alpha^{(r o)}, B^*_\alpha^{(r o)}, p^*_\alpha^{(r o)}, Bel^{(r o)}$$

When the outputs of one block become the inputs of the next block, the output options (r,σ) of the first block are renamed as the input options of the next block.

For a rule block all of whose inputs are "direct" inputs, that is inputs from sensors or from users, as opposed to inputs that are the outputs of previous rule blocks, steps 25 to 32 are executed only once.

Figure 18:
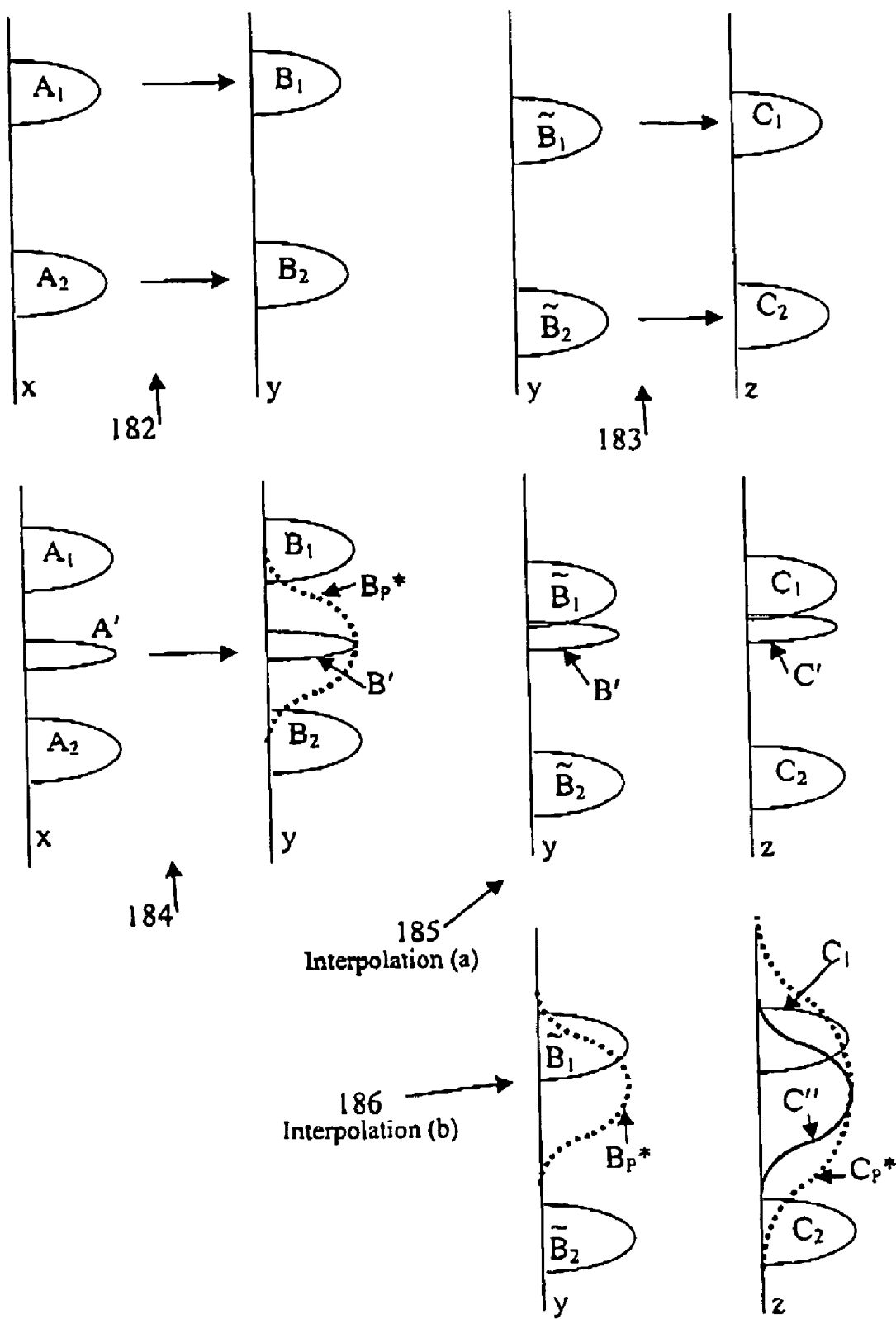
FIG. 18 shows how output of the previous block becomes input for the next block

For all other rule blocks, steps 25 to 32 are executed twice. FIG. 18 shows how these concepts are applied to a simple system with two blocks. The first block, 182, has rules $\{A_1 \rightarrow A_2, B_1 \rightarrow B_2\}$. Its rule inputs are direct. The second block, 183, $\{B_1 \rightarrow C_1, B_2 \rightarrow C_2\}$ has only indirect rule inputs arising from previous blocks. An input A' generates an interpolated output B' and a possibility envelope $B_P^*$ when applied to block 182, shown, in 184. B' is now used as input for block 183 to get an interpolation C', shown in 185. $B_P^*$ is also applied to block 183 to get an interpolation C" which is dilated to get the possibility envelope $C_P^*$, shown by 186.

The first time steps 25 to 32 are executed, the inputs will be any direct inputs combined with those calculated by interpolation only from the previous blocks, in other words anything calculated in steps 25 to 32 with a prime rather than a star. No spreading is performed. The outputs of this calculation will be denoted by $B'^{(r o)}$ and $P'^{(r o)}$.

The second time, the inputs will be any direct inputs combined with those calculated by interpolation and spreading from the previous blocks, in other words anything calculated in steps 25 to 32 with a star rather than a prime. The outputs of this calculation will be denoted by $B^{*(r o)}$ and $P^{*(r o)}$.

Figure 3:
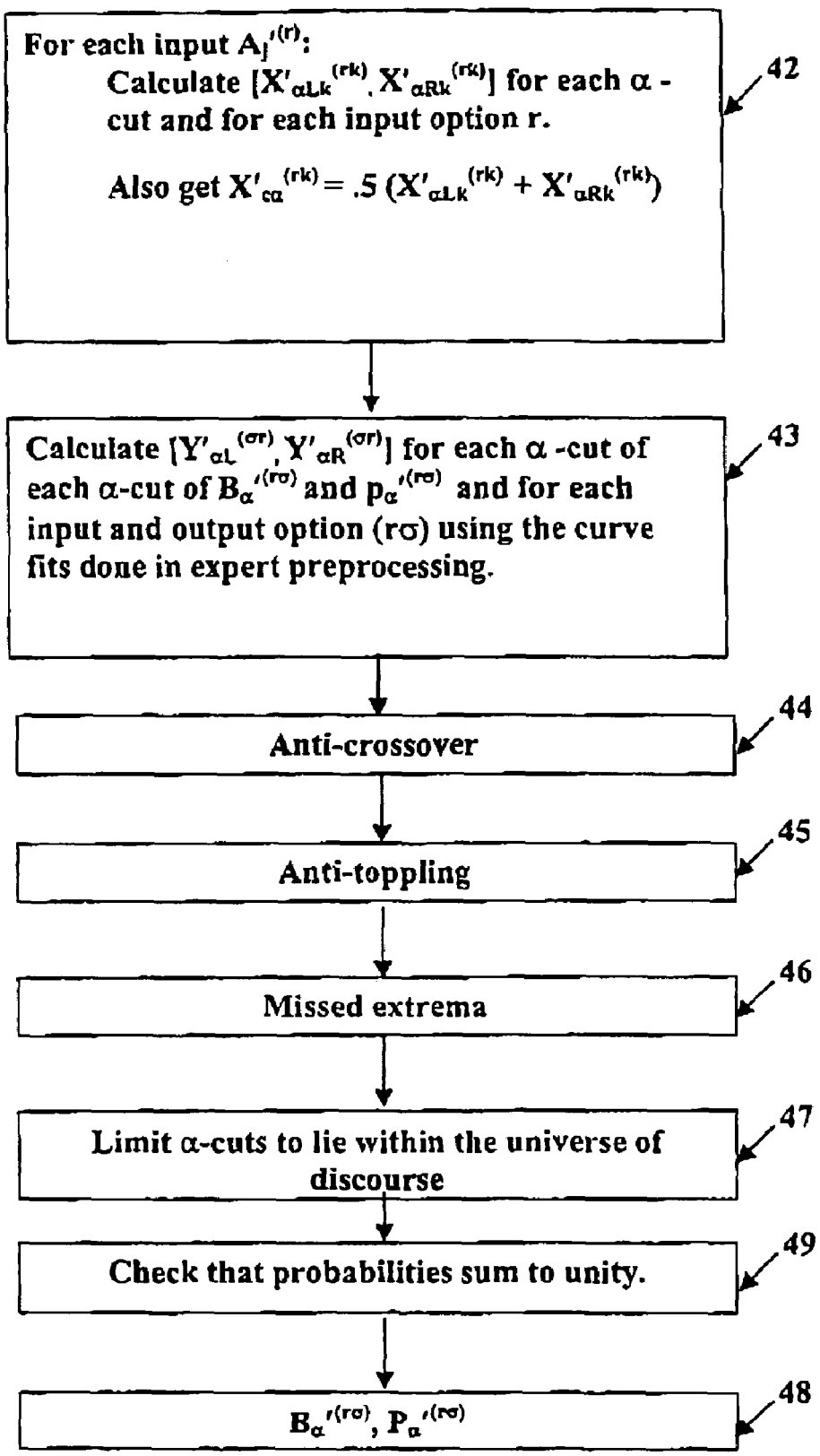
FIG. 3 shows the interpolation between the rules and A' in order to obtain B'.

Referring to FIG. 3, step 26 will now be described in more detail. First, get the alpha-cuts of the input in step 42. If this rule block P is selected for interpolation, then $B'^{(r o)}$ and $p'^{(r o)}$ are calculated by interpolation using the coefficients determined when the expert inputs were processed in 43. Several problems may result from applying curve fitting—crossover, toppling, missed extreme, and out-of-range values—that must be corrected before the results of step 26 can be used in step 27 or as input to the next block.

The anti-crossover subroutine is called up in step 44. Crossover is described in FIG. 10, graphs 102 and 103. The subroutine is described below for the interpolated outputs $B'^{(r o)}$. It must be applied to the interpolated probabilities $p'^{(r o)}$ as well, using a different minimum width also determined by the expert. Using the interpolated widths $W_\alpha'^{(r o)} = W_\alpha^{(o)}(x'_{c\alpha}^{(r)})$ $$ymin_\alpha'^{(o r)} = y_{c\alpha}'^{(o r)} - \max(W_\alpha'^{(o r)}, w_\alpha)$$

$$ymax_\alpha'^{(o r)} = y_{c\alpha}'^{(o r)} + \max(W_\alpha'^{(o r)}, w_\alpha)$$

where $y_{c\alpha}'^{(o r)} = 0.5(y_{L\alpha}^{(o)}(x'_{L\alpha}^{(o)}) + y_{R\alpha}^{(o)}(x'_{alpha\text{-}cut\ and\ w\alpha}$ are the minimum output set widths defined by the expert.

Let $$y_{L\alpha}'^{(o)} = \max(y_{L\alpha}^{(o)}(x'_{L\alpha}^{(o)}), ymax_\alpha'^{(o r)})$$

$$y_{R\alpha}'^{(o)} = \max(y_{R\alpha}^{(o)}(x'_{R\alpha}^{(o)}), ymax_\alpha'^{(o r)})$$

redefine the alpha-cuts of $B'^{(r o)}$.

Figure 8:
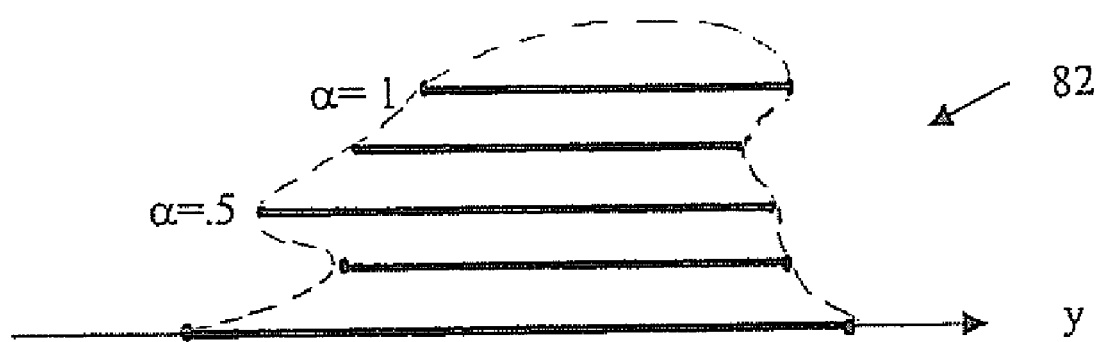
FIG. 8 shows the effect of the anti-toppling sub-routine
Figure 8:
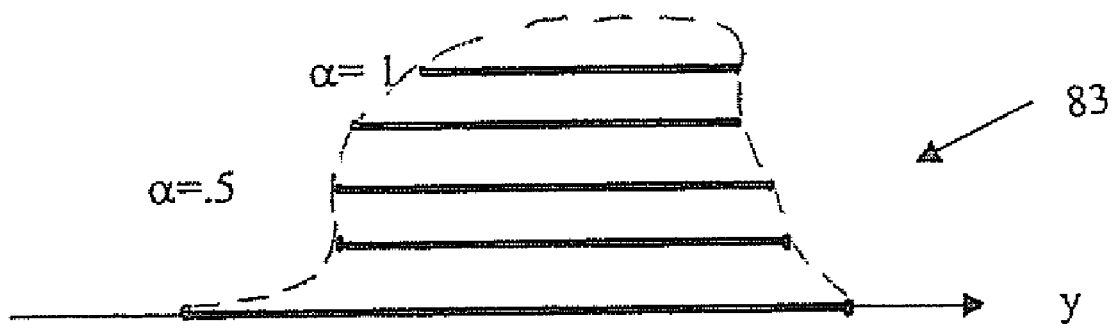
Figure 8:

45 calls the antitoppling subroutine, which redefines the alpha-cuts of $B'^{(r U)}$ once more. If the interpolations for each alpha-cut are perfectly consistent, one expects $B_a'^{(r G)} \supset B_a'^{(r G)}$ if α<a'. This is necessary in order to ensure that curve for B'$_a$ is not skexved, as is shown in FIG. 8. The effect of anti-toppling illustrated in FIG. 8, shows how this problem is corrected. Antitoppling also must be applied to probabilities.

Figure 16:
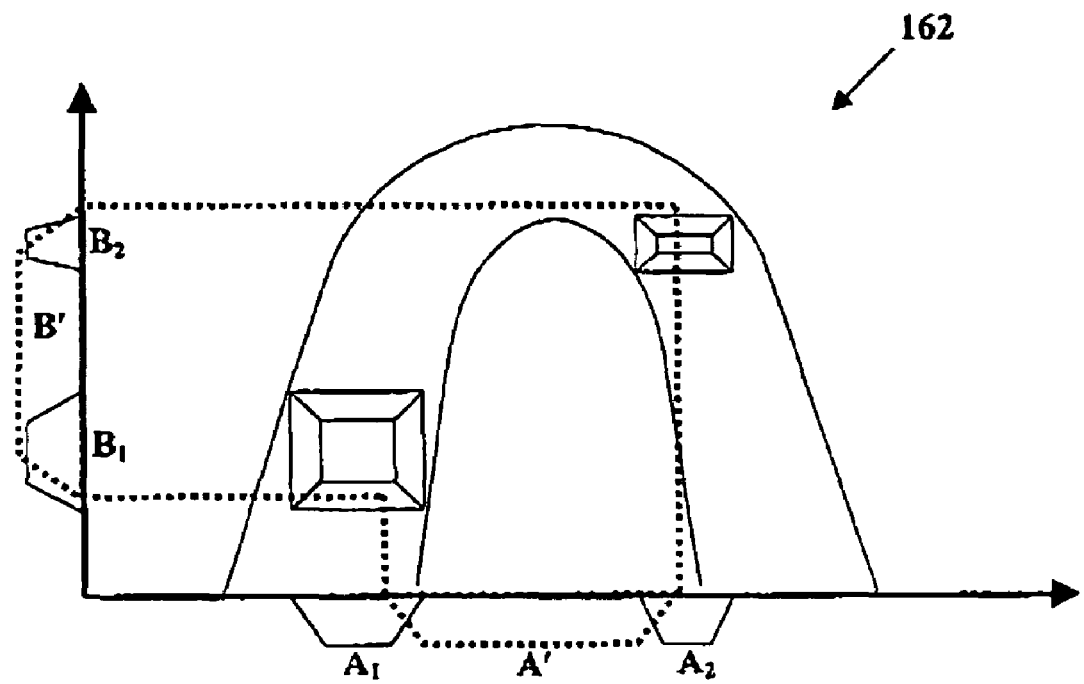
FIG. 16 shows how to correct for with local extremum when calculating $B'_\alpha$.
Figure 16:
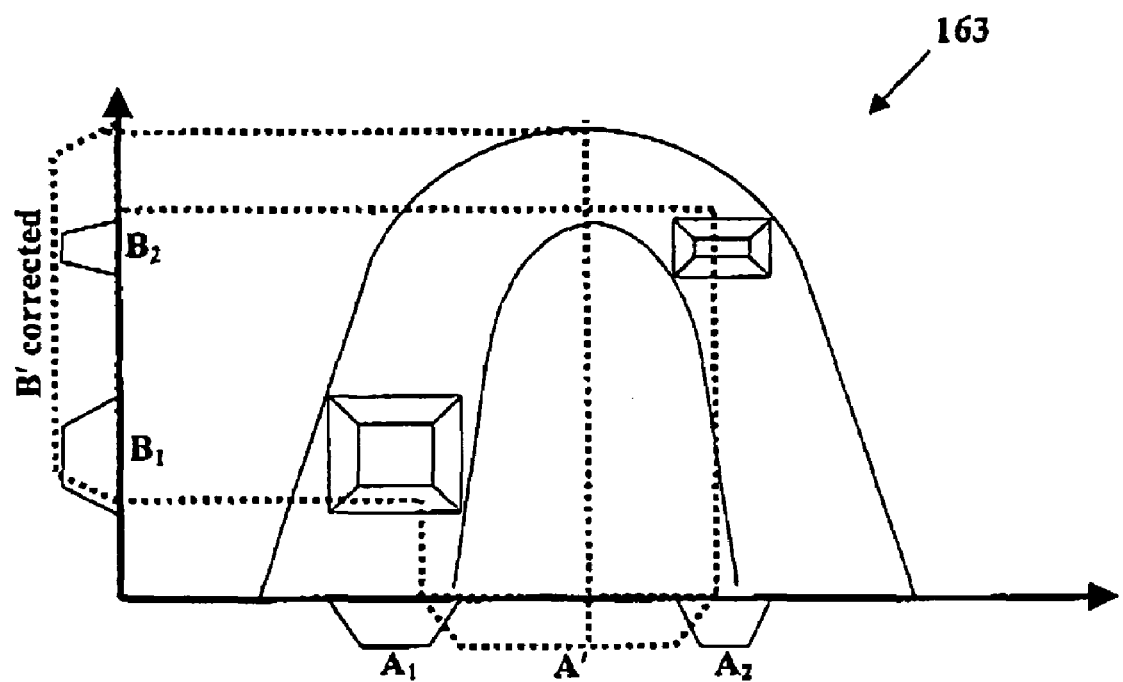

Step 46 deals with missed extreme, another potential problem that is shown in FIG. 16. If a local extremum of the interpolation function occurs in the support of $A'^{(r)}$, then the alpha-cuts of $B'^{(r o)}$ may not include this extremum and thus be too narrow. Locations and values of extreme were found during expert input processing. In 162, the local extremum lies in $A'^{(r)}$, but the interpolated $B'^{(r o)}$ does not take this into account. $B_\alpha'^{(r o)}$ should then be extended as follows:

If the left boundary of the alpha-cut of $B'^{(r o)}$ lies above the minimum of $y_{L\alpha}^{(o)}(x'_{L\alpha}^{(r)})$ on interval defined by $A_\alpha'^{(r)}$, then replace it by this minimum. If the right boundary of the alpha-cut of alpha-cut of $B'^{(r o)}$ lies below the maximum of $y_{R\alpha}^{(o)}(x'_{R\alpha}^{(r)})$ then replace it by this maximum. This problem with missed extreme also applies to interpolated probabilities. Graph 163 illustrates how this procedure corrects this problem.

In step 47, out-of-bounds is another problem with the $B_\alpha'^{(r o)}$ that is dealt with. The right and left boundaries are limited to remain inside Y. If both boundaries lie outside Y, then an error message is generated. The expert has made an error with the interpolation. The interpolated probabilities also have their alpha-cuts limited to the interval [0,1].

In 49, probabilities obtained by interpolation should be checked that they still sum to unity after the antitoppling and anticrossover procedures are performed. If the probabilities are fuzzy, then the requirement takes this form: the sum of the left alpha-cuts of each interpolated probability must be ≦1; sum of the tight alpha-cuts of each interpolated probability must be ≧1. If the requirement is not satisfied for a certain alpha cut, then an adjustment must be made to restore the condition.

If this rule block β is not selected for interpolation, then $B'^{(r o)}$ and $p'^{(r o)}$ are calculated by the alternate method described in the discussion of choices made by the expert, in which there is fuzzy averaging of the rule outputs $B_j^{(o)}$ of each option σ of rule j with the weights $(1-d_x(A_j, A'^{(r)}, \kappa_j))$ which depend on the distance between $A'^{(r)}$ and the rule input j. There is no concern about crossover and toppling in that case. Note that fuzzy averaging can be done separately for each alpha-cut.

Postprocessing of block output takes place in step 18 of FIG. 1. Postprocessing may occur at any stage of collection of data of input data by the user or the sensors. It is used to assess whether sufficient data has been collected to make a decision. Otherwise the system will advise the user to collect more data and may suggest which data will do most to reduce ambiguity about the conclusion, by means of derivatives or other means.

Postprocessing takes two forms.

If the system is being used for control, then defuzzification is performed at the final block.

If the system is being used to obtain a most plausible conclusion and assess the quality of evidence and rules (the belief) leading to this conclusion, or to assess the evidence for and against an assertion G to be proven, then calculations are made of the degree of possibility of the assertion G, and degree to which the conclusion is proven or the probability that it will occur.

Figure 42:
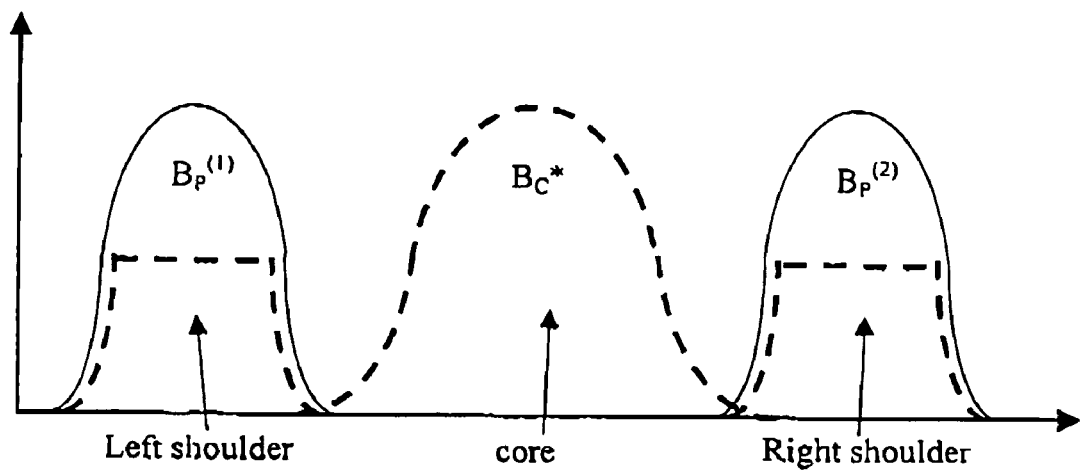
FIG. 42 shows the construction of the core and shoulders for $B_c^*$ for $p^{(1)}=p^{(2)}=0.5$

Whether the system is being used for process control or evidence analysis, the general state of ignorance about the conclusion, and strength of the chain of belief leading to that conclusion may be calculated optionally after each block and definitely after the final block. These quantities are compared to the thresholds set by the expert, or they may be used only for display. The possibility envelopes $B_{\alpha P}^{*(ro)}$ for each option together with their fuzzy probabilities $p_{\alpha P}^{*(ro)}$ may be displayed. The extended possibility envelope $B_c^*$ is calculated as follows from a core and shoulders. This is shown in FIG. 42.

In the first step, the $B_P^{*(ro)}$ fist are averaged (as fuzzy numbers) with their fuzzy probabilities $P_P^{*(ro)}$ to get the alpha-cuts of the expected possibility envelope <$B_P^*$>, which will form the core $B_c^*$ of $B_c^*$.

In the second step, the shoulders are constructed from the $B^{\alpha*(ro)}$ and $p'_\alpha{}^{(ro)}$. This is not a construction using fuzzy arithmetic and alpha-cuts like almost all earlier constructions. $B_\alpha^{*(ro)}$ will have to be reconstructed from its alpha-cuts to perform this step. The shoulders are defined as $$B_s^*(y) = \Sigma \tilde{p}^{(ro)} B^{*(ro)}(y) \text{ or}$$

$$\Sigma \min[\tilde{p}^{(ro)}, B^{*(ro)}(y)]$$

where $\tilde{p}^{*(ro)}$ is the defuzzification $\tilde{p}_P^{*(ro)}$

In the third step, the extended possibility envelope is then calculated from $$B_c^* = B_1^* \cup <B_P^*>$$

Figure 43:
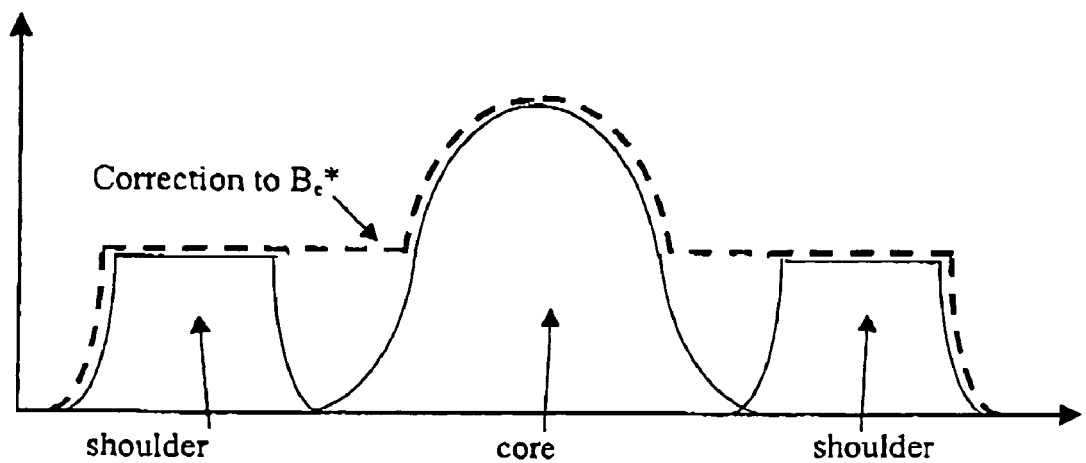
FIG. 43 shows how $B_c^*$ may be corrected

If $B_c^*$ is not convex, apply a correction, FIG. 43, to remove the problem. Thus $B_c^*$ will be centred at the most likely value of the output and have tails whose height reflects the probabilities of the different input and output options.

The expected value <$B_B$> of the belief envelope is calculated by fuzzy arithmetic from the probability-weighted average of the $B^{(ro)}$ using $\tilde{p}^{(ro)}$' the defuzzified $p'^{(ro)}$, as weights.

The expected value <Bel> of the belief is calculated from $$<Bel> = \Sigma \tilde{p}^{(ro)'} \cdot Bel^{(ro)}$$

The belief distribution is then defined as $$B_B^*(y) = <Bel> \cdot <B_B(y)>$$

An extended belief distribution could also be calculated if desired using the same method as for the extended possibility envelope.

The degree of ignorance about the output, the degree of possibility of an assertion G and the degree of proof of an assertion G are calculated as follows.

I = ignorance about output. This is the shaded area in graph 192, FIG. 19.

$$= (|B_c^*| - |B_B^*(y)|)/|Y|$$

All the problems with the vague, ambiguous, probabilistic, contradictory, missing data and the vague, sparse, probabilistic rules that do not match the available data are summarized in this number.

H(G) = degree of proof of an assertion G. Shown in graph 193, FIG. 19.

$$<Bel> \cdot |G \cap <B_B(y)>|/|G \cup <B_B(y)<|$$

where the Zadeh t-norm is used for intersection and union.

K(G) = degree of possibility of an assertion G $$= |G \cap B_c^*|/|G|$$

These quantities I, H and K are compared to thresholds set by the expert and are displayed or are used for a decision.

The fuzzy probability of G can also be calculated from the $B^*_P{}^{(ro)}$ and $p^*_P{}^{(ro)}$ if desired.

Figure 9A:
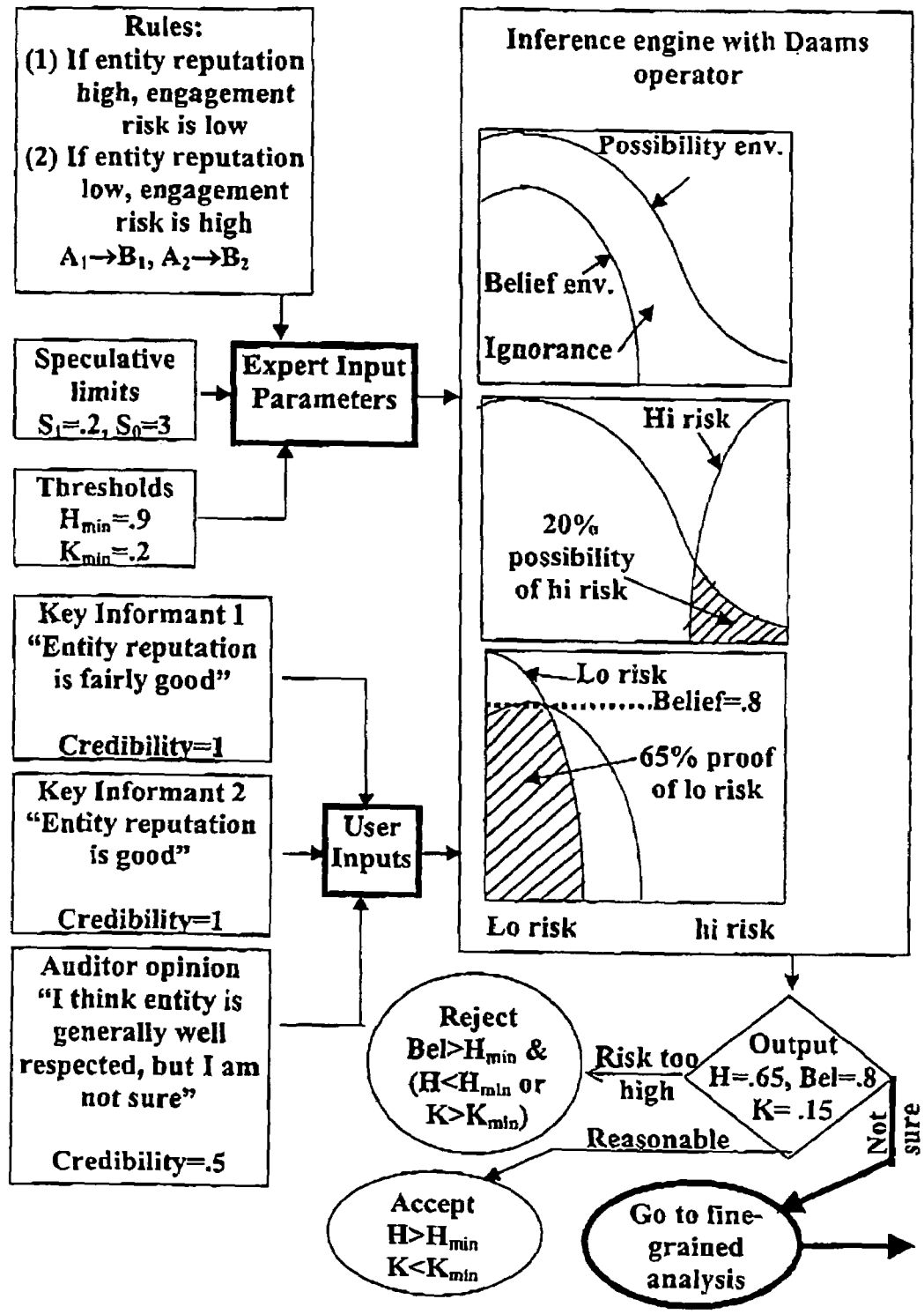
FIG. 9a shows a course-grained example of the operation of the system as applied to auditing
Figure 9B:
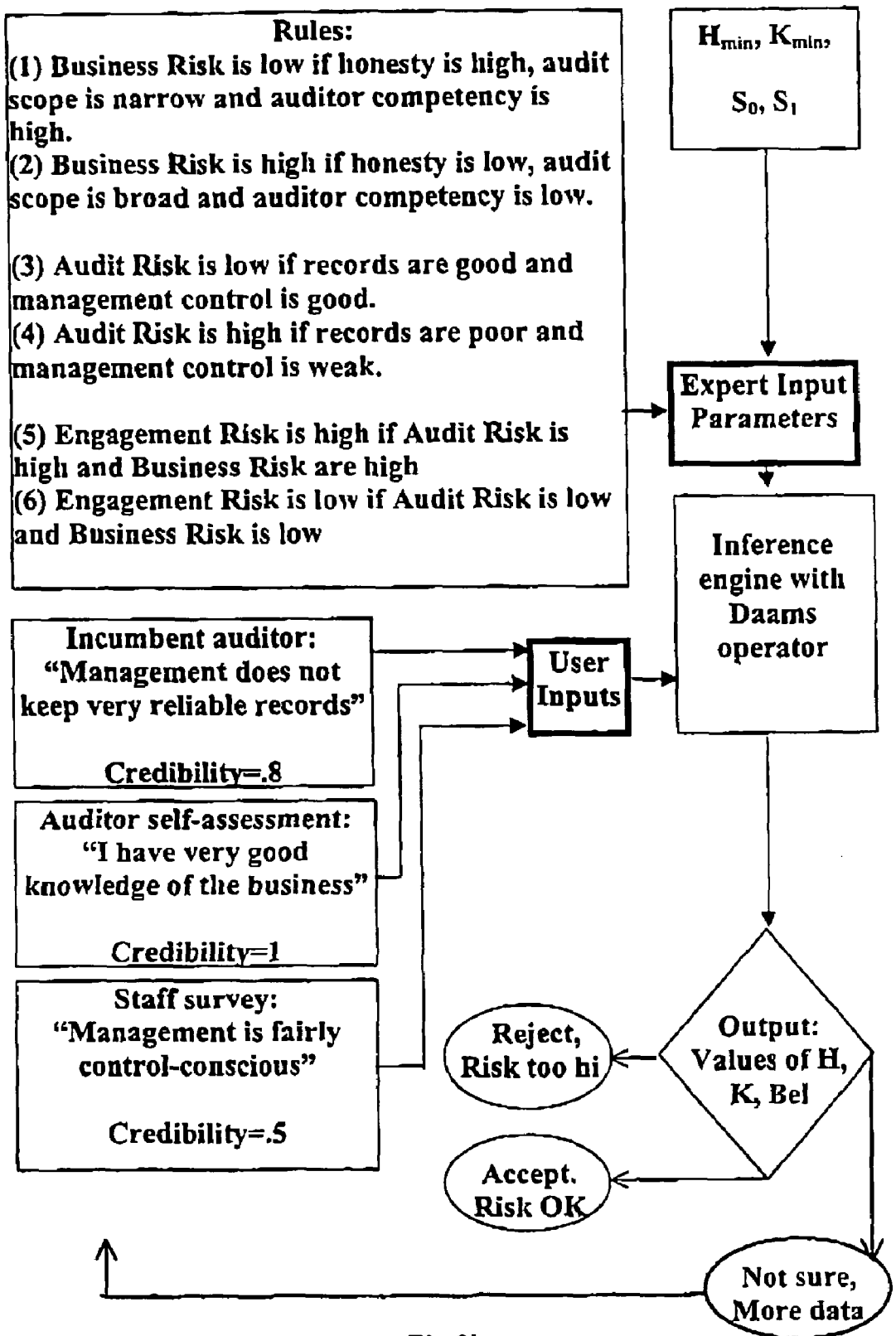
FIG. 9b shows a fine-grained example of the operation of the system as applied to auditing FIG. 10 describes crossover

Referring back to FIG. 1, the operation of the system may be described with respect to an audit engagement application as indicated in FIGS. 9a and 9b. The audit engagement process has five distinct phases accepting the engagement, planning the audit, collecting the evidence, analyzing/interpreting the evidence, and forming an opinion.

Each phase begins with assertions, and/or a hypothesis, and follows the same general steps The expert inputs 12 arc established by an expert based on established audit firm policies, or professional standards (re: assertion/hypothesis). The rules then go through the pre-processing step 13 in order to prepare them for the algorithm.

The user inputs 14 are derived from evidence that is collected that is relevant to assertion/hypothesis. These also pass through a pre-processing step 15.

In step 17, the user inputs are compared with expert rules using the principles of fuzzy logic.

This is the function of the inference engine 17 in the algorithm.

The final step is for the system to form opinion based on the degree of support for the truth of the assertion/hypothesis. This is the output of the algorithm in step 19.

The first step—accepting the engagement—is used with a case study to illustrate how the algorithm is applied specifically.

An offer of engagement triggers an assessment of engagement risk. This process of risk analysis consists of a course-grained analysis, followed by a fine-grained analysis if necessary.

An explanation of what the expert rules consist of and how they are established in this specific example follows. The case study auditing firm has (1) general policies about engagement risk based on professional and/or internal standards, and (2) specific policies about business risk factors, e.g., management integrity, scope of audit, competence of auditor, and audit risk, e.g., reliability of entity's records, "control consciousness" of management. These policies or standards translate into expert rules.

In addition, the audit firm has format or informal policies that reflect its risk tolerance, and which fluctuate with its current position. Can it afford to take risk? Can it afford to reject a potentially profitable engagement? This provides a threshold on which to base a decision to accept or reject in Step 19. In this case the risk tolerance is low to moderate. Together, the expert rules about engagement risk, management integrity, scope of audit, competence of auditor, reliability of entity's records, "control consciousness", and threshold of risk tolerance form the preprocessed expert input parameters.

An explanation of what the user inputs consist of and how they are established is as follows. The engagement partner, or his/her delegate(s), collects data relevant to engagement, business and audit risk factors identified in the preprocessed inputs. They may use formal or informal inquiries, surveys, opiaionaires, or documents etc., based on prescribed questions. The data collected may be linguistic or numerical; precise, imprecise, probabilistic, vague, or ambiguous. It is weighted by the auditor, and becomes the user input.

Step 17 performs the same operations regardless of the application, and regardless of what the desired outcome is to be. In this case, because the risk tolerance of the audit firm is low-moderate, the limits are conservative. The inference engine with the new implication operator is used to determine mathematically the degree of proof of "low risk" and the degree of possibility of "high risk". For example, if the envelope of possible engagement risk matches the policy closely, the belief in "low risk" is high, and the possibility of "high risk" is low. This is the output of the machine reasoning.

The output 19 of the inference engine can be presented to the auditor graphically or numerically with an explanation, or rationale for the results. In this case the decision to accept, reject, or continue the analysis is left up to the user. The algorithm can also be used to make recommendations based on the outputs. For example, if the degree of proof of "low risk" is above predetermined threshold, and the possibility of "high risk" is below the predetermined threshold the recommendation would be to accept, provided the evidence were strong enough. "Strong evidence" corresponds to a high value of <Bel> and requires the accumulated evidence to be relatively complete, of high credibility, and consistent. If the degree of proof of "low risk" is below the predetermined threshold, or the possibility of "high risk" is above the predetermined threshold, the recommendation would be to reject, again provided the evidence were strong enough. If the evidence is weak, the output is deemed inconclusive and the recommendation would be to collect more data. The algorithm provides rationale and paper trail to support the recommendations.

FIG. 9a shows how the algorithm would be applied in the initial stages of decision-making by the audit firm. Initially, opinions would be solicited from a few well-informed individuals about the corporate entity's reputation (which corresponds to risk assumed by the accounting firm of not getting paid or being otherwise deceived) and the state of the entity's records (which corresponds to the risk assumed by the accounting firm that the audit will take too much time to be profitable or cause the firm to err in its judgment). This collection of a few opinions together with very few rules is called the coarse-gained analysis.

If the result of this initial coarse-grained analysis is inconclusive, then more data is collected about the same issues (business risk and audit risk) and more complicated rules are applied. For example, instead of simply soliciting four opinions about the corporate entity's reputation to get the business risk, factors contributing to business risk are assessed individually: the entity's honesty, the scope of the audit and the competency of the auditor. Similarly, audit risk is dissected into two factors, reliability of records and management control consciousness. For each of these factors, opinions would be solicited and aggregated, just as with the coarse-grained analysis. A more elaborate system of rules relates these contributing factors ultimately to engagement risk. This procedure is called the fine-grained analysis (FIG. 9b). Similar decision criteria for the possibility of high risk and the degree of proof of low risk are applied once the accumulated evidence is strong enough to be conclusive. Note that the process is circular. Data collection continues only until a definite conclusion is reached. No more data need be collected once the degree of proof is sufficient, the strength of evidence is sufficient, and the possibility of high risk is below the threshold. If however after as much evidence as is practicable has been collected, and the aggregated evidence is still too weak (low credibility, inconsistent, missing data) then the decision would be to reject rather than proceed towards even finer-grained analysis.

The system 11 may be applied to any situation requiring professional judgement where risk is an issue, examples of which are but not limited to performing audits, business decisions involving venture capital, and in gathering and accessing evidence in litigation situations.

Autonomous robots capable of searching out the information they need to make decisions and software agents would be other examples.

By way of example, the following illustrates the use of the process in risk assessment by an audit company trying to decide whether it should accept an audit engagement (an invitation to audit a corporate entity). The audit company uses the process implemented in a software package which incorporates features of the present invention. FIGS. 46 to 85 inclusive show various stages of a graphical user interface of the package, from initiation to completion of the decision-making process. During this procedure, the interface permits the parameters used in the fuzzy logic process described above to be set.

Figure 46:
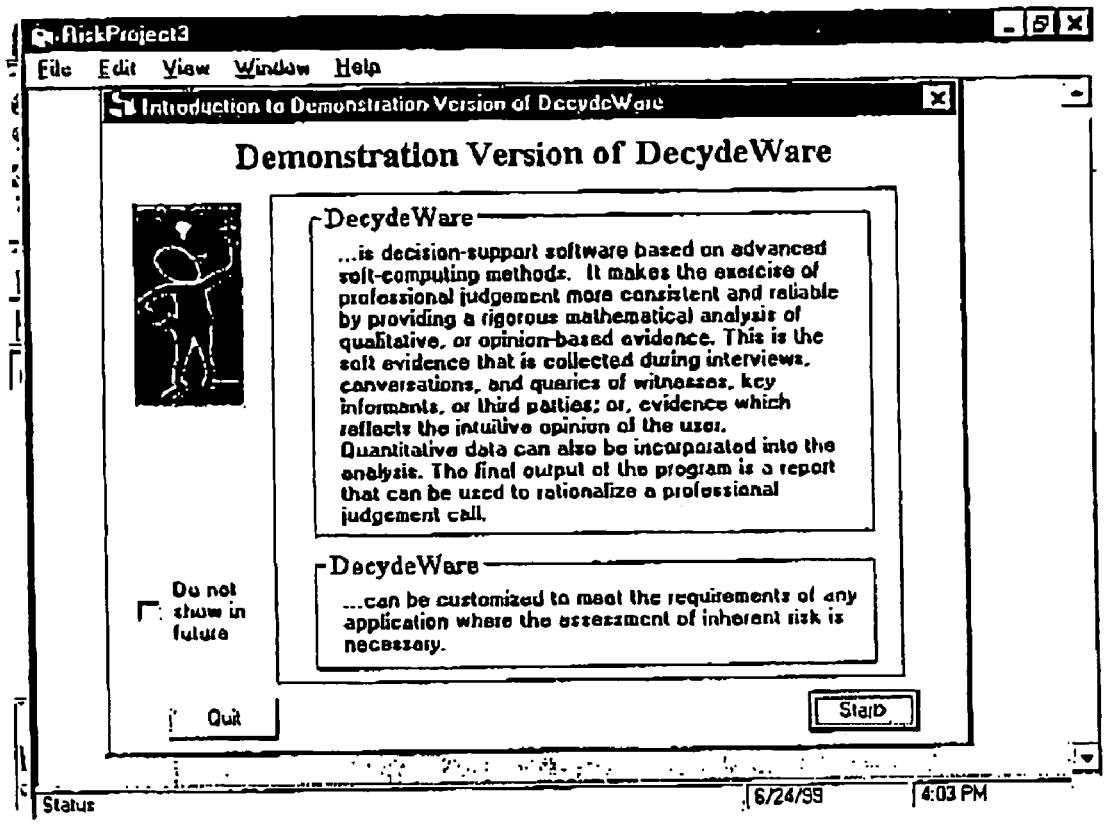
FIGS. 46 to 85 show an example application of the fuzzy logic decision making process.
Figure 47:
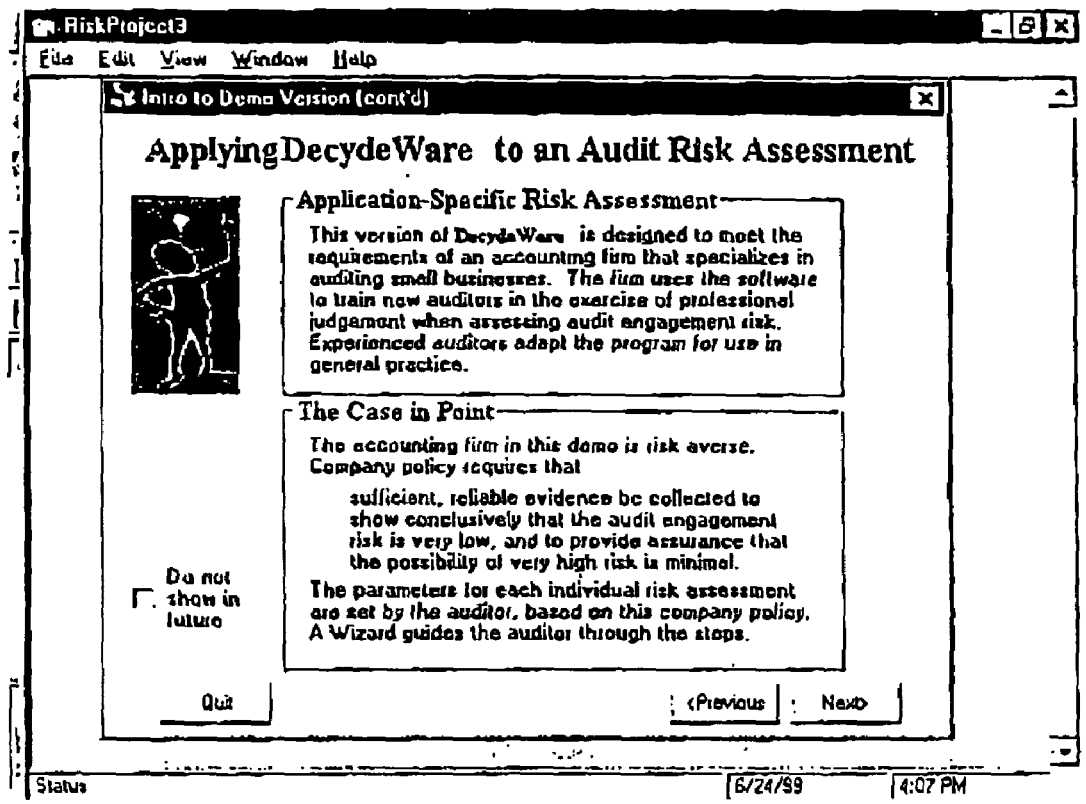
Figure 48:
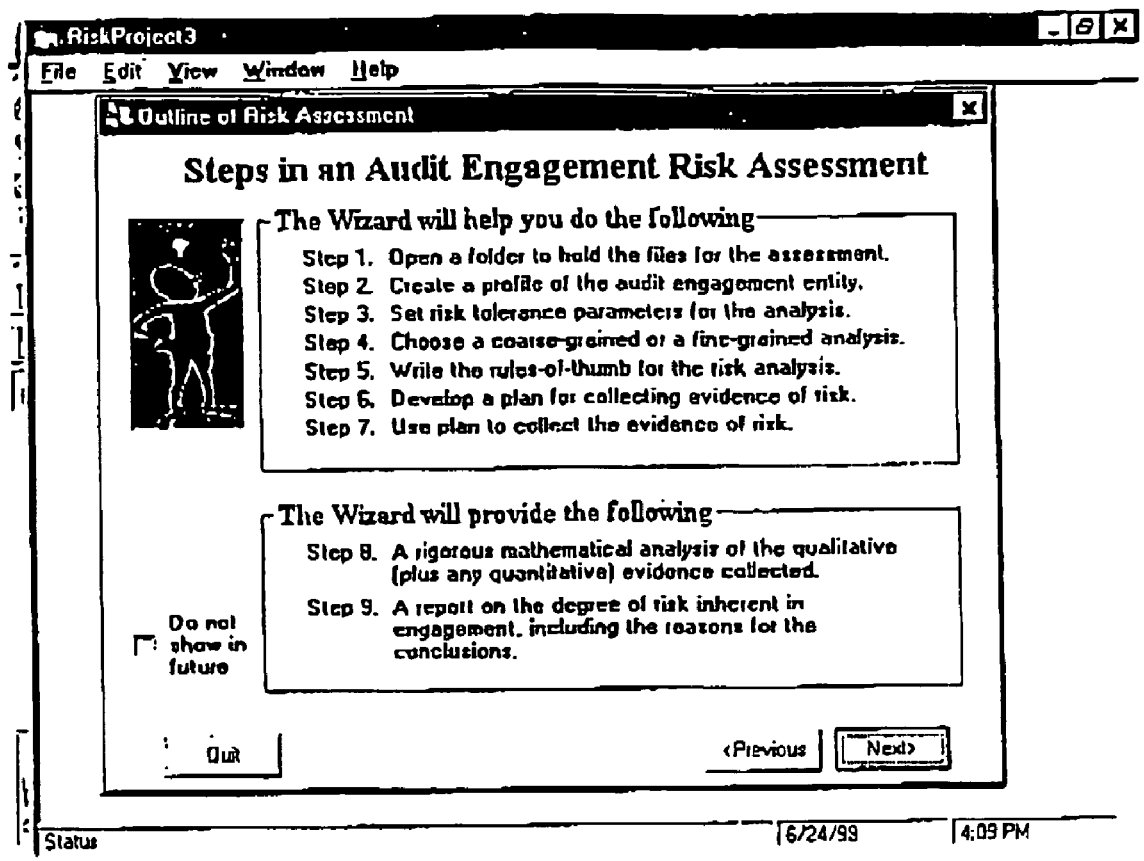
Figure 49:
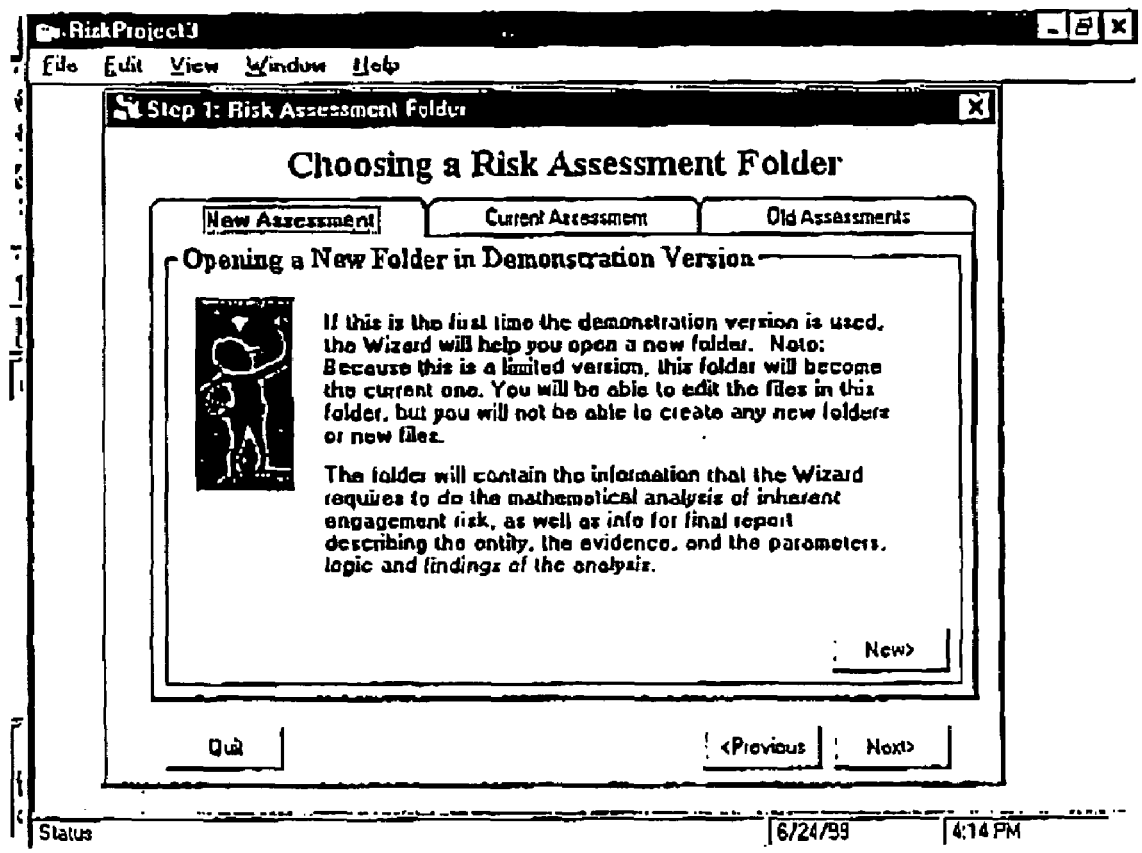
Figure 50:
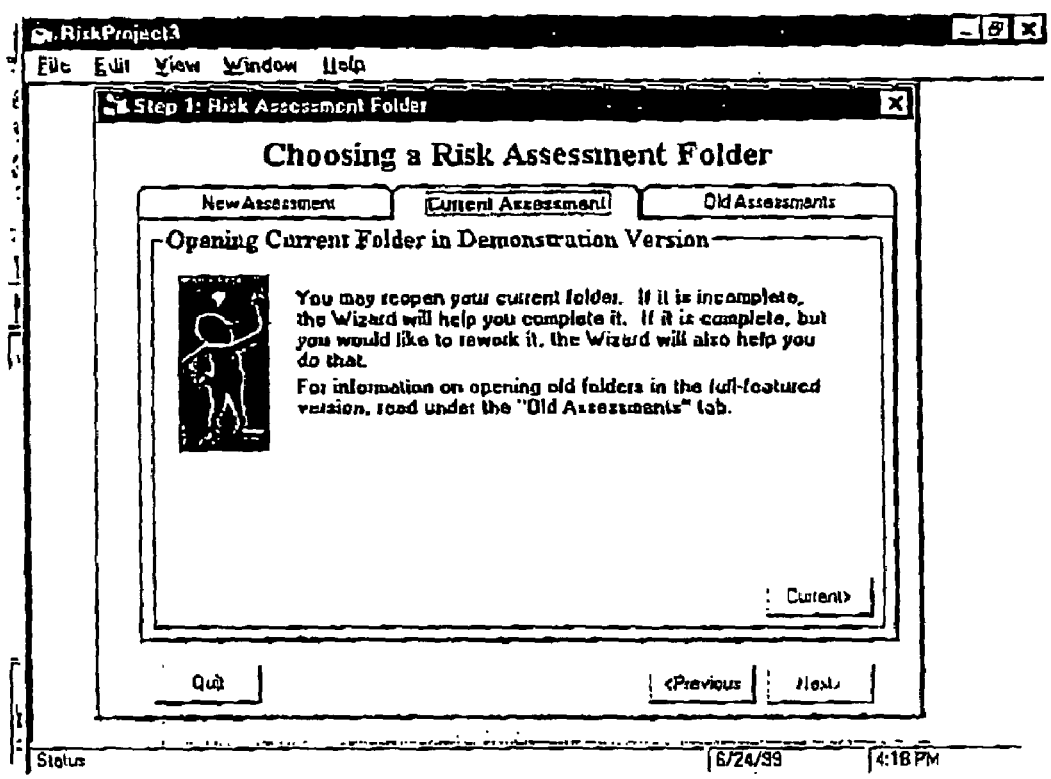
Figure 51:
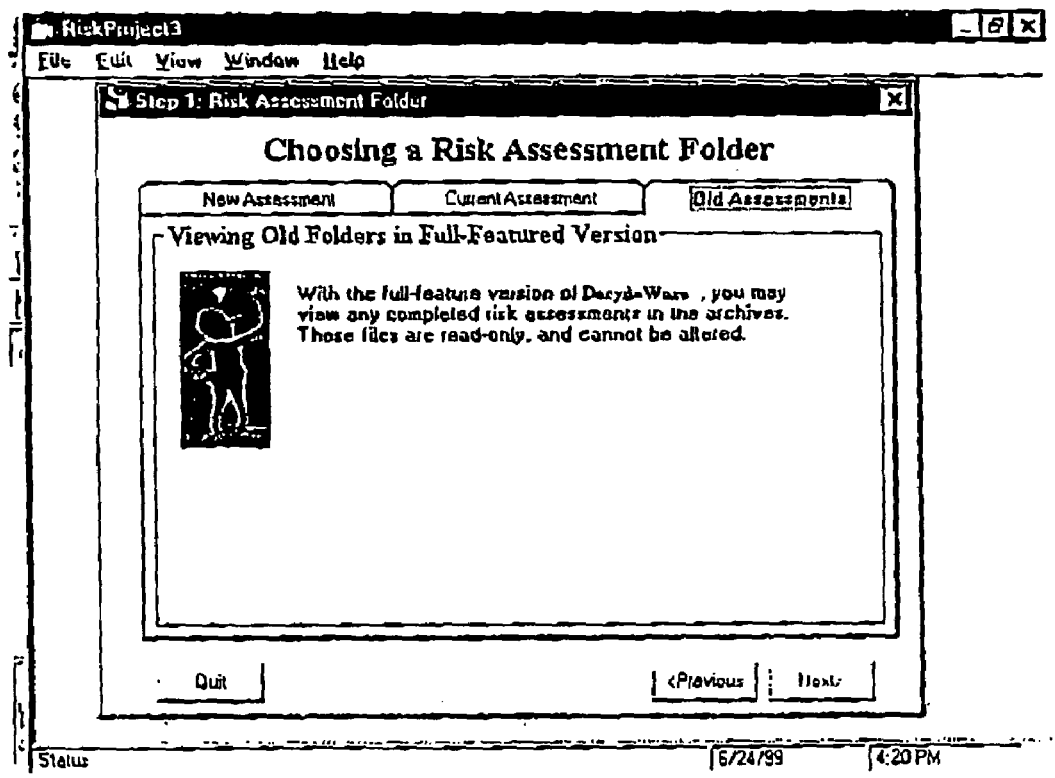
Figure 52:
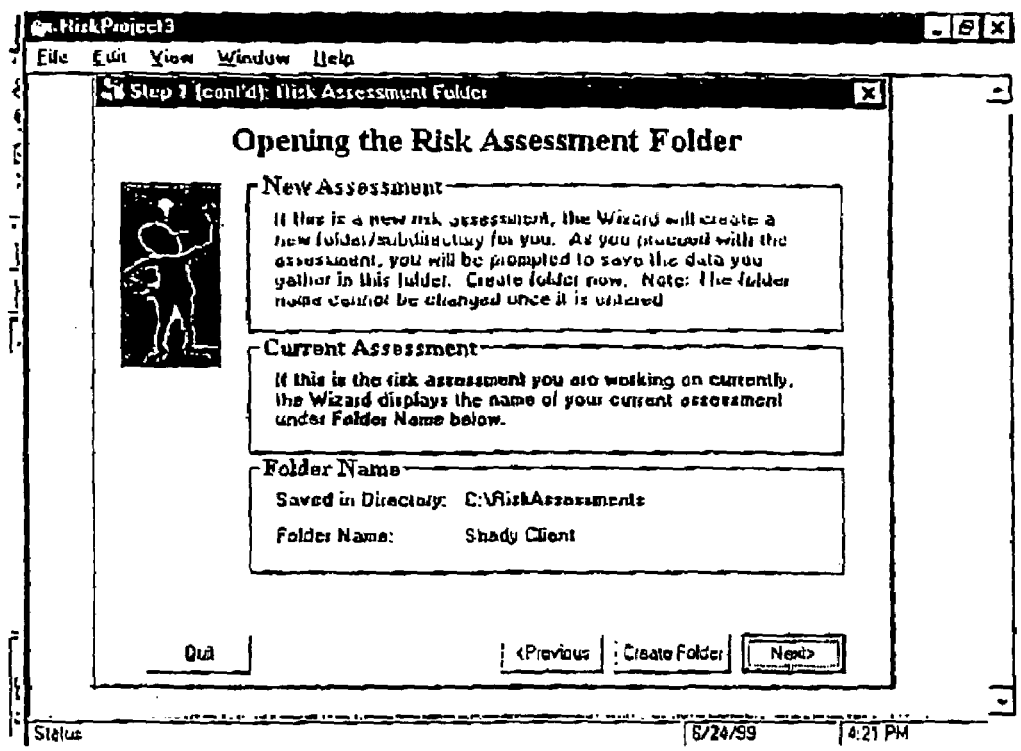
Figure 53:
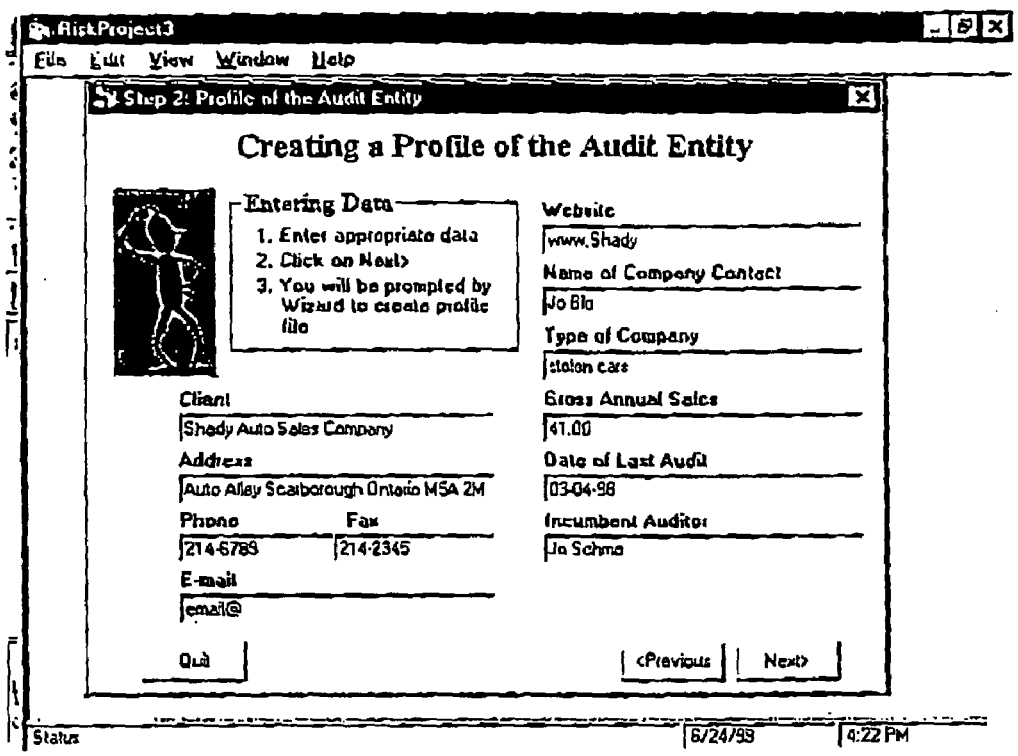

FIGS. 46 and 47, are introductory screens that introduce a user of the package to the risk assessment software. FIG. 48 is an overview of the steps involved in the case study for education of the user. FIGS. 49, and 50, 51 provide information to the user as to the potential types of folders available, such as new, existing, and archived cases respectively. FIGS. 52 and 53 demonstrate the opening of an existing audit file and a series of example data fields used to identify the corporate entity which requested the audit.

Figure 54:
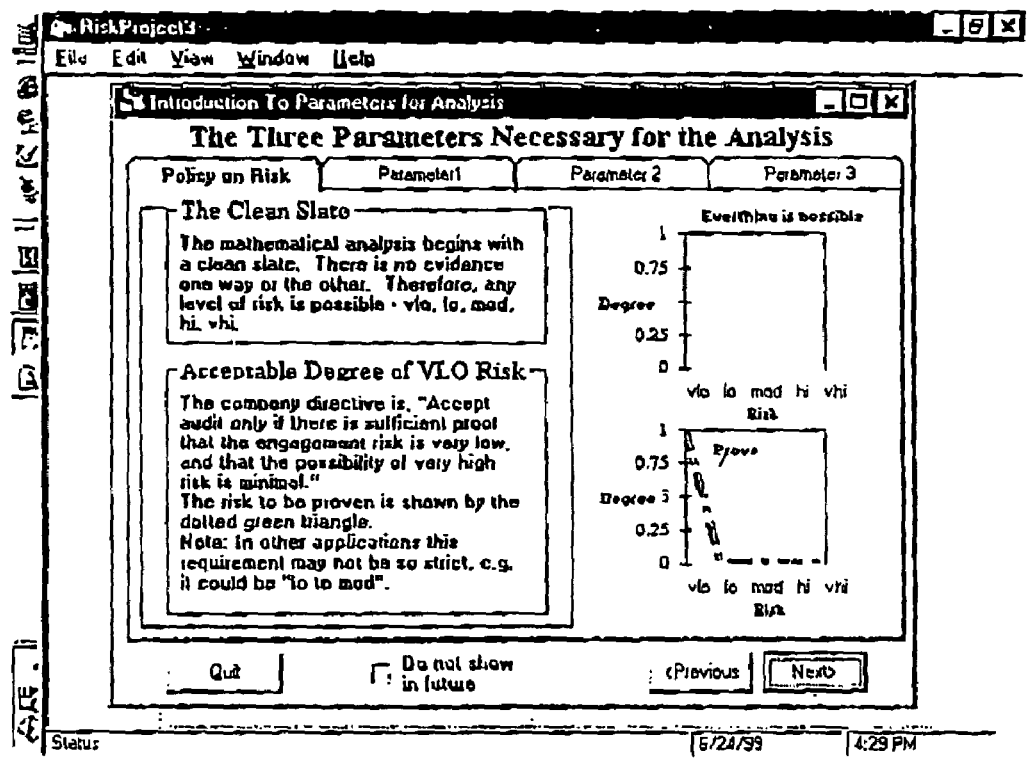
Figure 55:
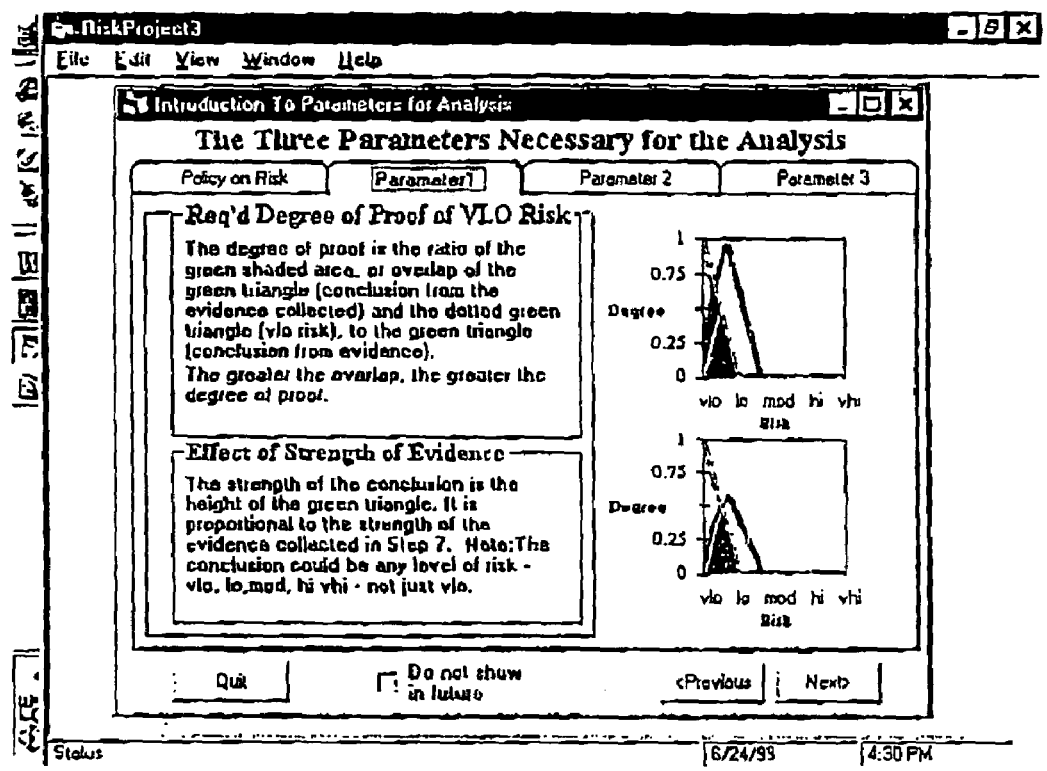
Figure 56:
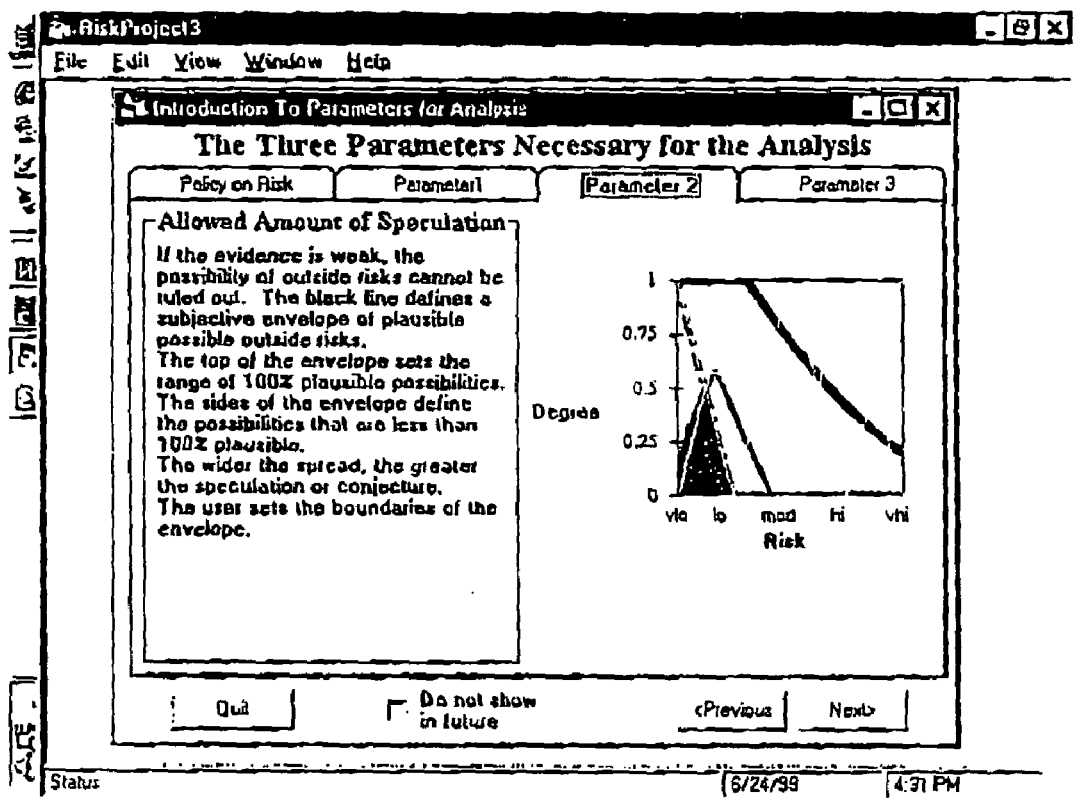
Figure 57:
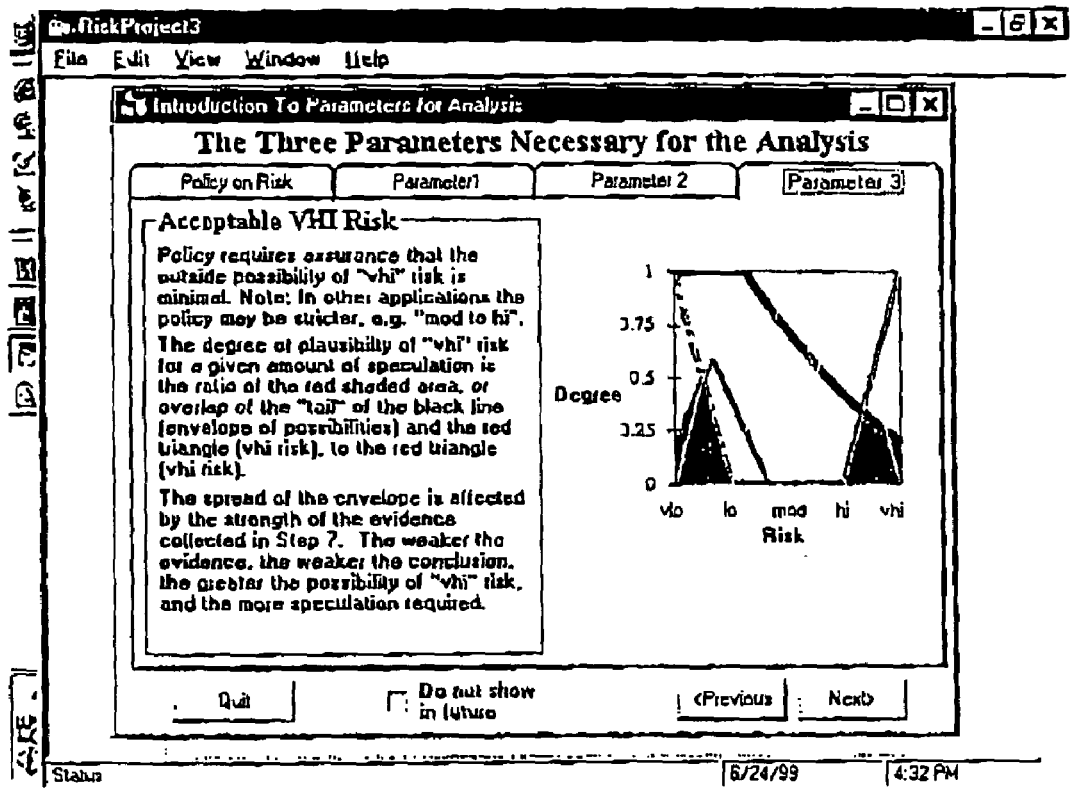

FIGS. 54, 55, 56, and 57 provide expository materiaL. They describe the significance of parameters $H_{min}$ and $K_{min}$ respectively, as initially referred to in FIG. 9a; and of $S_1$ and $S_0$, referred to in FIGS. 30 and 9a. FIG. 54 illustrates the assertion "G", very low risk, to be proven, by a dotted triangle, as originally referenced in graph 193 (fuzzy set labelled "G") of FIG. 19. FIG. 56 introduces the envelope of possibility originally referenced in graph 192, curve labeled $B_B^*(y)$ also of Figure 19.

Figure 19:
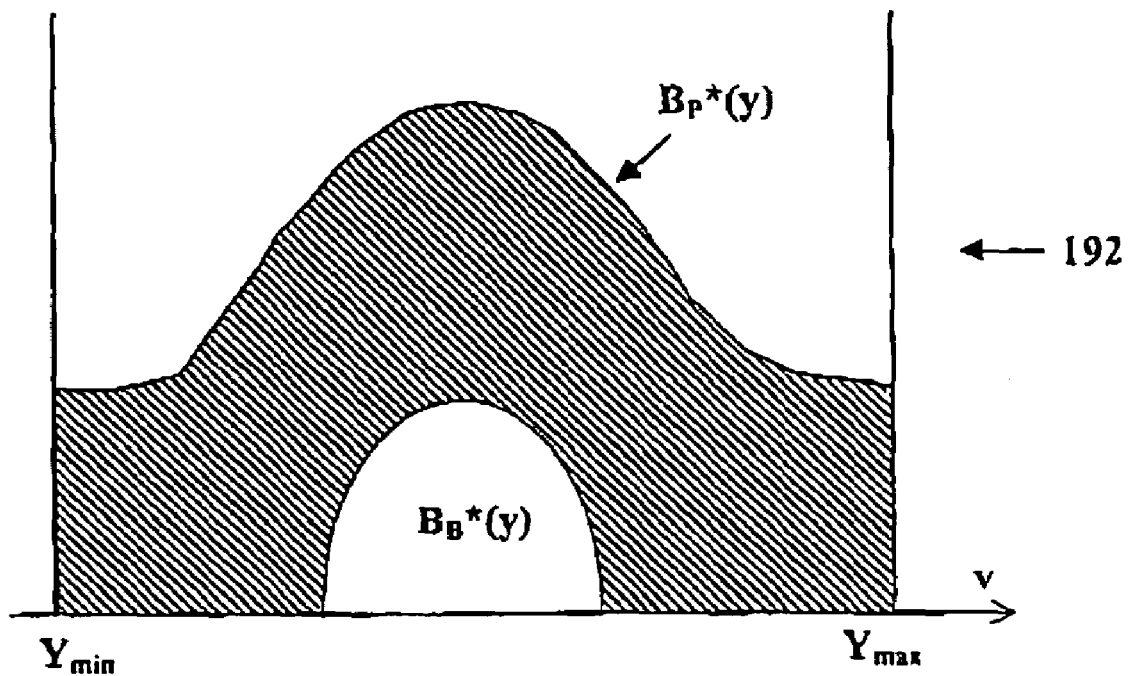
FIG. 19 shows how the envelopes of possibility and belief are compared to the assertion to be proven.
Figure 19:
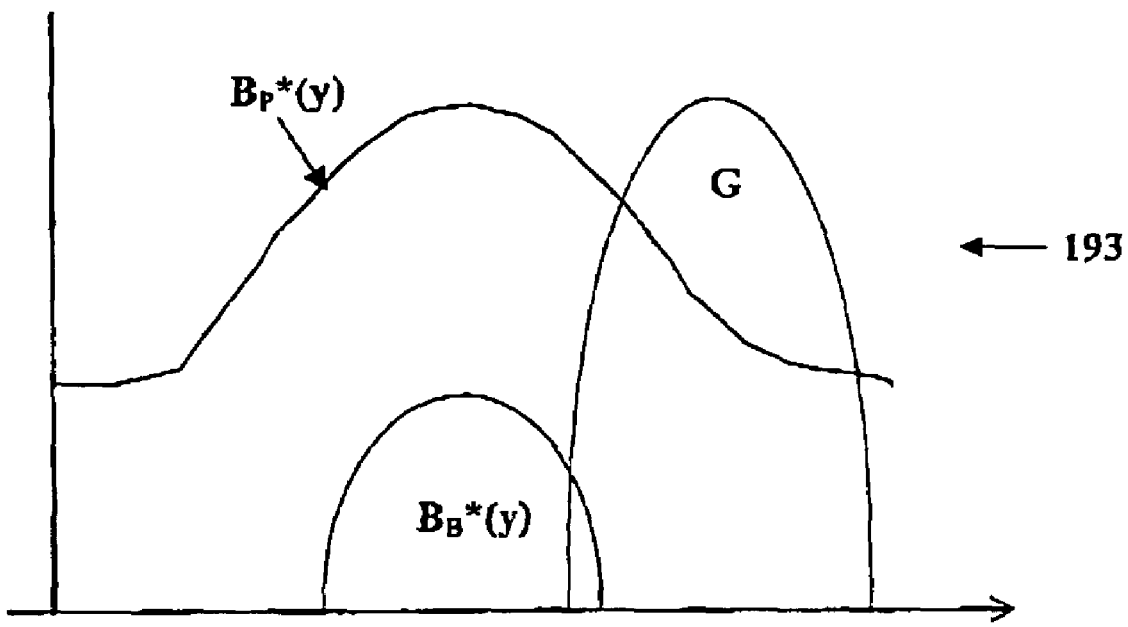
Figure 20:
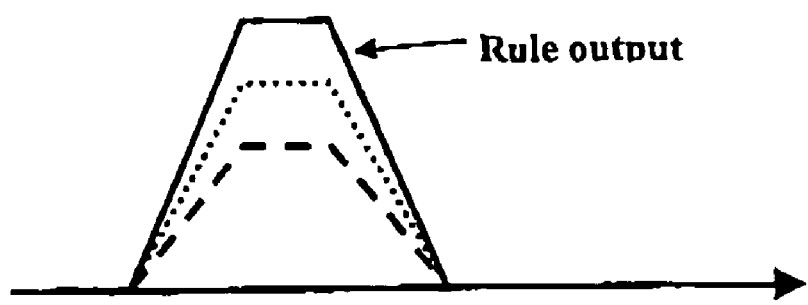
FIG. 20 shows existing fuzzy logical operators
Figure 20:
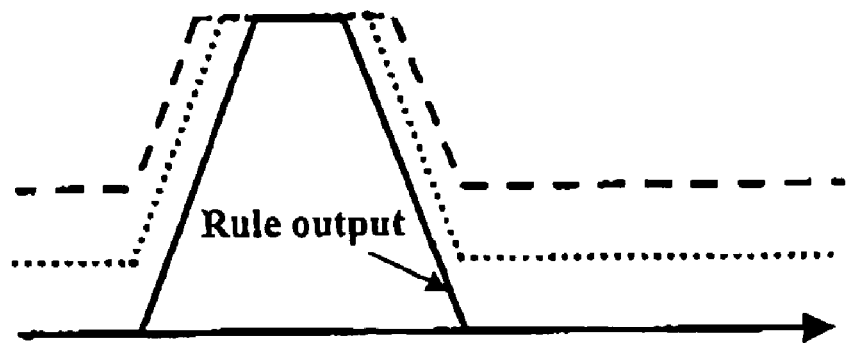
Figure 20:
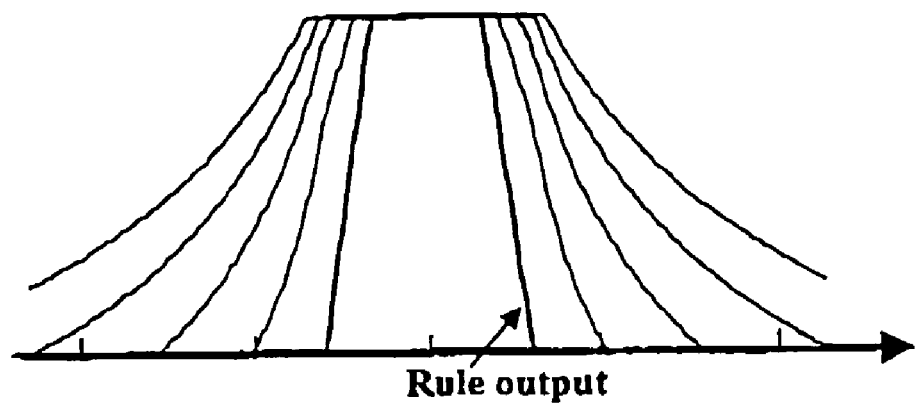
Figure 58:
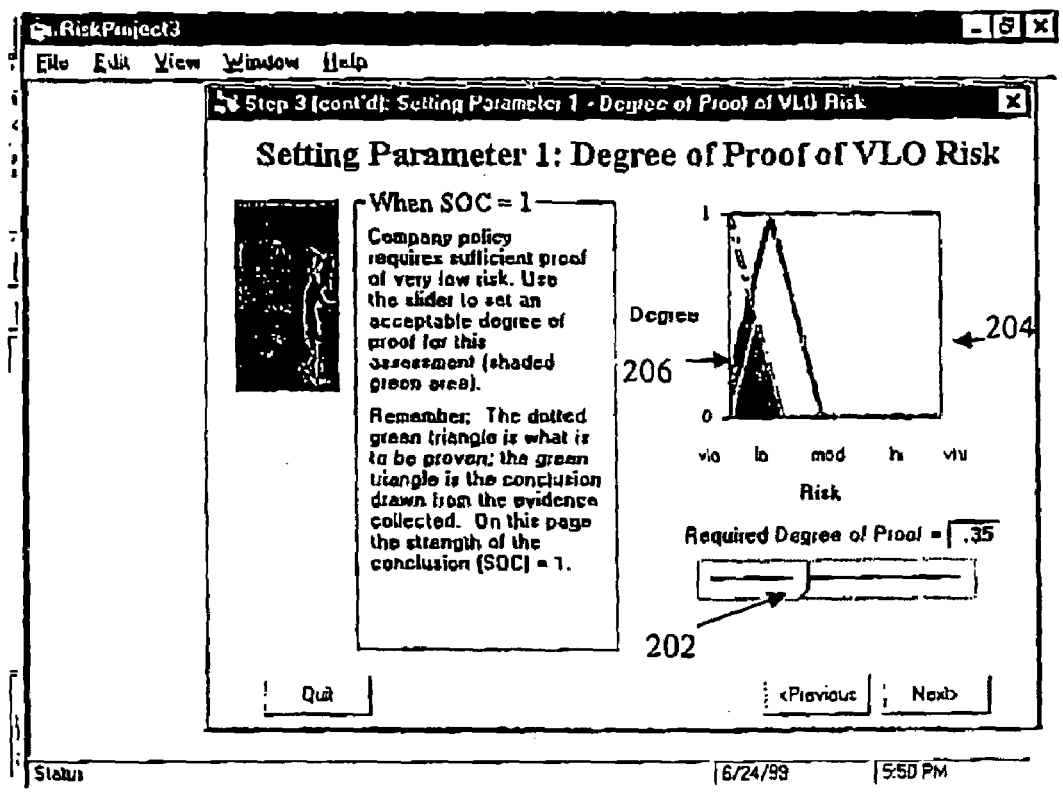
Figure 59:
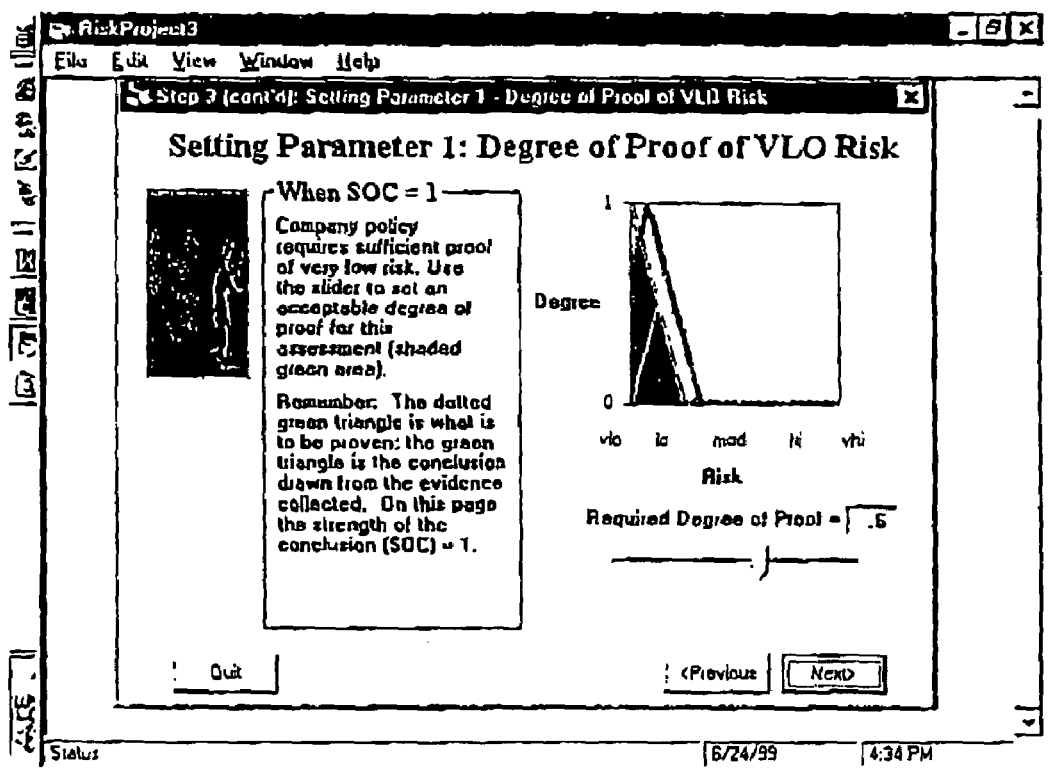

FIGS. 58, 59, 60, 61, 62, 63, 64 and 65 are where the expert parameters ($H_{min}$, $K_{min}$, $S_0$ and $S_1$) are actually set. FIGS. 58 and 59 demonstrate how $H_{min}$, the required degree of proof as represented by the shaded area, as is set by the expert 11 as the degree of overlap between the dotted triangle (very low risk, which is to be proven) and a solid triangle, which represents the conclusion or envelope of belief drawn from the evidence collected. In FIG. 19, graph 193, the belief envelope $B_B^*$ corresponds to the solid triangle in FIGS. 58 and 59, and the assertion G to be proven to the dotted triangle in FIGS. 58 and 59. The strength of conclusion (which depends on the degree of consistency and credibility of all information sources) at this point in setting the parameters is assumed to be one hundred percent, hence the height of the solid triangle representing the conclusion is unity. "Strength of evidence", "SOC" and "Strength of conclusion" in the software documentation all correspond to the same thing, to <Bel> in the preferred embodiment and to the height of the belief envelope $B_B$ in graph 192. In FIG. 58, the required degree of proof, is set by slides 202 at a relatively low value of 0.35. Such a low degree of proof corresponds to an envelope of belief, indicated by the solid line in the graph 204, offset to the right, of the assertion to be proven. Where the degree of proof is increased as shown in FIG. 59, the overlap 206 is larger showing a requirement for a greater concordance between what has to be proven and the conclusion drawn from the evidence.

FIGS. 60, 61, 62 and 63 demonstrate the effect of changing $S_0$ and $S_1$ and the strength of the evidence on the shape of the envelope of possibility (thick black curve). This is done by setting the sliders 208, 210, 212. The effect of strong evidence in simultaneously narrowing the envelope of possibility and increasing the height of the belief envelope, also referred to as the convergence of the envelope of possibility to the envelope of belief, is shown most clearly in FIG. 62.

Figure 60:
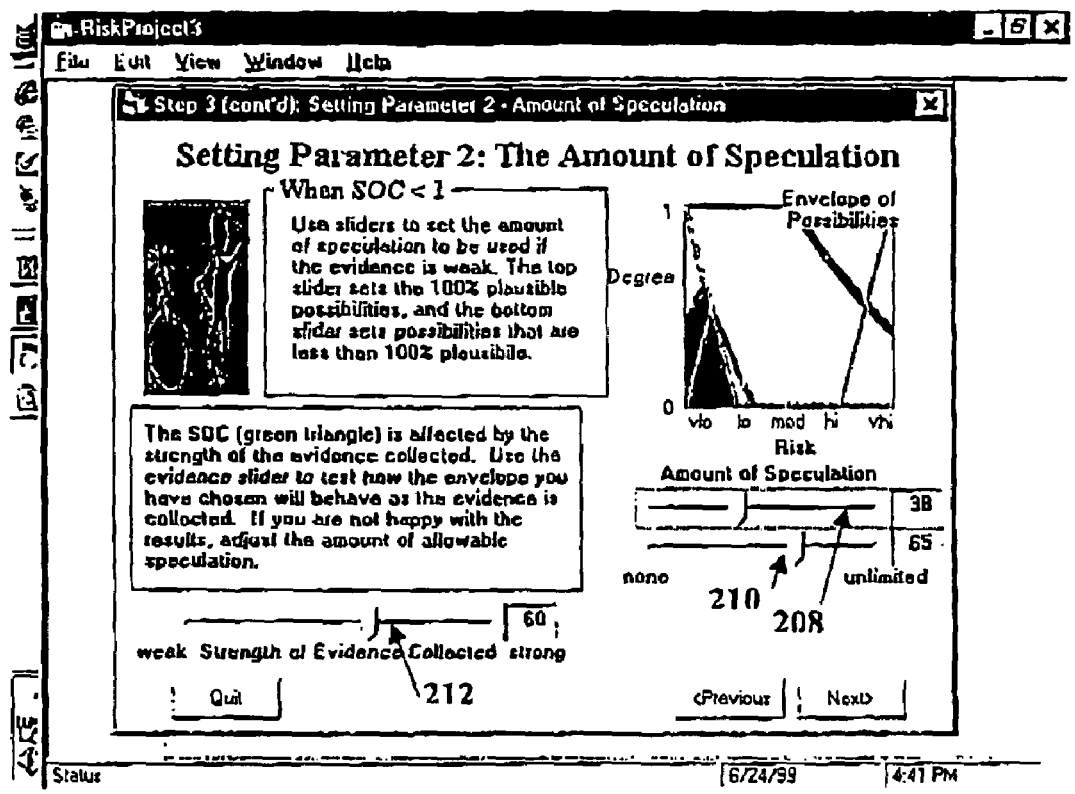
Figure 61:
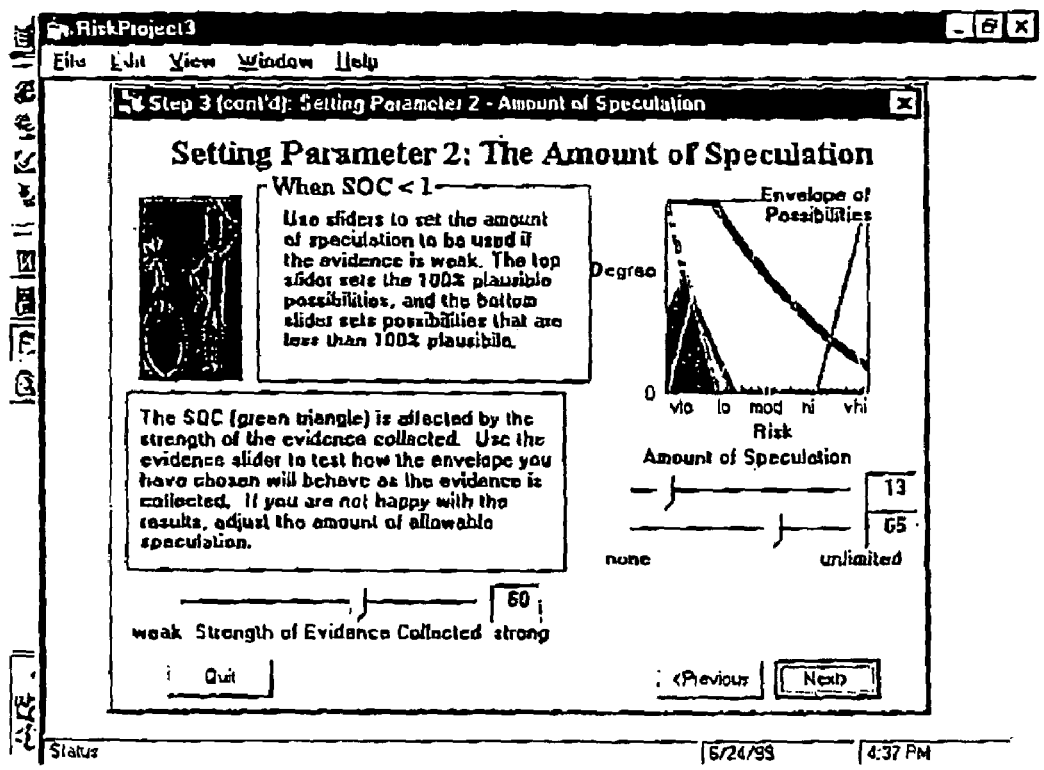
Figure 62:
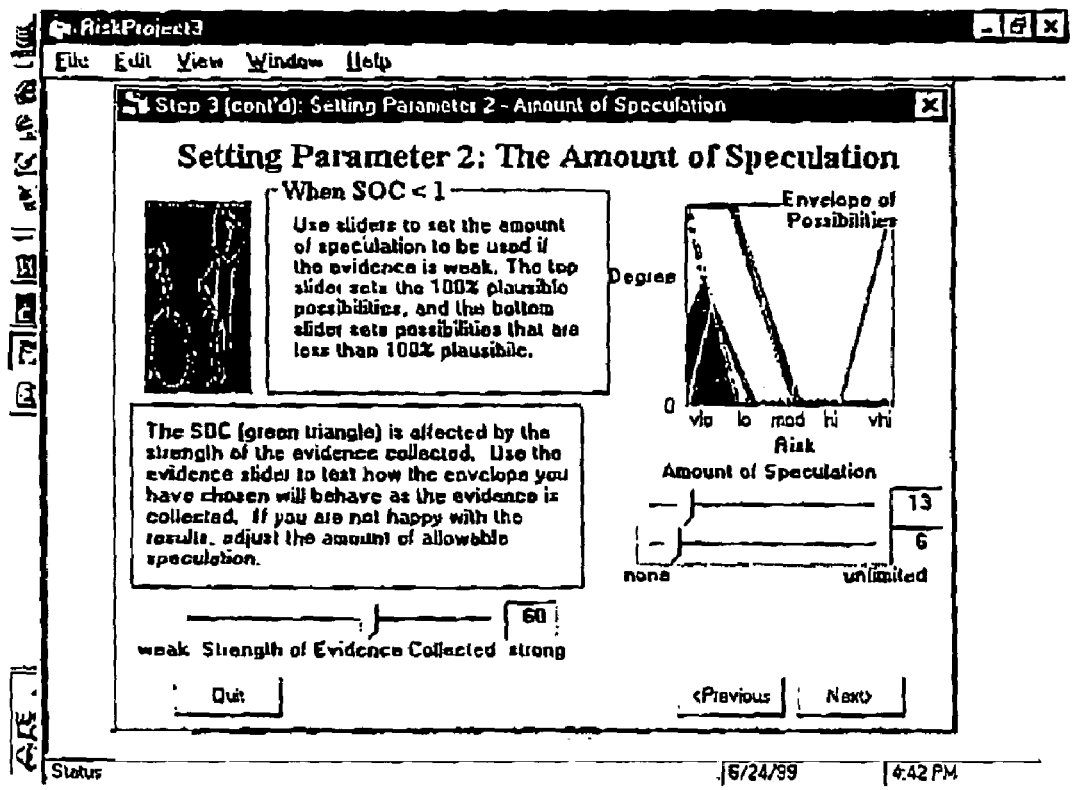
Figure 63:
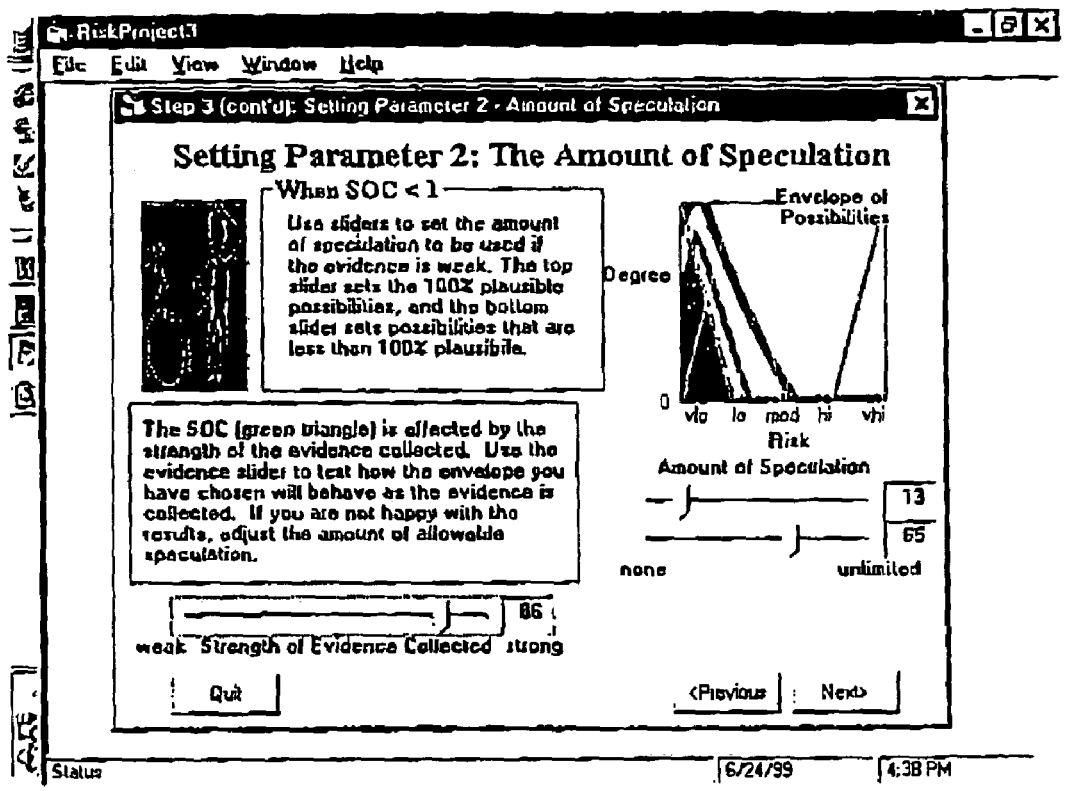

As can be seen from a comparison between FIGS. 60, 61, 62 lowering the degree of speculation for both business risks and audit risk narrows the envelope of possibility while the strength of evidence remains constant. The lower slider controls the how far the tail of the envelope extends, the upper slider how much the top of the envelope broadens. Similarly, increasing the strength of evidence while maintaining the same degree of speculation will also decrease the envelope of possibilities.

Figure 64:
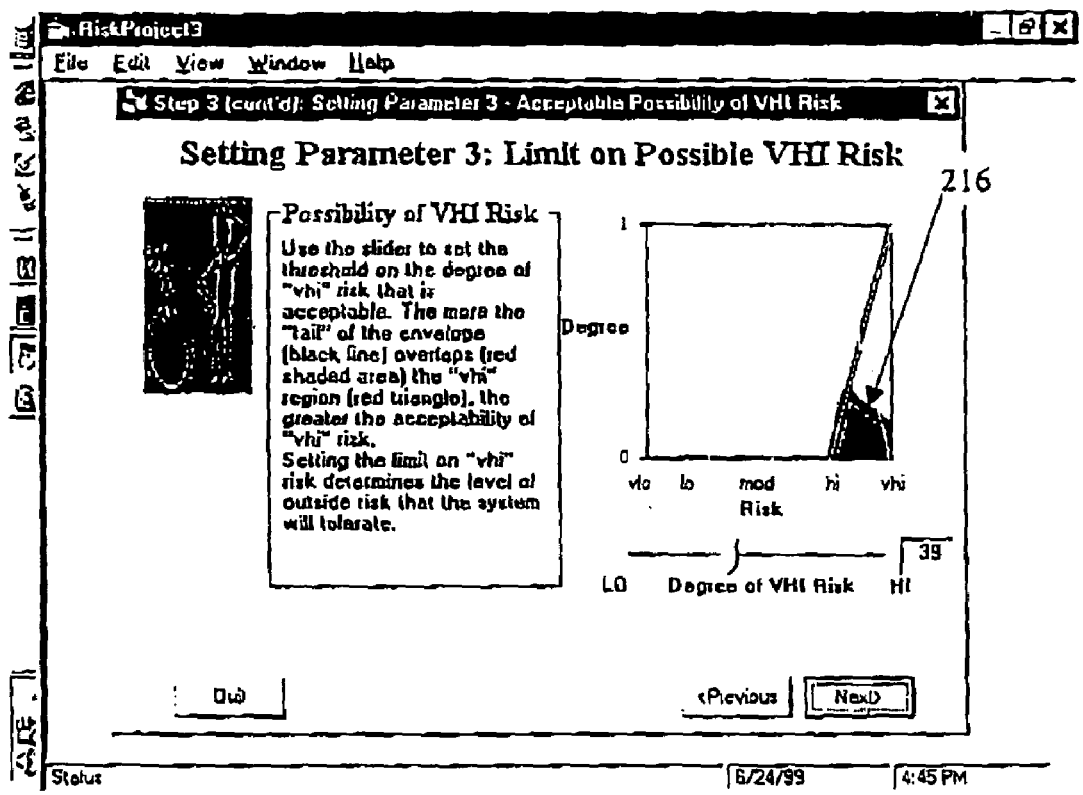
Figure 65:
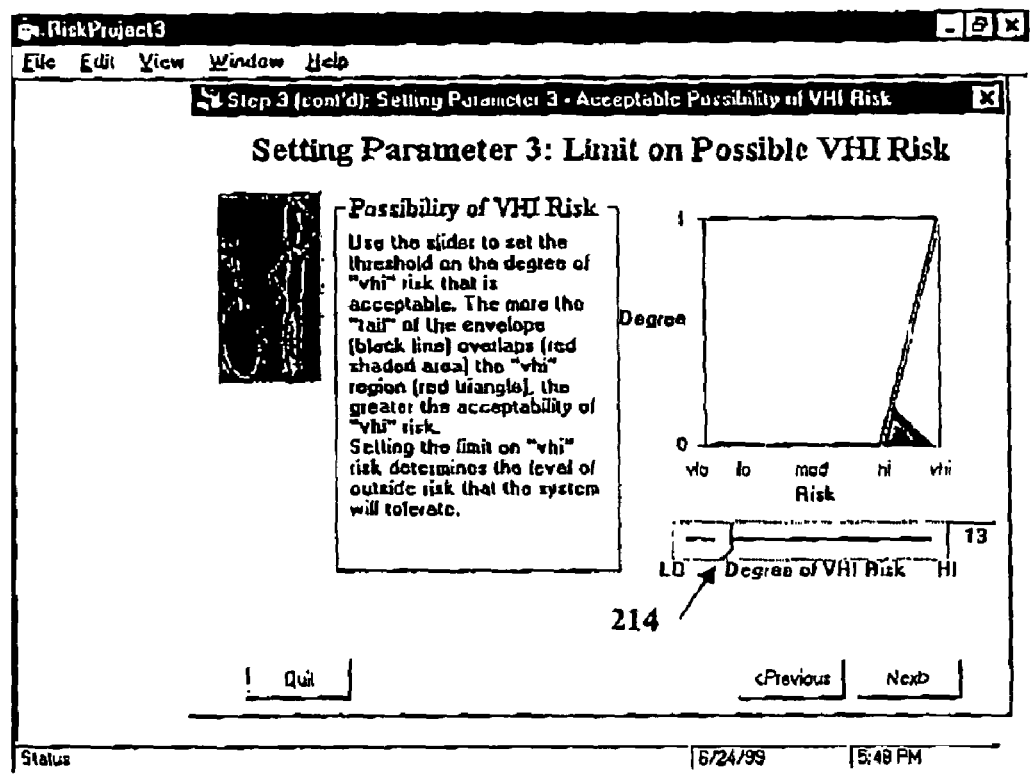

FIGS. 64 and 65 show how $K_{min}$, the upper limit on the possibility of very high risk that is acceptable to the audit firm, is set by the expert using the slides 214. As the acceptable degree of high risk is reduced, the allowable portions 216 of the envelope of possibility in the high risk area is reduced.

Figure 66:
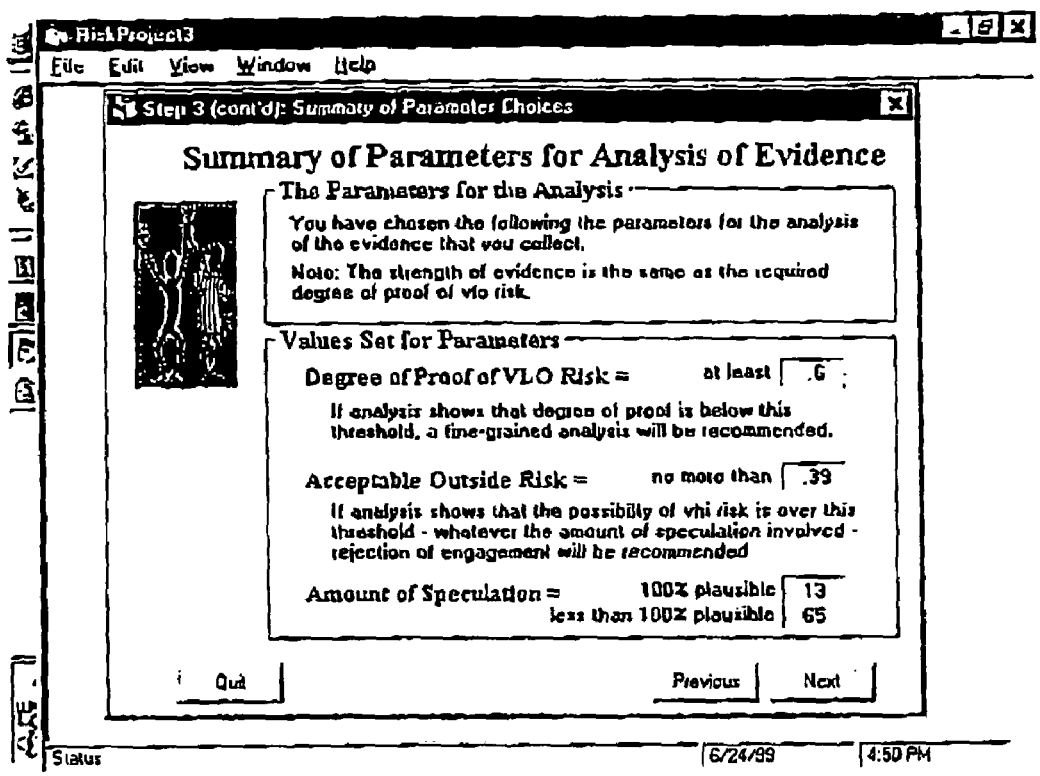

FIG. 66 is a summary of the values selected of each of the parameters. These values are recorded to confirm later that the decision was made using parameter values corresponding to the audit firm's policy on accepting audit engagements.

Figure 67:
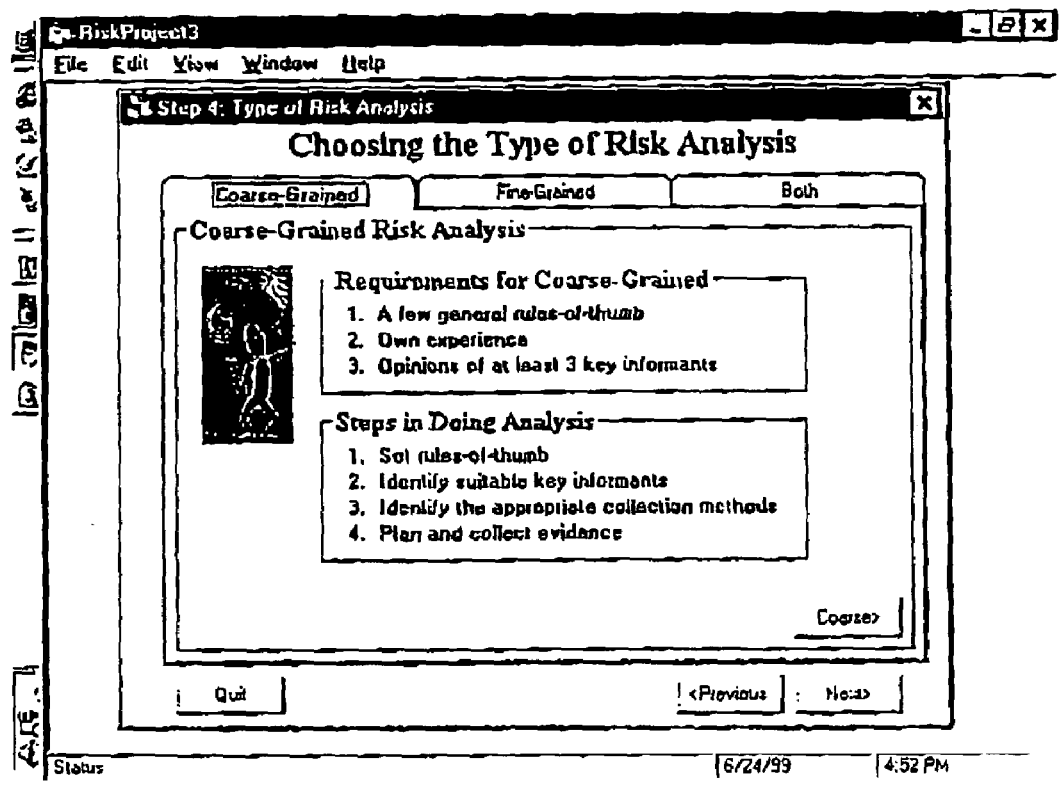
Figure 68:
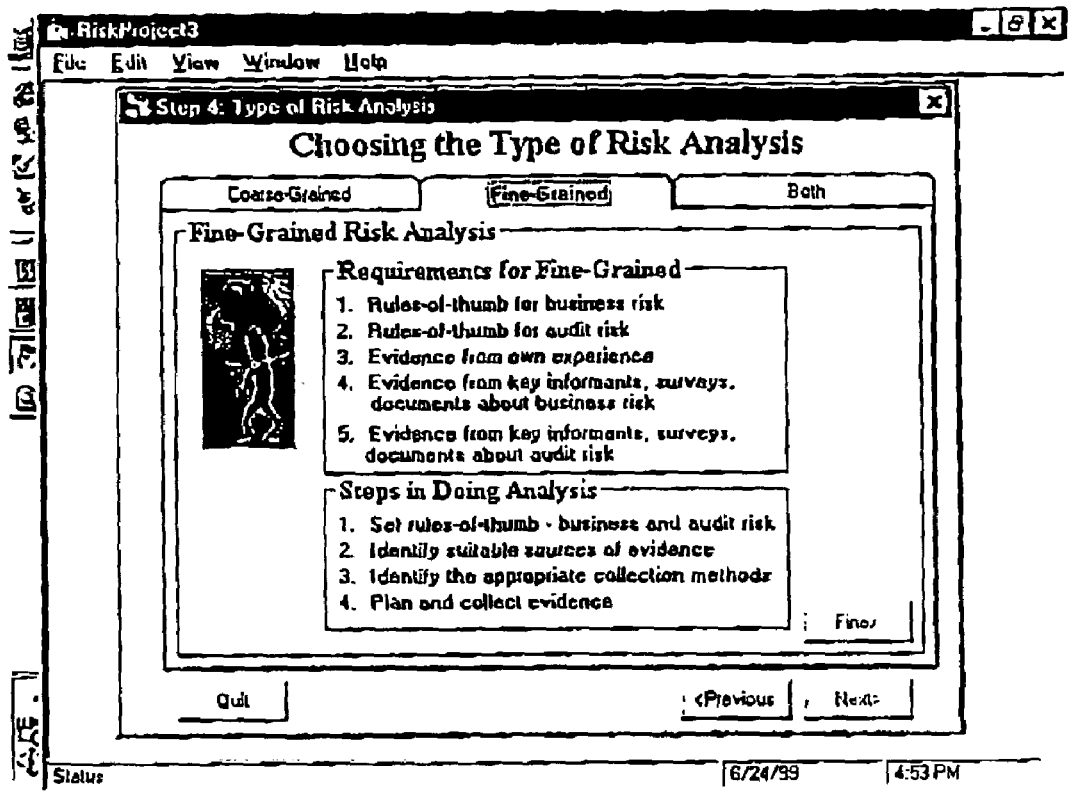
Figure 69:
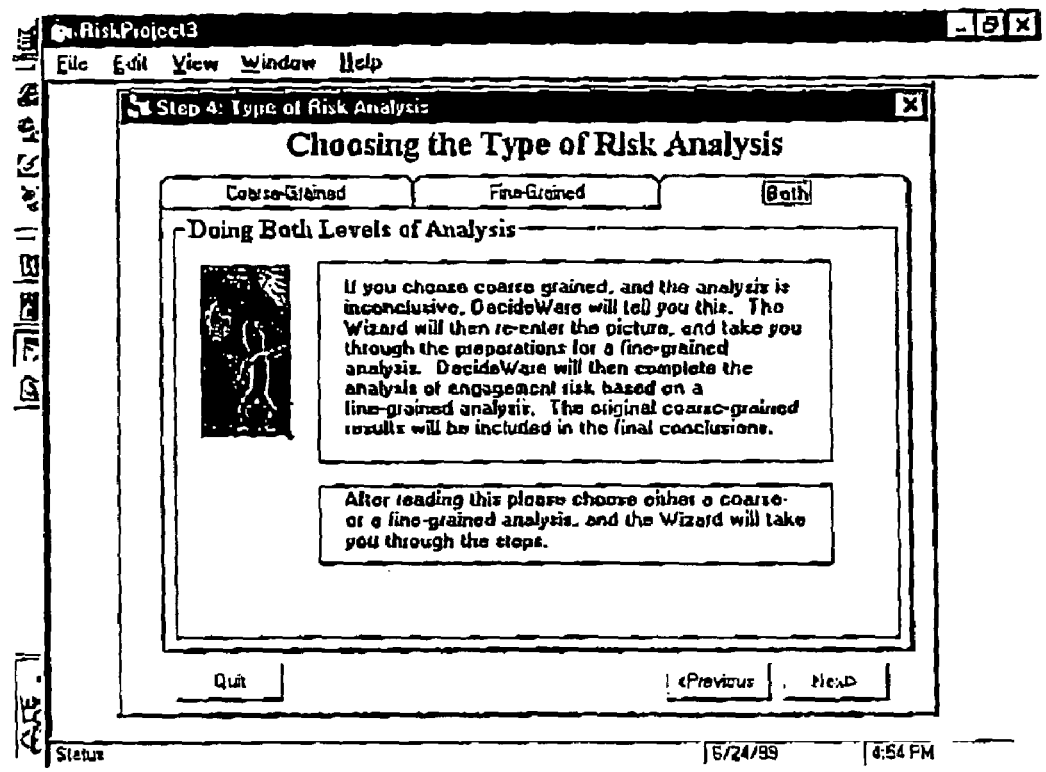
Figure 70:
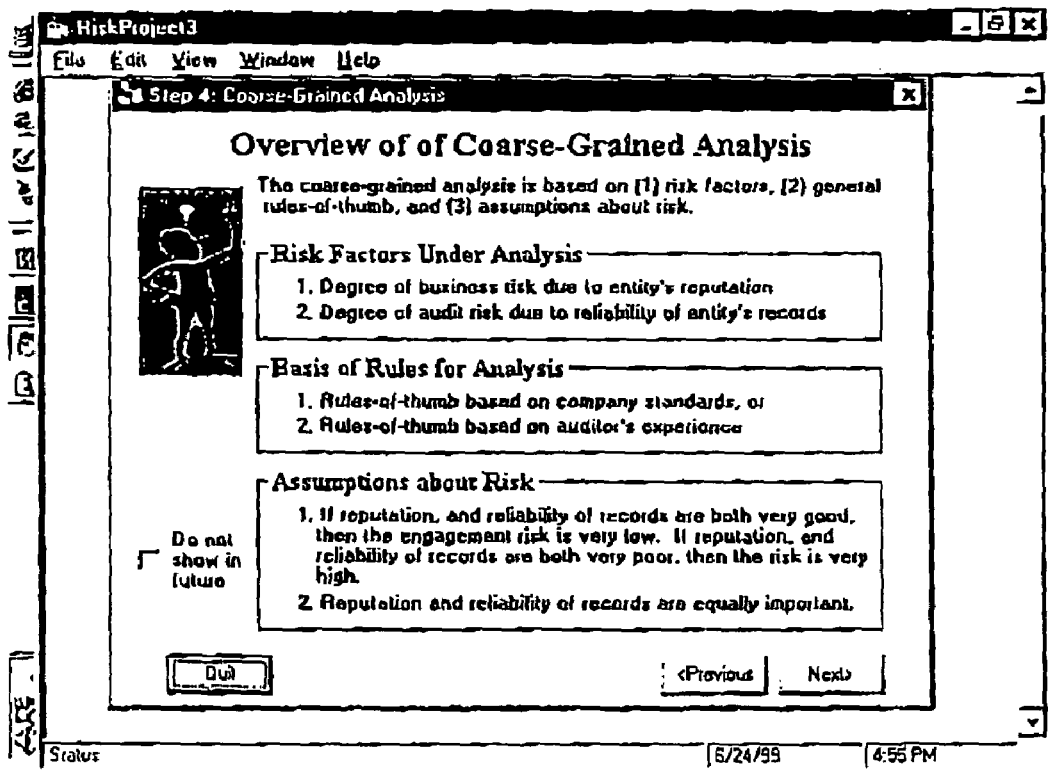
Figure 71:
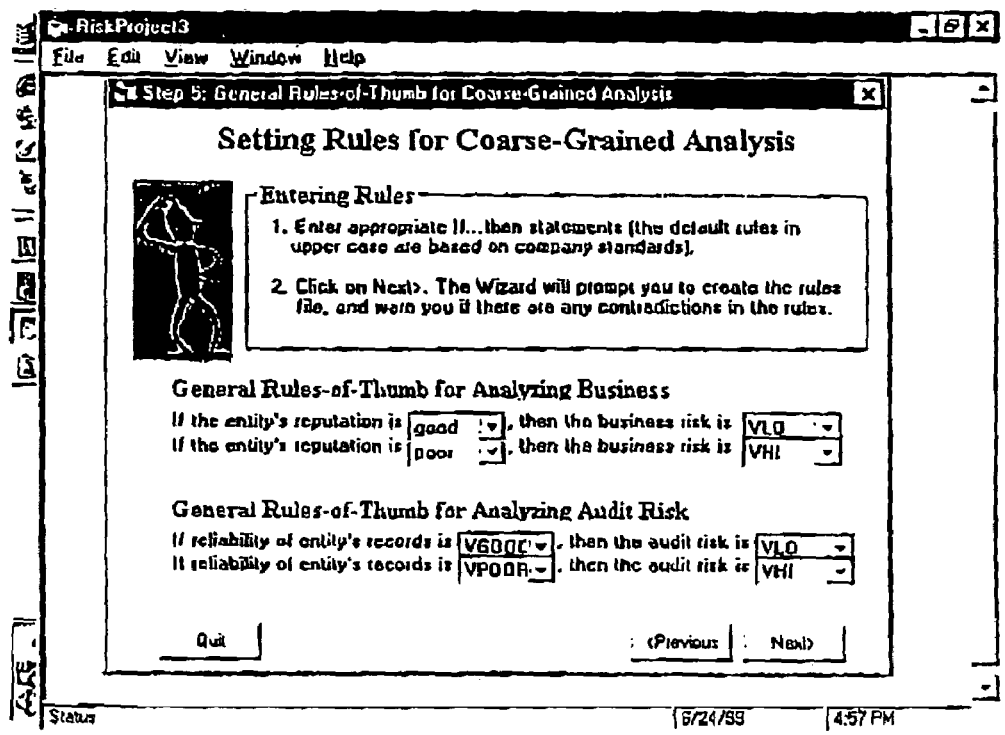
Figure 72:
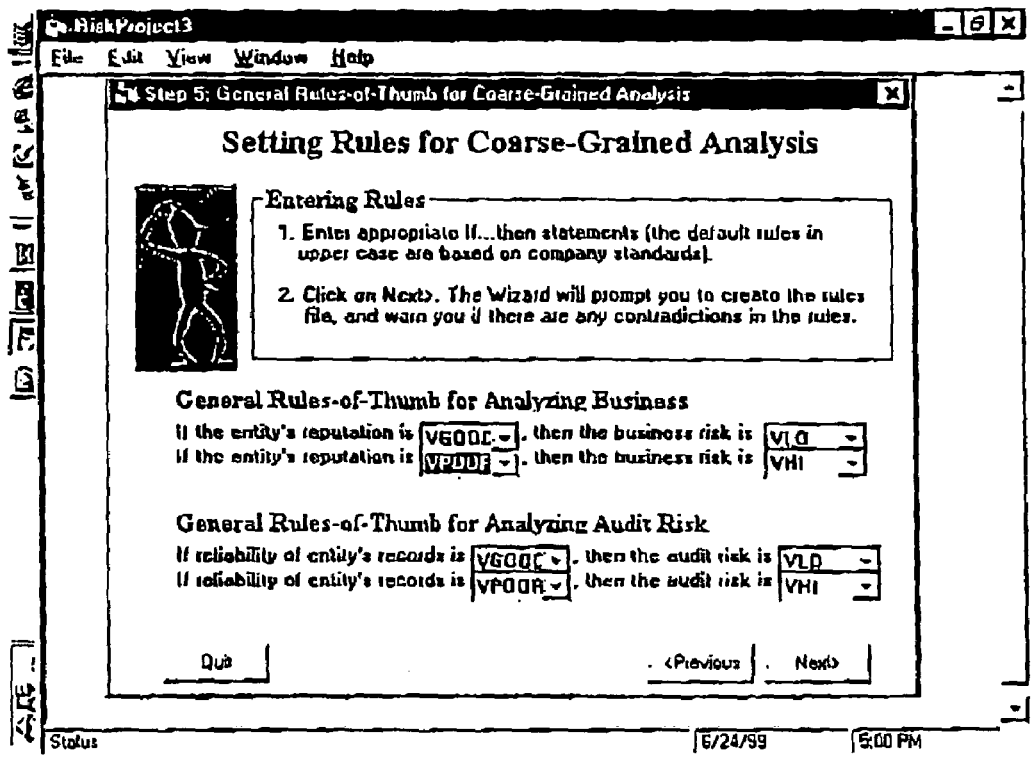

FIGS. 67 to 70 are information screens for the user. FIGS. 67, 68, and 69 provide a list of requirements and the steps involved in conducting a coarse grained, a fine grained, and both coarse and fine grained analyses respectively, as initially referenced in FIGS. 9a and 9b. FIGS. 71, and 72 set out user selectable rules for implementing the risk evaluation on the coarse grained option two. They show two examples of rule selection by the expert of the system 11. Down boxes permit the rule to be selected. Different settings are shown in FIGS. 71 and 72. FIG. 72 shows settings corresponding to the audit firm's policy for the rules to be used for a coarse grained analysis. These are the same rules used for calculations displayed on subsequent figures.

Figure 73:
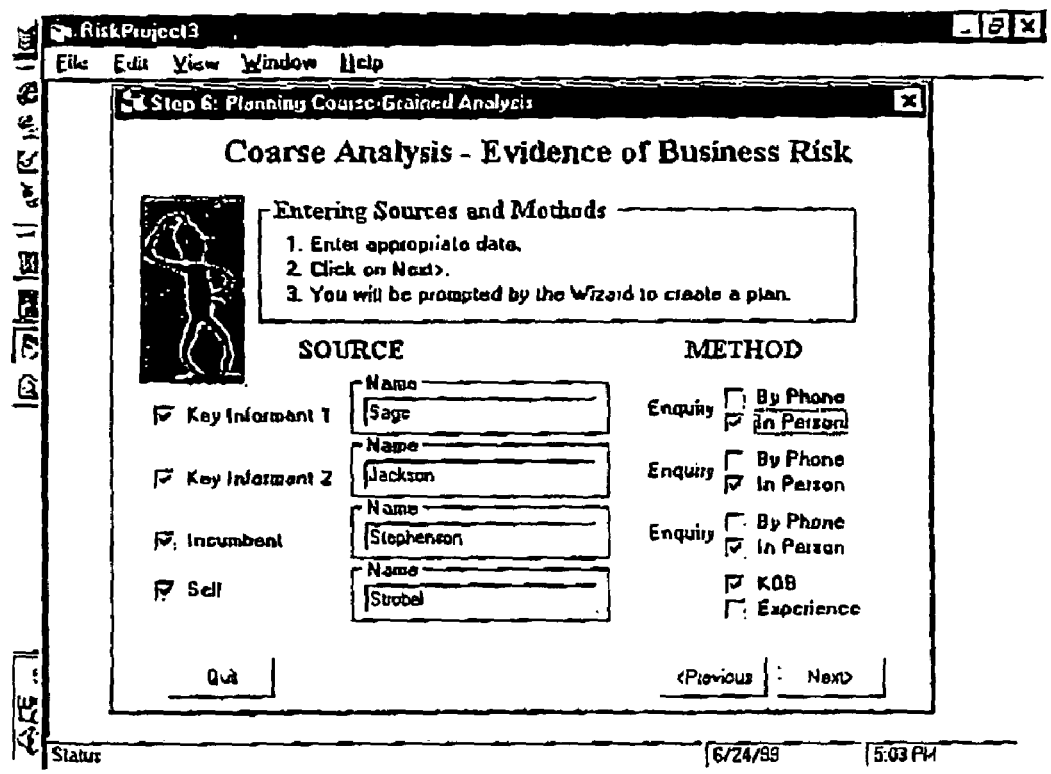
Figure 74:
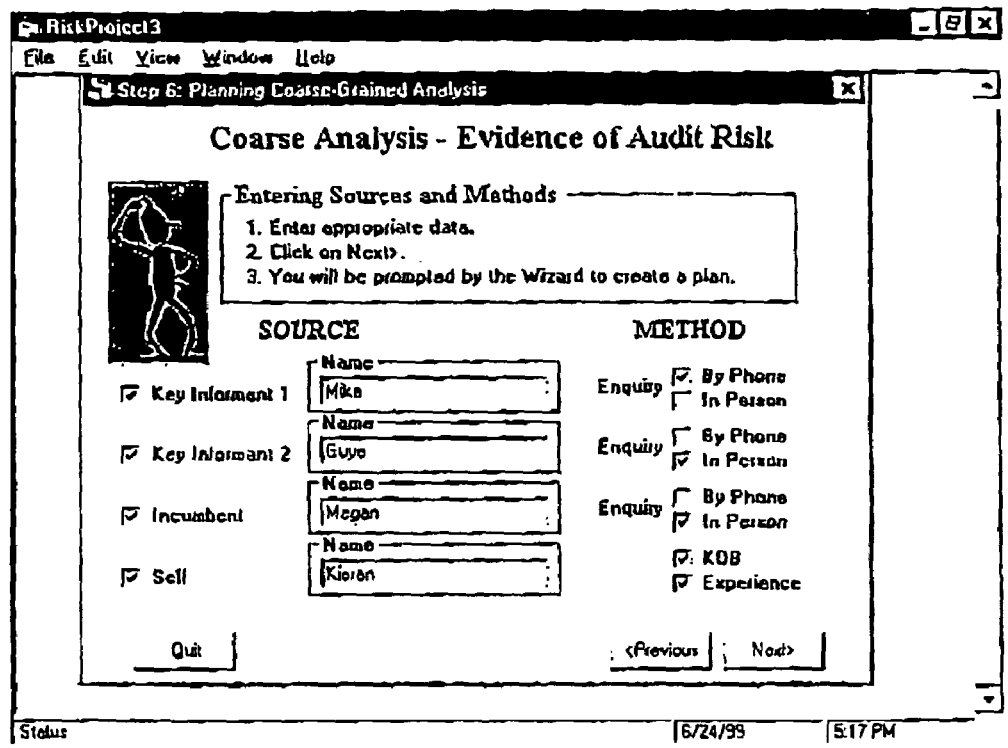
Figure 75:
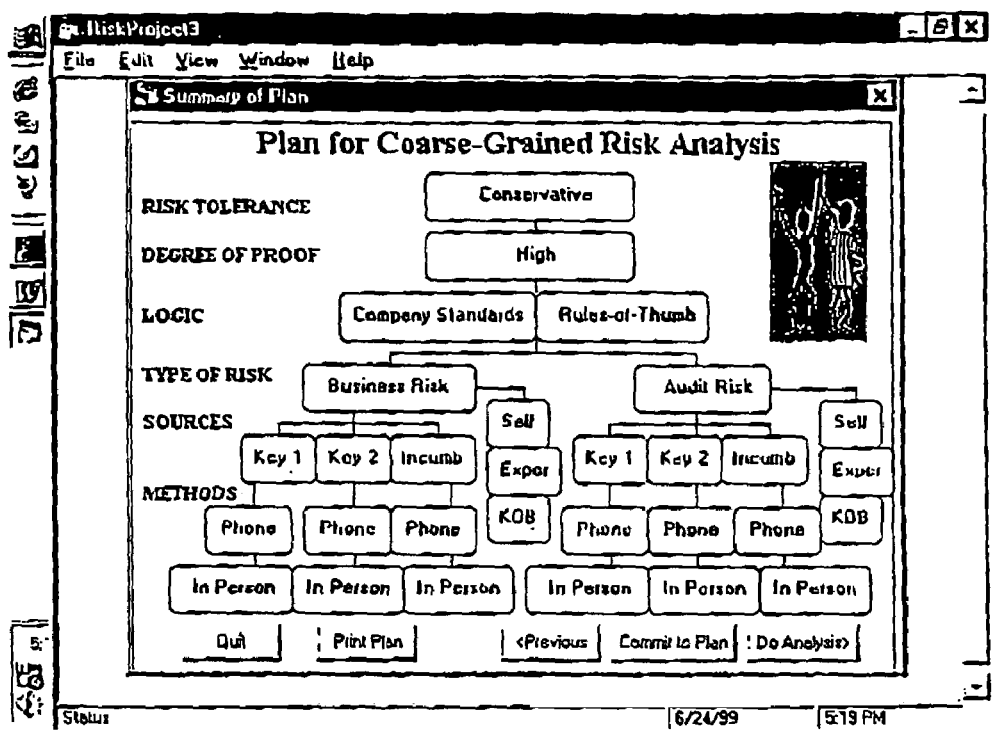

FIG. 73, 74, and 75 illustrate record keeping screens determining contacts and methods involved in the planning stage for collecting evidence for business risk, audit risk, and an overall plan respectively.

Figure 76:
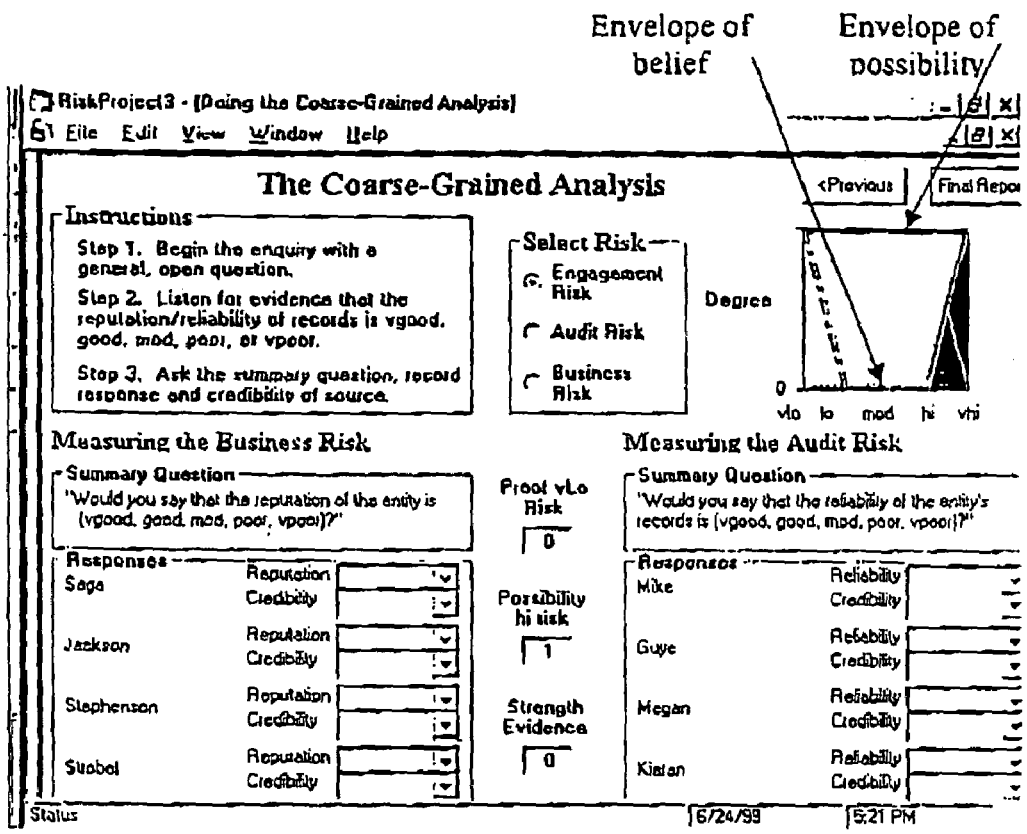

The data collected is entered using the interface screen in FIGS. 76 to 80. In FIG. 76, where no data has yet been entered, the envelope of possibility is the dark solid line across the top of the graph, and the envelope of belief is the solid Mine across the bottom. FIG. 76 therefore shows that when there is no evidence, any conclusion, from very low risk to very high risk, is 100% possible, and that very low risk is proven to degree zero. As data is collected, it is processed and the results displayed graphically at 204.

Figure 77:
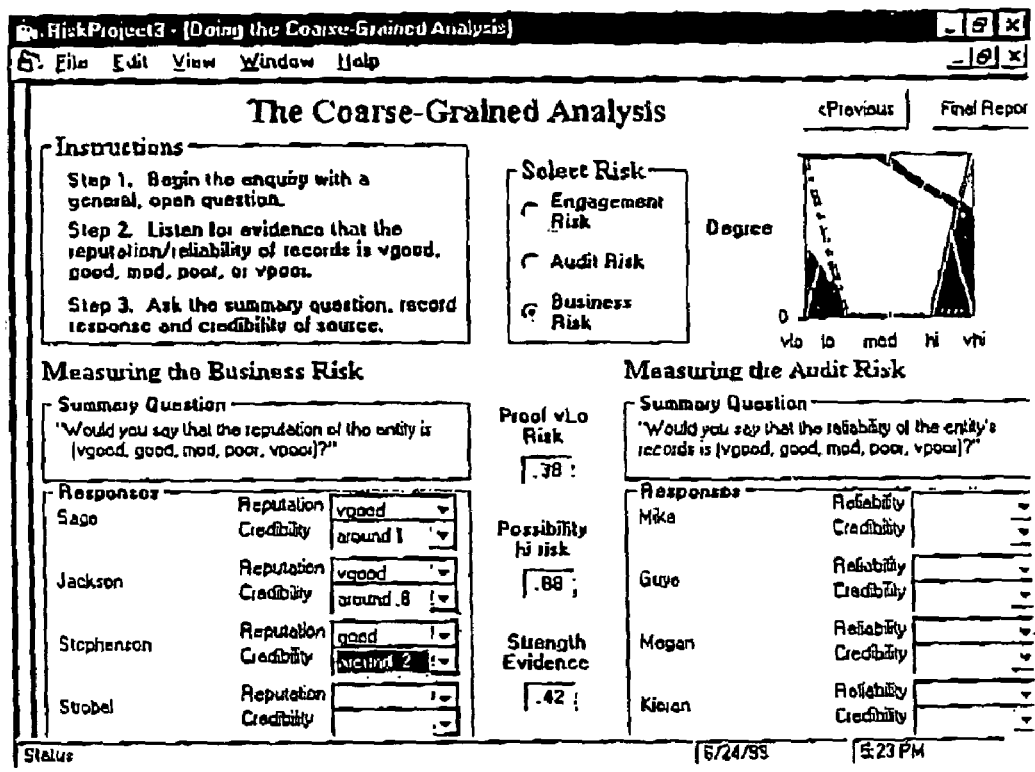
Figure 78:
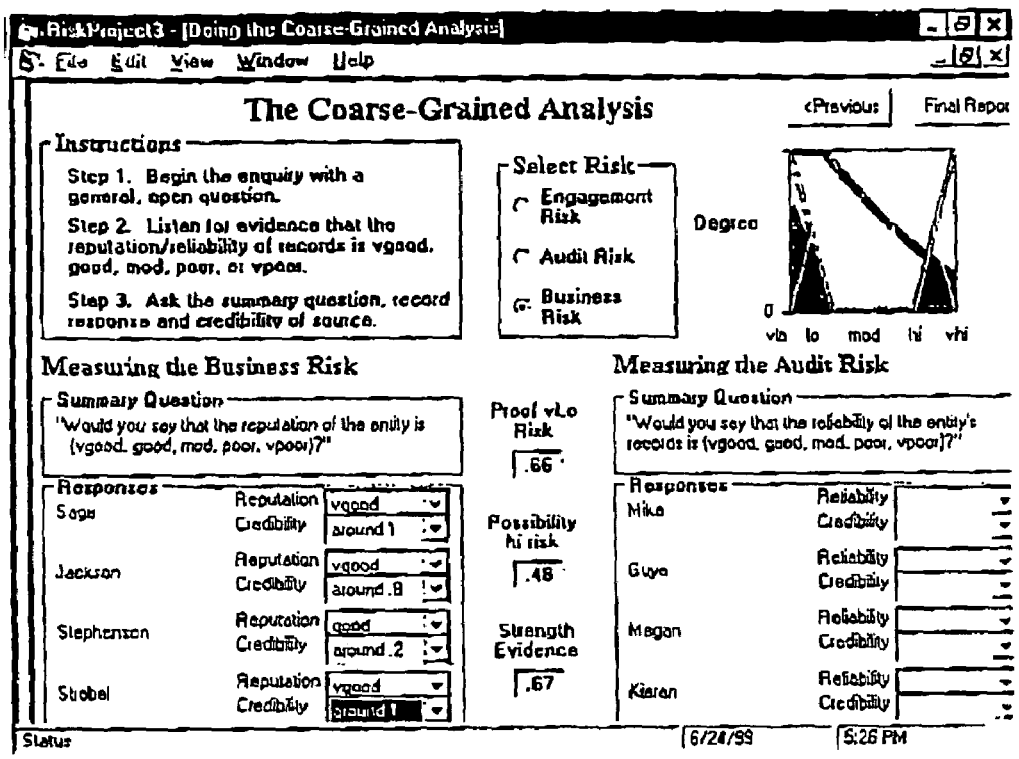
Figure 79:
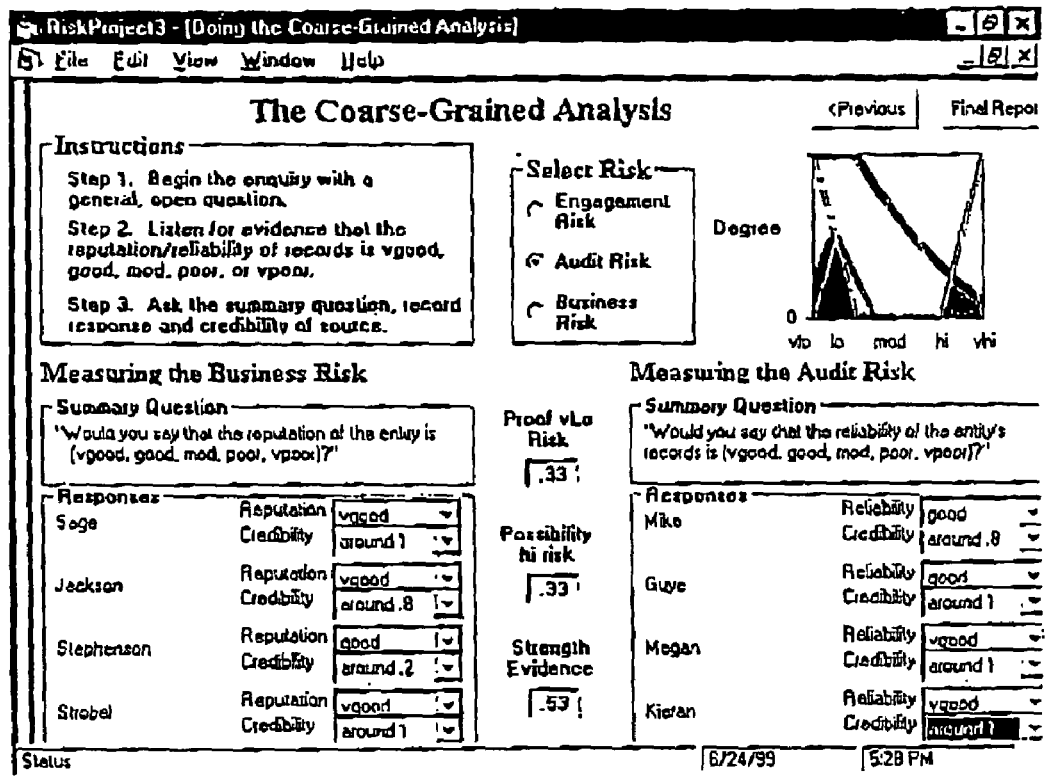

FIGS. 77 and 78 illustrate the effect of accumulating evidence, i.e. user input, on the two envelopes for business risk. The figures also show corresponding changes in the degree of proof of very low risk, the possibility of very high risk, and the strength of the conclusion. The possibility envelope is narrower in FIG. 78 than in FIG. 77 because there is more data and this data is relatively consistent. FIG. 79 shows the effect of completing all data fields on the envelopes for the audit risk.

Figure 80:
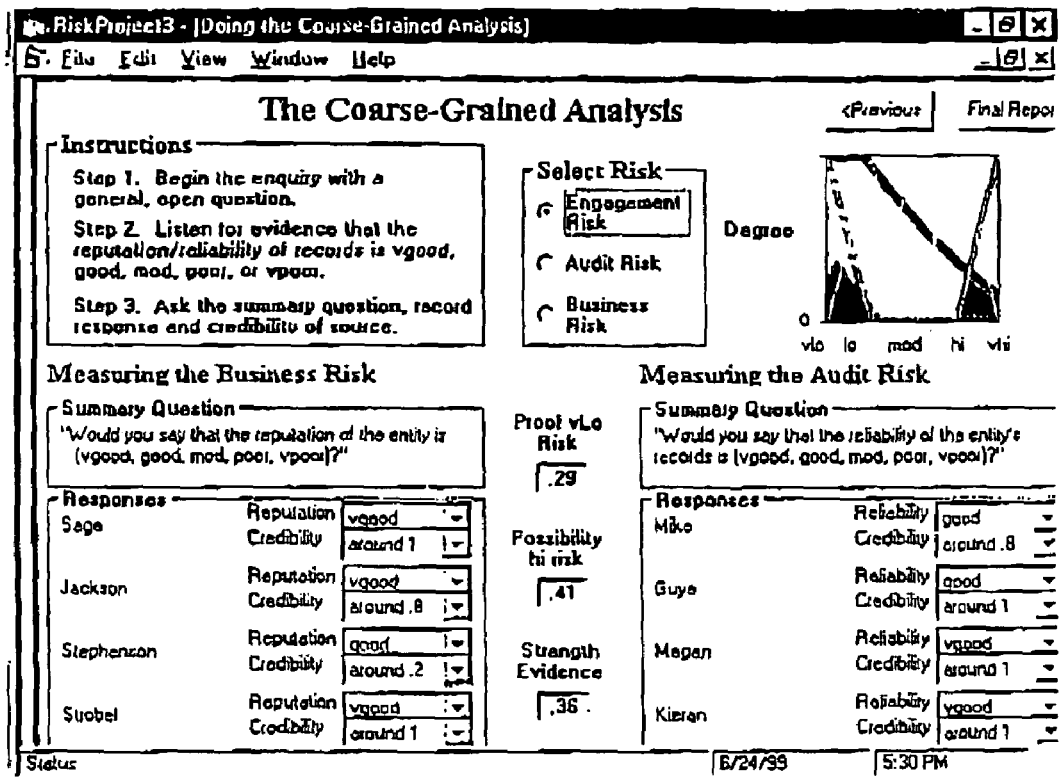

FIG. 80 illustrates engagement risk, calculated from the combination of the business risk and the audit risk of FIGS. 77 and 78 respectively. Business and audit risk are represented by $A_2'$ and $A_1'$ in FIG. 45. Inconsistency between $A_1'$ and $A_2'$. corresponds to the relatively small size of the shaded area in FIG. 45, which leads to doubt about the engagement risk when the audit and business risks are inconsistent.

Figure 81:
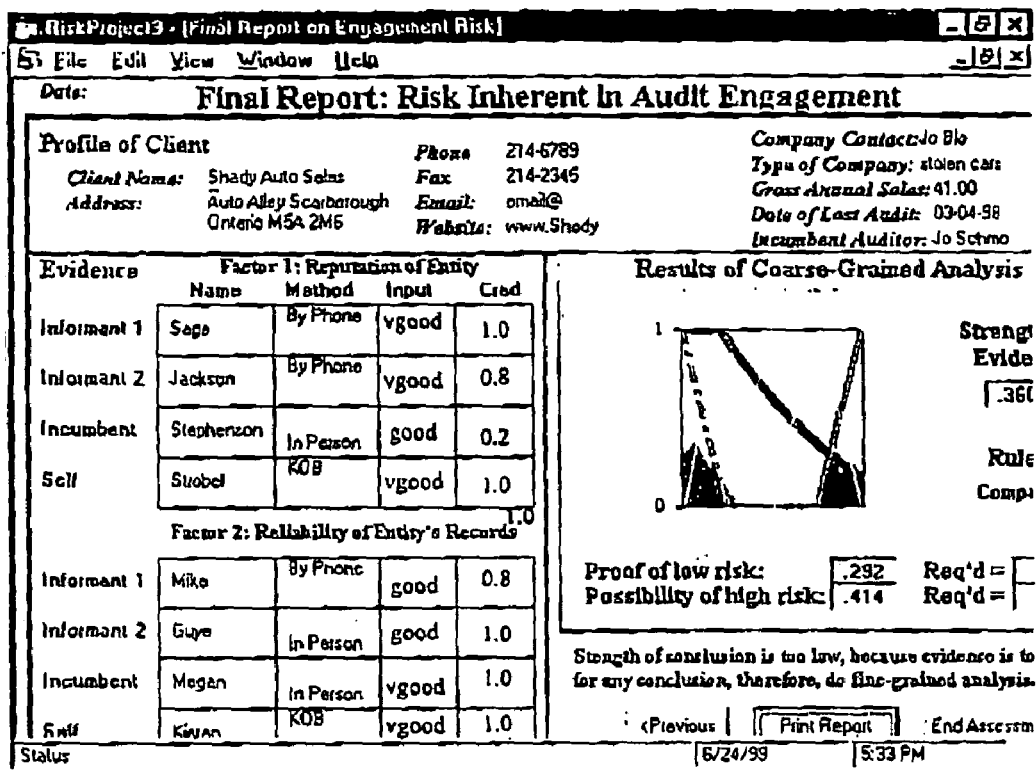
Figure 82:
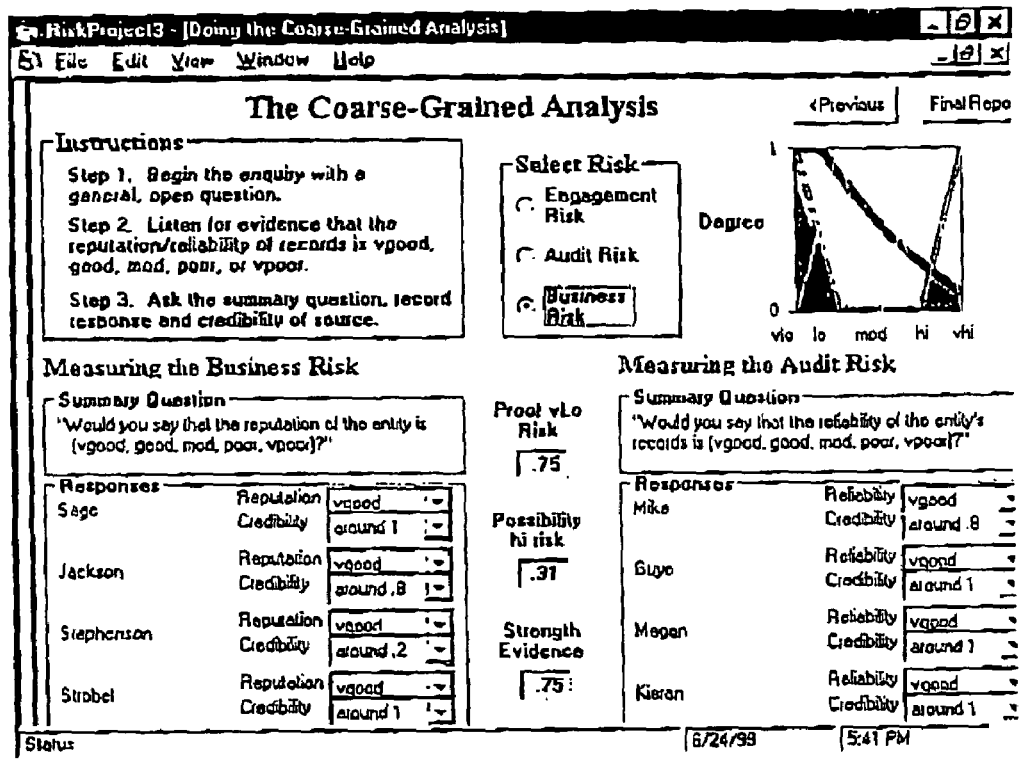
Figure 83:
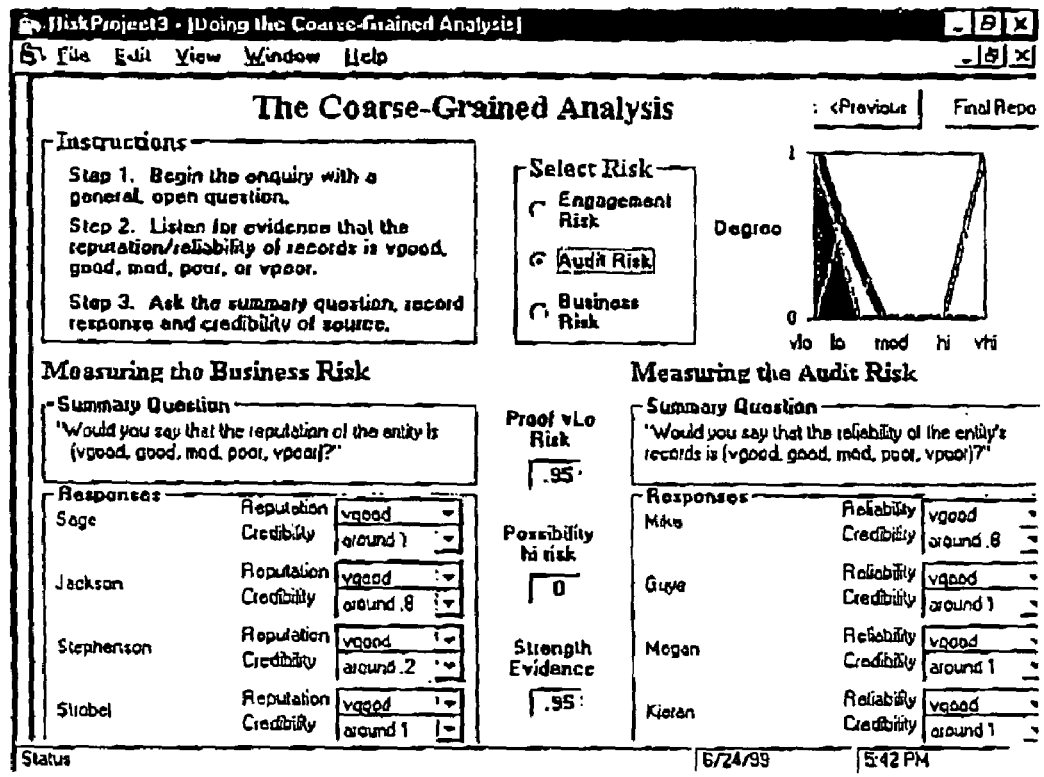
Figure 84:
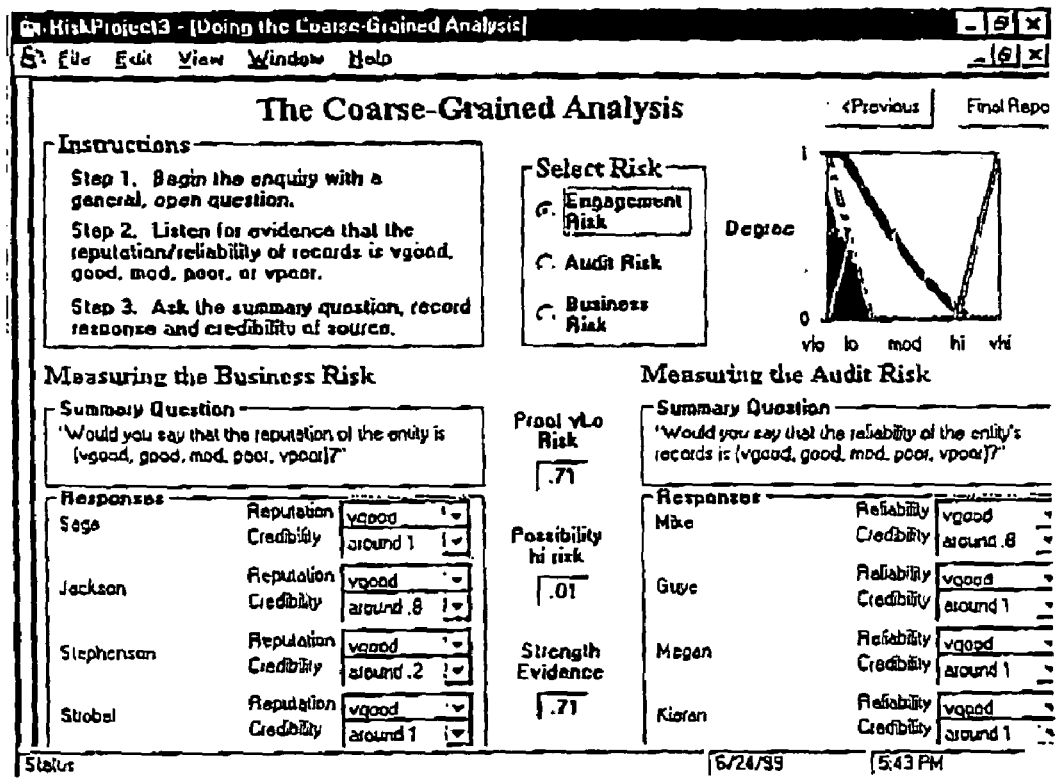
Figure 85:
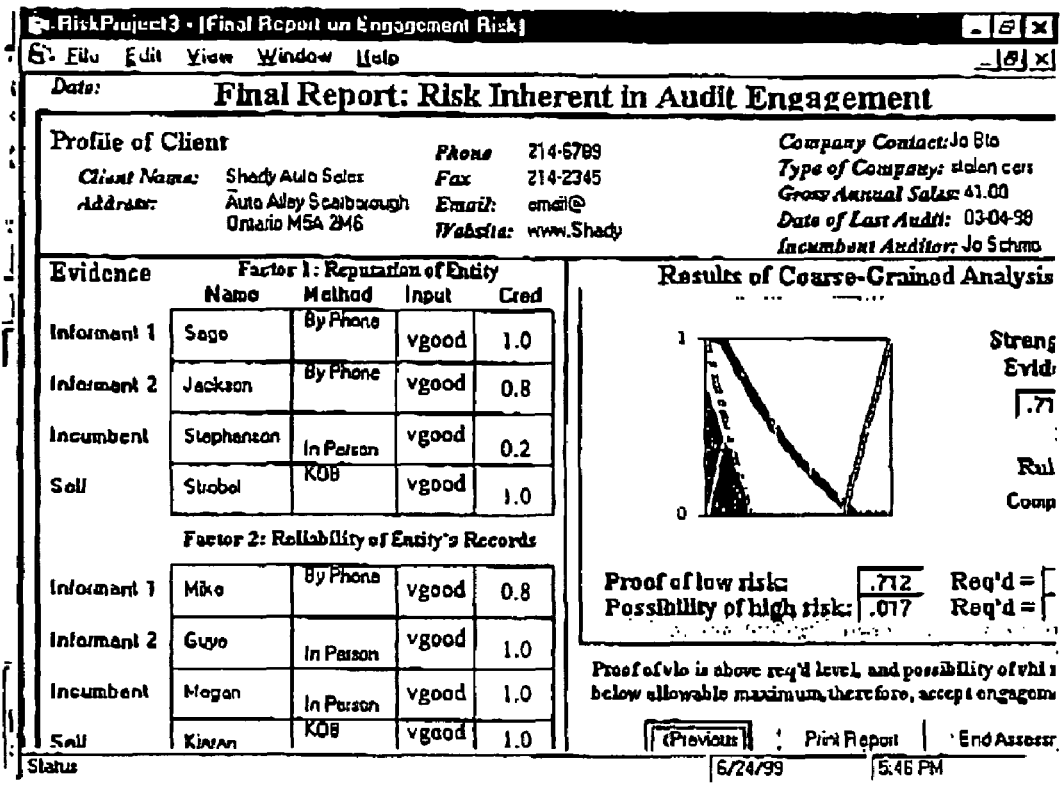

FIG. 81 shows the decision recommended by the software based on the parameters selected and the entered data. It finds the strength of the conclusion is too low, i.e. the evidence is too weak (inconsistent, low credibility), and recommends a fine grained analysis. This recommendation corresponds to the flow chart decision of FIG. 9a FIGS. 82, 83, and 84 represent a different version of FIGS. 79, 80, and 81 with the same expert parameters ($S_0$, $S_1$, $H_{min}$, $K_{min}$ and the same rule set). However in this case the user inputs different, more consistent and credible evidence, pointing towards much lower risk The resulting effects are: a narrower envelope of possibility centred on very low risk, a minute possibility of very high risk, a higher belief envelope, and increased overlap between the belief envelope and the dotted "Very low risk" triangle. FIG. 85 shows a recommendation by the software to accept the audit engagement based on the this different set of evidence.

In the expert system 11 of the preferred embodiment, rules 56 are typically chained, i.e. the output of one rule "block" (refer to FIG. 39) becomes the input of the next rule block to form a hierarchical structure. It is sometimes expedient to do numerical calculations using the possibility envelope output of a given block as the input to the next block.

An alternative embodiment to calculating intermediate envelopes of possibility is to calculate the envelope of possibility at the end of the chain of rules 56 using the distance functions 55 at the beginning of the chain 56 between the input and the rule input. Neither distance functions 55 nor envelopes $B_P*$ for the rules in the middle of the chain 56 need be calculated. The intermediate rules 56 between the beginning and end of the chain have the effect of modifying the relationship between input distance 55 and the shape of $B_P*$.

Instead of writing $B_P*(y) = \vee_B \cdot \min[B'(y), M_P(d_x(A, A'), d_y(B, B'))]$, which is the fo when there are no rules intermediate between A and B, one can write $B_P*(y) = \vee_B \cdot \min[B'(y), M_P(d_{xeff}(A, A'), d_{yeff}(B, B'))]$, or equivalently $$B_P*(y) = \vee_B \cdot \min[B'(y), M_{Peff}(d_x(A, A'), d_y(B, B'))],$$

where the difference between the usual $d_x$, $d_y$ or $M_P$ and "a series of effective distance functions" $d_{xeff}$, $d_{yeff}$, or "an effective kernel" $M_{Peff}$ accounts for the effect of having rules 56 intermediate between A and B.

Some examples on the use of the above-mentioned effective functions are given for specific chaining situations, for demonstrative purposes only.

EXAMPLE 1

Suppose
(1) There is a chain with n rules, in which the inputs and outputs match exactly for each rule in the chain, e.g. A→P, P→Q, Q→R, ..., T→U, U→B.
(2) $M_P$ is linear (see FIG. 32a), and the same $M_P$ is used for each rule 56 in the chain.

Then $d_{xeff} = d_x^{(1/n)}$ and $d_{yeff} = d_y^{(1/n)}$ where $d_x = d_x(A, A')$ and $d_y = d_y(B,B')$, where n is the number of rules in the chain 56.

EXAMPLE 2

Suppose
(1) There is a chain 56 of length two in which inputs and outputs match exactly, e.g. A→P, P→B.
(2) $M_P$ is linear and is different for the two rules because of different sensitivities of the output to a change in the input, i.e. $M_{P1}$ is used for A→P and $M_{P2}$ is used for P→B.
(3) A function g(S) is defined such that $M_{P2}(g(S)) = M_{P1}(S)$, where $S = (d_y/d_x)$. (Since $M_P$ is linear, it is a function only of $(d_y/d_x)$.)
(4) g(S) is either nondecreasing for all S∋[0, ∞) or nonincreasing for all S∋[0, ∞). This condition is used to restrict the occurrence of multiple roots in the implicit equation below.

Then $(d_{yeff}/d_{xeff})=(d_{yg}/d_x(A, A'))$ where $d_{yg}$ is the solution of $(d_{yg}(d_x/(A, A'))=g(d_y(B, B')/d_{yg})$.

EXAMPLE 3

Suppose
(1) There is a chain 56 of length two in which inputs and outputs match exactly, e.g. A→P, P→B.
(2) $M_P$ is nonlinear and identical for both rules. Then the effective distances $d_{xeff}$, $y_{yeff}$, are no longer calculated from simple geometrical formulas. They can however be found through numerical methods known in the art and will depend on the particular $M_P$ chosen by the expert of the system 11. The type of numerical method used may also be influenced by the shapes of A, P, B and where $d_x(A,A)$ and $d_y(B,B)$ lie in the $d_x$-$d_y$ plane, dependent upon the chosen application for the system 11.

EXAMPLE 4

(1) $M_P$ is linear and identical for each rule 56 in the rule set.
(2) There are two pairs of rules 56 with matching inputs and outputs, e.g. "red apples are ripe", "green apples are unripe"; "ripe apples are sweet", "unripe apples are sour", relating to the pH value of the apple to its colour.
(3) The cover-distance measure is linear rather than relative.
(4) The colour, ripeness, and sweetness variables are normalized, i.e. the maximum colour=exactly 1 and the minimum colour=exactly zero.
(5) The colour lies between red and green.
(6) Within each pair or rules, there is no intersection, e.g. "red" and "green" are disjoint; "ripe" and "unripe" are disjoint; "sweet" and "sour" are disjoint.

Then the ratio of the effective distances, used to calculate the envelope of possible apple pH directly from the apple's colour, is $(d_{yeff}/d_{xeff})=(-1+(1+4d_{colour}/d_{pH})^{1/2})/2$, where $(d_{colour}=\min(d_x(\text{green}, A'), d_x(\text{red}, A'))$ and $d_{pH}=\min(d_y(\text{sweet}, B'), d_y(\text{sour}, B'))$

EXAMPLE 5

(1) There is a chain of length two in which the input of rule two and the output of rule one do not match exactly, e.g. A→$P_1$, $P_2$→B.
(2) The same $M_P$ is used for both and it is linear.
(3) Linear cover-distance is used.
(4) $P_1$ and $P_2$ are disjoint.
(5) $d_x(A, A')+d_y(B, B')>q$, where $q=(|c(P_1, P_2)|-|P_1|-P_2|$ and $P_2$.
(6) $d_x(A, A')<d_y(B, B')$.
(7) The ranges of the variables are normalized, i.e. the input and output of each rule lie in [0, 1].

Figure 44:
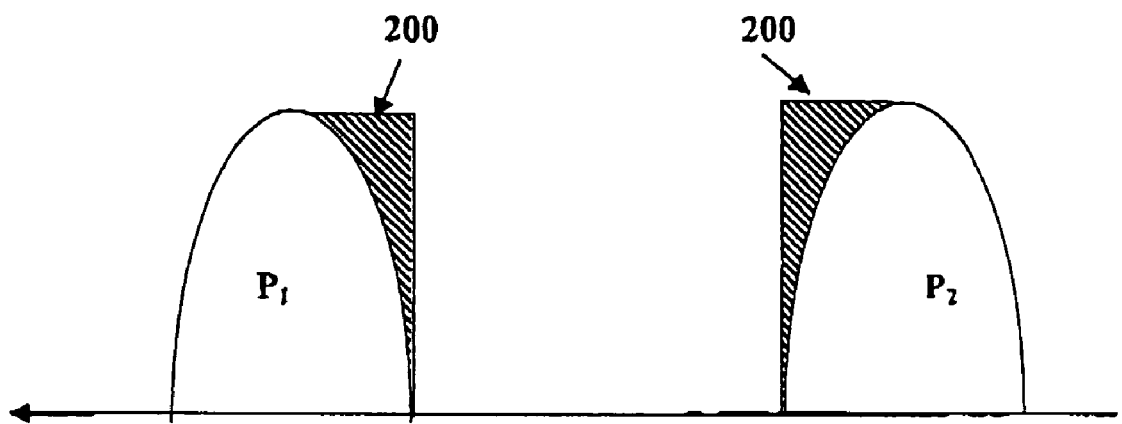
FIG. 44 is a further embodiment using effective distance measures.

Then the ratio of the effective distances, used to calculate the envelope of possibility for the end of the chain is $(d_{yeff}/d_{xeff})=d_y(B, B')/d_{22}$ where $d_{22}=(q/2)\{1+[1-4 d_x(A, A')d_y(B, B')/q^2]^{1/1}\}$ provided $d_{22}$> vagueness of the boundary of $P_2$ which is closest to $P_1$ and $q$-$d_{22}$> vagueness of the boundary of $P_1$ which is closest to $P_2$. The vagueness of a boundary of a fuzzy set is the difference between the area the fuzzy set would have if the fuzzy boundary were replaced by a crisp boundary at the edge of the fuzzy set, and the actual area. In the FIG. 44, a shaded region 200 represents the vagueness of the right and left boundary.

It is the role of the expert of the system 11 to decide whether it is more expedient for a particular application to use the above-described effective distances rather than the method described in the preferred embodiment. The method using effective functions can become increasingly complex algebraically, depending on the case chosen. It may be more feasible in this circumstance to use the chaining method of the preferred embodiment.

In the preferred embodiment, when there are multiple rules and interpolation, distance is taken to be the smallest of the distances between the input and the inputs of the (sparse) rule set. To make the expert system reproduce informal reasoning, a further embodiment may be required in rule blocks where informal reasoning indicates that continuous interpolation of implicit rules between sparse rules in a lower-dimensional subspace of the input space would be appropriate, as shown in FIG. 45.

The two explicit rules given as shown by the solid lines, are "High Audit Risk and High Business Risk→High Engagement Risk" and "Low Audit Risk and Low Business Risk→Low Engagement Risk". The input space, as shown by the dashed lines, is two-dimensional, where only two rules are given by way of example only, through which a straight line (not shown) is interpolated in the three-dimensional space comprising the output and the two input dimensions. The projection of this line onto the input space defines a lower-dimensional subspace S of the input space. Since there are insufficient points to define a plane, the before-mentioned Lagrange multiplier technique is applied to generate an interpolated output I for an arbitrary fizzy set in the input space.

Figure 45:
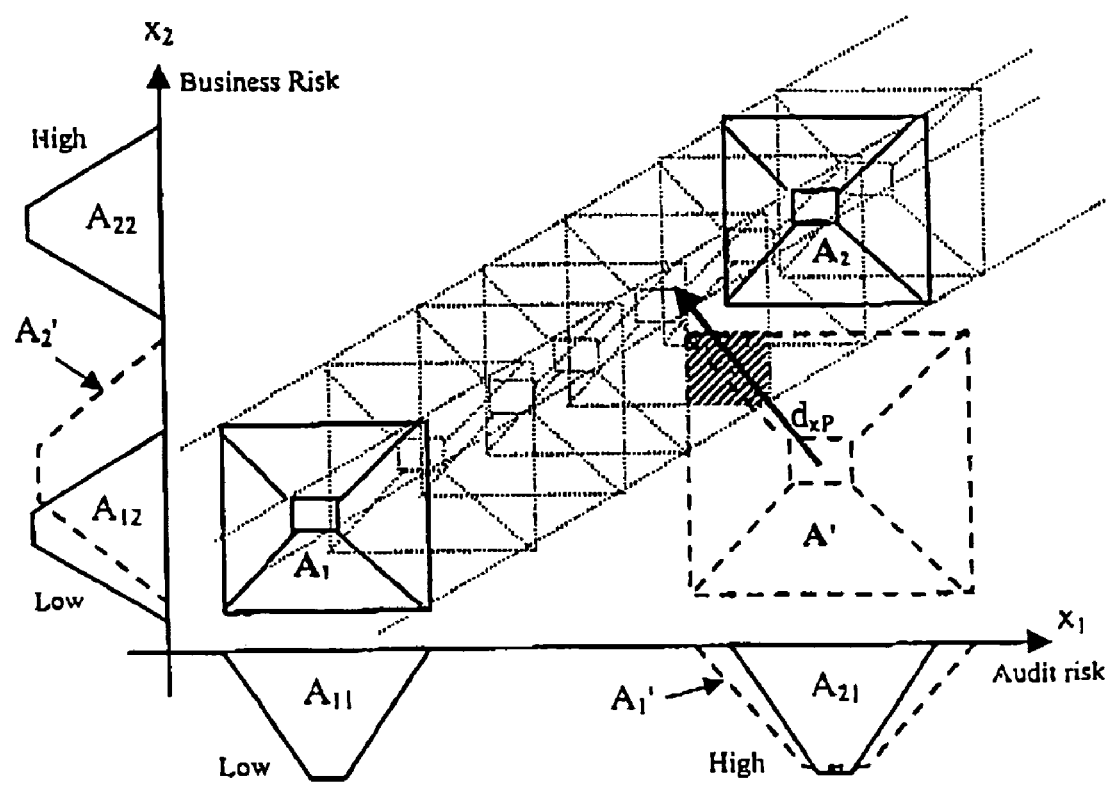
FIG. 45 shows the concept of continuous interpolation of implicit rules.

For a fuzzy input set entirely contained in S, represented in FIG. 45 by a straight diagonal line of ghosted dashed rectangles, the expert of the system 11 judges that there should be no spreading of the output envelope around I. The expert thus assumes that an infinite set of implicit, continuously interpolated rules can be inferred for all fuzzy inputs in S, from the sparse rules. Examples of continuously interpolated rules would be "Medium Audit Risk and Med Bus Risk→Med Engagement Risk"; "(Medium to very high) Audit Risk and (Medium to very Hi) Audit risk→(Medium to very high) Engagement risk", etc.

When the input lies wholly or partially outside S, the degree of spreading of the output is no longer determined by the distance between the input and the nearest rule input, as described by step 17 of FIG. 1 of the preferred embodiment. Instead, the degree of spreading is determined by the distance between the input and S. In the example, the spreading expresses doubt about the engagement risk when the business and audit risk are inconsistent. More generally, the spreading expresses doubt about conclusions in situations different from a narrow interpolation of limited experience.

The arrow labelled $d_{xP}$ in FIG. 45 indicates how the distance function for spreading is calculated. Its horizontal and vertical components can be manipulated with weights or compensation as while using some Euclidean measure to construct dig as described in the last step of box 62 in FIG. 6 and of FIG. 36.

When the input lies wholly or partially outside S, belief is no longer calculated as the degree of intersection between the input and the nearest rule input as mentioned in step 17. The expert has decided that if the input lies wholly within S, then the output is 100% believable. Belief is therefore calculated from the intersection of the ghosted rectangles in FIG. 45 representing S and the input S. Thus belief in the output declines when the inputs are inconsistent with an interpolation between the inputs of previous experiences.

While the invention has been described in correction with a specific embodiment thereof and in a specific use, various modifications thereof will occur to those skilled in the art without departing from the spirit of the invention. The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

The embodiments of the invention in which an exclusive property or priviledge is claimed are defined as follows:

1. In a computer-based risk management system utilizing fuzzy logic, a method for generating an indication of risk, said method comprising:
   a) said system receiving an expert defined rule entered by a user into said risk management system mapping at least one rule input A to at least one rule output B;
   b) said system receiving a data input A' and a data output B' from said user;
   c) comparing said data input A' with said rule input A to determine a first degree of mismatch $d_x$ between said rule input A and said data input A';
   d) assigning a function $M_P$ characterizing the way in which an envelope of possibility $B_P$ spreads as a function of the first degree of mismatch $d_x$ between said rule input A and said data input A', said envelope of possibility being indicative of possible outputs;
   e) using said first degree of mismatch and said function $M_P$ to calculate a second degree of mismatch $d_y$ between said rule output B and a said data output B';
   f) calculating said envelope of possibility $B_P$ using said function $M_P$ and said data output B';
   g) calculating an envelope of belief $B_B$ indicating a degree to which said data output B' is true, using said first degree of mismatch $d_x$ between said rule input A and said data input A';
   h) said system receiving additional expert input having at least one assertion G required to be proven true;
   i) said system receiving an expert defined minimum degree of proof $H_{min}$ of said assertion G;
   j) comparing said envelope of belief $B_B$ and said assertion G to determine an actual degree of proof H for said assertion G;
   k) comparing said required minimum degree of proof $H_{min}$ and said actual degree of proof H to generate a first conclusion about an acceptability of said actual degree of proof H for said assertion G;
   l) said system receiving an expert defined minimum degree of ignorance $l_{min}$ for said assertion G;
   m) calculating an actual degree of ignorance l for said assertion G according to a difference between said envelope of belief $B_B$ and said envelope of possibilities $B_P$;
   n) comparing said minimum degree of ignorance l for said assertion G and said actual degree of ignorance l for said assertion G to generate a second conclusion about an acceptability of said degree of ignorance l for said assertion G;
   o) said system receiving an expert defined minimum degree of possibility $K_{min}$ for said assertion G;
   p) comparing said envelope of possibilities $B_P$ and assertion G to calculate an actual degree of possibility K for said assertion G;
   q) comparing said actual degree of possibility K and said required minimum degree of possibility $K_{min}$ to generate a third conclusion about an acceptability of said degree of possibility K for said assertion G;
   r) generating said indication of risk by evaluating said conclusions against said assertion G, said indication of risk indicating whether or not said assertion G is good; and
   s) said system outputting said indication of risk.

2. The method according to claim 1, wherein a plurality of rules are obtained and said envelope of possibility $B_P$ considers outputs from each of said plurality of rules.

3. The method according to claim 1, wherein said envelope of possibility $B_P$ is established by consideration of outputs of adjacent rules.

4. The method according to claim 3, wherein said envelope of possibility is established through interpolation between one or more of said outputs of adjacent rules.

5. The method according to claim 3, wherein said envelope of possibility is established through extrapolation between one or more of said outputs of adjacent rules.

6. The method according to claim 1 including providing a set of examples associated with said rule to provide a plurality of possible outputs for said input.

7. The method according to claim 1 wherein said first degree of mismatch $d_x$ is established based on similarity between selected data input A' and said rule input A.

8. The method according to claim 1 wherein a parameter is applied to limit said data output B' and thereby modify said envelope of possibility $B_P$.

9. The method according to claim 1 wherein a subset of said envelope of belief $B_B$ is established by applying a parameter to qualify said rule input A and data input A'.

10. The method according to claim 1 wherein a subset of said envelope of possibility $B_P$ is established by applying a parameter to qualify said data output B'.

11. A computer-based risk management system utilizing fuzzy logic for generating an indication of risk, said system comprising a computer readable medium having computer executable instructions for:
   a) receiving an expert defined rule entered into said possibilistic system mapping at least one rule input A to at least one rule output B;
   b) receiving a data input A' and a data output B'
   c) comparing said data input A' with said rule input A to determine a first degree of mismatch $d_x$ between said rule input A and said data input A';
   d) assigning a function $M_P$ characterizing the way in which an envelope of possibility $B_P$ spreads as a function of the first degree of mismatch $d_x$ between said rule input A and said data input A', said envelope of possibility being indicative of possible outputs;
   e) using said first degree of mismatch and said function $M_P$ to calculate a second degree of mismatch $d_y$ between said rule output B and a said data output B';
   f) calculating said envelope of possibility $B_P$ using said function $M_P$ and said data output B';
   g) calculating an envelope of belief $B_B$ indicating a degree to which said data output B' is true, using said first degree of mismatch $d_x$ between said rule input A and said data input A';
   h) receiving additional expert input having at least one assertion G required to be proven true;
   i) receiving an expert defined minimum degree of proof $H_{min}$ of said assertion G;
   j) comparing said envelope of belief $B_B$ and said assertion G to determine an actual degree of proof H for said assertion G;

k) comparing said required minimum degree of proof $H_{min}$ and said actual degree of proof H to generate a first conclusion about an acceptability of said actual degree of proof H for said assertion G;

l) receiving an expert defined minimum degree of ignorance $l_{min}$ for said assertion G;

m) calculating an actual degree of ignorance l for said assertion G according to a difference between said envelope of belief $B_B$ and said envelope of possibilities $B_P$;

n) comparing said minimum degree of ignorance l for said assertion G and said actual degree of ignorance l for said assertion G to generate a second conclusion about an acceptability of said degree of ignorance l for said assertion G;

o) receiving an expert defined minimum degree of possibility $K_{min}$ for said assertion G;

p) comparing said envelope of possibilities $B_P$ and said assertion G to calculate an actual degree of possibility K for said assertion G;

q) comparing said actual degree of possibility K and said required minimum degree of possibility $K_{min}$ to generate a third conclusion about an acceptability of said degree of possibility K for said assertion G;

r) generating said indication of risk by evaluating said conclusions against said assertion G, said indication of risk indicating whether or not said assertion G is good; and s) outputting said indication of risk.

12. The possibilistic expert system according to claim 11, wherein a plurality of rules are obtained and said envelope of possibility $B_P$ considers outputs from each of said plurality of rules.

13. The possibilistic expert system according to claim 11, wherein said envelope of possibility $B_P$ is established by consideration of outputs of adjacent rules.

14. The possibilistic expert system according to claim 13, wherein said envelope of possibility is established through interpolation between one or more of said outputs of adjacent rules.

15. The possibilistic expert system according to claim 13, wherein said envelope of possibility is established through extrapolation between one or more of said outputs of adjacent rules.

16. The possibilistic expert system according to claim 11 including providing a set of examples associated with said rule to provide a plurality of possible outputs for said input.

17. The possibilistic expert system according to claim 11 wherein said first degree of mismatch $d_x$ is established based on similarity between selected data input A' and said rule input A.

18. The possibilistic expert system according to claim 11 wherein a parameter is applied to limit said data output B' and thereby modify said envelope of possibility $B_P$.

19. The possibilistic expert system according to claim 11 wherein a subset of said envelope of belief $B_B$ is established by applying a parameter to qualify said rule input A and data input A'.

20. The possibilistic expert system according to claim 11 wherein a subset of said envelope of possibility $B_P$ is established by applying a parameter to qualify said data output B'.

* * * * *